United States Patent [19]
Sasaki

[11] Patent Number: 5,959,672
[45] Date of Patent: Sep. 28, 1999

[54] PICTURE SIGNAL ENCODING SYSTEM, PICTURE SIGNAL DECODING SYSTEM AND PICTURE RECOGNITION SYSTEM

[75] Inventor: Mikio Sasaki, Kariya, Japan

[73] Assignee: Nippondenso Co., Ltd., Kariya, Japan

[21] Appl. No.: 08/722,559

[22] Filed: Sep. 27, 1996

[30] Foreign Application Priority Data

Sep. 29, 1995 [JP] Japan ................................... 7-252107
Sep. 29, 1995 [JP] Japan ................................... 7-252532

[51] Int. Cl.⁶ ................................................ H04N 7/28
[52] U.S. Cl. .......................... 348/390; 348/414; 348/417; 348/418; 348/422; 382/243
[58] Field of Search .................................. 348/390, 414, 348/417, 418, 422; 382/243

[56] References Cited

U.S. PATENT DOCUMENTS

| | | |
|---|---|---|
| 5,379,355 | 1/1995 | Allen . |
| 5,448,652 | 9/1995 | Vaidyanathan .......................... 348/270 |
| 5,467,086 | 11/1995 | Jeong . |

FOREIGN PATENT DOCUMENTS

| | | |
|---|---|---|
| 631 442 | 12/1994 | European Pat. Off. . |
| 4-329088 | 11/1992 | Japan . |
| 6-217150 | 8/1994 | Japan . |
| 6-237180 | 8/1994 | Japan . |
| 6-253282 | 9/1994 | Japan . |
| 6-276511 | 9/1994 | Japan . |
| 6-350458 | 12/1994 | Japan . |
| 7-030896 | 1/1995 | Japan . |

OTHER PUBLICATIONS

Matsumura et al: "Error–Resilient Syntax for Very–Low Bitrate Video Coding", PCSJ 94; Oct. 17–19, 1994.
"Digital Codeless Picture Telephone Developed by BT Labs, UK", Nikkei Electronics, Nov. 23, 1992.

*Primary Examiner*—Howard Britton
*Attorney, Agent, or Firm*—Pillsbury Madison & Sutro LLP

[57] ABSTRACT

A picture signal encoding system capable of transmitting a motion picture at an extremely low rate while sufficiently controlling the occurrence of a retransmission mode and the occurrence of a picture freeze. The encoding system comprises an encoding control section, an attribute memory, an attribute prediction section and an area extraction and recognition processing section. For realizing the extremely low rate transmission, the encoder system integrally performs the alteration of the syntax, the substitute of the code word, the adaptive control for the prediction of the current frame encoding attribute based on the past encoding attribute and the attribute decision, the object area extraction based on the motion and a model, the area-separated quantization control, and the control of the necessary number of transformation coefficients according to the use mode, the transmission rate and the motion occurrence quantity. A protocol transformer is provided to match the current picture compression standard (H.261), so that the encoding system can be made with a simple arrangement.

112 Claims, 60 Drawing Sheets

INTERIOR OF MOTOR VEHICLE

INDOOR

OUTDOOR

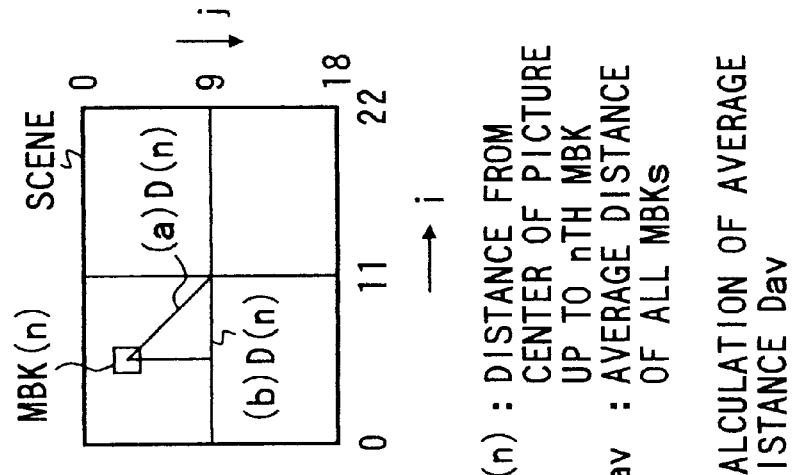
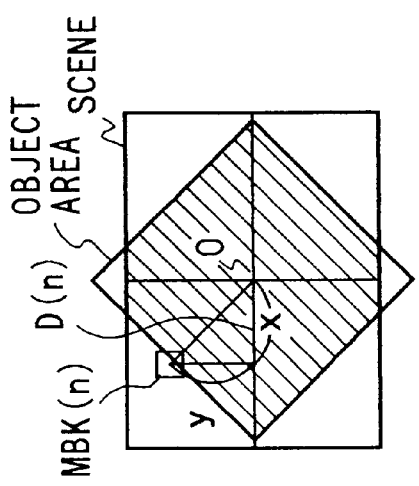
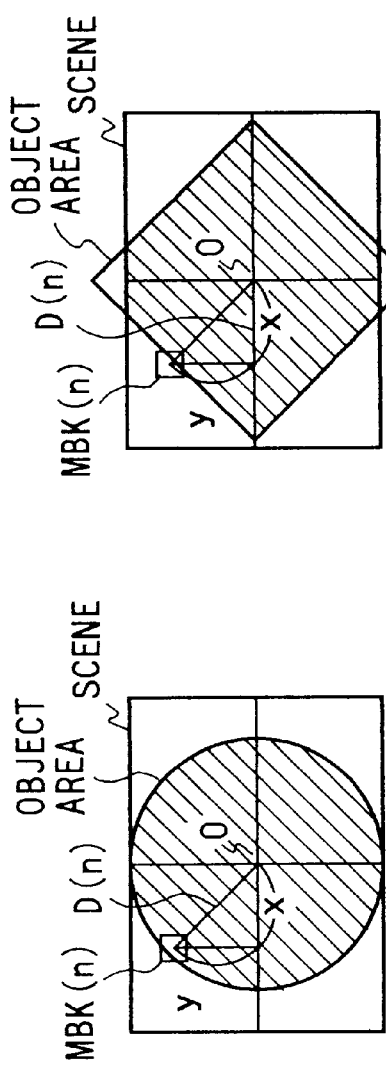

FIG. 20

GOB NUMBER  MBA

MBA DATA

FIG. 21

| GOB NUMBER | MTP | | | | | | | | | | | | | | | | | | |
|---|---|---|---|---|---|---|---|---|---|---|---|---|---|---|---|---|---|---|---|
| [1] | 0 | 6 | 0 | 0 | 3 | 3 | 2 | 3 | 0 | 0 | 0 | 0 | [2] | 4 | 2 | 0 | 0 | 0 | 0 | 0 | 0 | 0 | 0 | 1 |
| [1] | 0 | 0 | 0 | 3 | 3 | 2 | 0 | 0 | 3 | 2 | 2 | 3 | [2] | 0 | 2 | 2 | 0 | 0 | 0 | 0 | 0 | 0 | 0 | 1 |
| [1] | 0 | 0 | 0 | 2 | 1 | 0 | 3 | 3 | 2 | 2 | 2 | 2 | [2] | 2 | 3 | 0 | 3 | 0 | 0 | 0 | 0 | 0 | 9 | 1 |
| [3] | 0 | 0 | 0 | 3 | 0 | 0 | 3 | 3 | 3 | 2 | 2 | 2 | [4] | 2 | 3 | 0 | 3 | 1 | 0 | 0 | 0 | 0 | 0 | 1 |
| [3] | 0 | 0 | 3 | 2 | 0 | 3 | 3 | 2 | 2 | 2 | 2 | 2 | [4] | 3 | 2 | 3 | 2 | 2 | 0 | 0 | 0 | 3 | 3 | 1 |
| [3] | 0 | 0 | 2 | 0 | 3 | 3 | 2 | 2 | 2 | 2 | 2 | 3 | [4] | 3 | 0 | 3 | 3 | 3 | 0 | 0 | 0 | 3 | 3 | 1 |
| [5] | 0 | 3 | 2 | 0 | 0 | 3 | 2 | 2 | 2 | 2 | 2 | 2 | [6] | 2 | 2 | 2 | 3 | 0 | 0 | 0 | 0 | 3 | 0 | 1 |
| [5] | 0 | 0 | 2 | 2 | 3 | 2 | 2 | 2 | 2 | 2 | 2 | 2 | [6] | 3 | 2 | 2 | 2 | 3 | 2 | 0 | 0 | 1 | 3 | 1 |
| [5] | 0 | 3 | 0 | 2 | 2 | 2 | 2 | 2 | 2 | 2 | 1 | 2 | [6] | 2 | 2 | 2 | 2 | 2 | 0 | 0 | 3 | 3 | 3 | 1 |
| [7] | 0 | 5 | 2 | 2 | 2 | 2 | 2 | 2 | 2 | 3 | 2 | 2 | [8] | 2 | 2 | 2 | 2 | 3 | 0 | 0 | 0 | 0 | 0 | 1 |
| [7] | 0 | 1 | 0 | 3 | 3 | 1 | 3 | 2 | 2 | 2 | 2 | 2 | [8] | 2 | 2 | 2 | 2 | 2 | 0 | 0 | 0 | 3 | 3 | 1 |
| [7] | 0 | 0 | 0 | 2 | 2 | 3 | 2 | 2 | 2 | 2 | 2 | 1 | [8] | 2 | 2 | 2 | 2 | 2 | 0 | 0 | 0 | 3 | 3 | 1 |
| [9] | 0 | 0 | 0 | 0 | 0 | 0 | 3 | 3 | 3 | 2 | 2 | 2 | [10] | 2 | 0 | 3 | 3 | 3 | 0 | 0 | 0 | 0 | 0 | 1 |
| [9] | 0 | 0 | 0 | 0 | 0 | 3 | 3 | 3 | 3 | 3 | 3 | 2 | [10] | 2 | 3 | 3 | 3 | 3 | 0 | 0 | 0 | 0 | 0 | 1 |
| [9] | 0 | 0 | 0 | 0 | 0 | 0 | 5 | 0 | 0 | 0 | 0 | 3 | [10] | 2 | 0 | 0 | 3 | 3 | 0 | 0 | 0 | 0 | 9 | 1 |
| [11] | 0 | 0 | 0 | 0 | 0 | 0 | 0 | 0 | 0 | 0 | 0 | 0 | [12] | 2 | 2 | 2 | 2 | 2 | 0 | 0 | 0 | 0 | 0 | 1 |
| [11] | 0 | 0 | 0 | 0 | 0 | 0 | 0 | 0 | 0 | 0 | 0 | 0 | [12] | 2 | 2 | 1 | 2 | 2 | 0 | 0 | 0 | 0 | 0 | 1 |
| [11] | 0 | 0 | 0 | 0 | 0 | 0 | 0 | 0 | 0 | 0 | 0 | 3 | [12] | 2 | 2 | 0 | 1 | 3 | 0 | 0 | 0 | 0 | 9 | 1 |

MTP DATA

FIG. 22

| GOB NUMBER | CBP | CBP DATA |
|---|---|---|
| [1] | 0 | 32 0 0 0 0 60 0 0 0 0 0 0 0 0 0 — |
| [1] | 0 | 0 0 0 60 48 0 0 8 0 0 0 0 0 0 0 — |
| [1] | 0 | 0 16 32 0 0 0 28 60 44 0 0 0 0 0 0 — |
| [2] | 63 52 44 0 0 0 0 0 0 0 0 0 0 0 0 — |
| [2] | 0 16 24 0 0 0 0 0 0 0 0 0 0 0 0 — |
| [2] | 8 0 0 0 0 0 0 0 0 0 0 0 0 0 0 — |
| [3] | 0 | 0 0 0 0 0 0 0 60 60 56 0 0 0 0 0 — |
| [3] | 0 | 0 0 40 0 0 0 0 60 56 36 0 0 0 0 0 — |
| [3] | 0 | 0 0 4 0 0 0 0 52 60 8 4 0 0 0 0 — |
| [4] | 36 0 0 0 0 0 0 0 0 0 0 0 0 0 0 — |
| [4] | 0 8 0 0 0 0 0 0 0 0 0 0 0 0 0 — |
| [4] | 0 60 0 0 0 0 0 0 0 0 0 0 0 0 0 — |
| [5] | 0 | 0 12 0 0 0 0 4 60 60 44 16 0 32 0 0 — |
| [5] | 0 | 0 0 8 0 12 56 60 44 8 56 0 0 20 0 0 — |
| [5] | 0 | 8 32 0 16 60 60 60 56 28 0 0 0 0 0 — |
| [6] | 60 60 40 0 20 0 0 0 0 0 0 0 0 0 0 — |
| [6] | 48 36 32 0 8 0 0 0 0 0 0 0 0 0 0 — |
| [6] | 60 60 60 0 0 0 0 0 0 0 0 0 0 0 0 — |
| [7] | 0 | 4 52 16 0 16 16 56 56 0 60 0 0 0 0 0 — |
| [7] | 0 | 32 0 32 8 0 12 8 12 60 56 0 0 0 56 0 — |
| [7] | 0 | 0 20 60 60 0 0 16 60 56 60 0 0 0 0 0 — |
| [8] | 60 60 60 60 16 0 0 0 0 0 0 0 0 0 0 — |
| [8] | 52 48 24 32 0 0 0 0 0 0 0 0 0 0 0 — |
| [8] | 16 48 0 40 0 0 0 0 0 0 0 0 0 0 0 — |
| [9] | 0 | 0 60 60 40 0 4 44 60 56 0 0 0 0 0 0 — |
| [9] | 0 | 0 0 52 0 0 28 56 20 56 0 0 0 0 0 0 — |
| [9] | 0 | 0 0 0 60 8 8 60 60 40 0 0 0 0 0 0 — |
| [10] | 8 0 0 0 0 0 0 0 0 0 0 0 0 0 0 — |
| [10] | 0 0 0 0 0 0 0 0 0 0 0 0 0 0 0 — |
| [10] | 8 12 0 0 0 0 0 0 0 0 0 0 0 0 0 — |
| [11] | 0 | 0 0 0 0 52 24 60 56 48 0 0 0 0 0 0 — |
| [11] | 0 | 0 0 0 0 0 60 16 60 32 0 0 0 0 0 0 — |
| [11] | 0 | 0 0 0 0 0 0 48 0 0 0 0 0 0 0 0 — |
| [12] | 36 60 8 0 0 0 0 0 0 0 0 0 0 0 0 — |
| [12] | 52 60 56 0 0 0 0 0 0 0 0 0 0 0 0 — |
| [12] | 56 20 0 0 0 0 0 0 0 0 0 0 0 0 0 — |

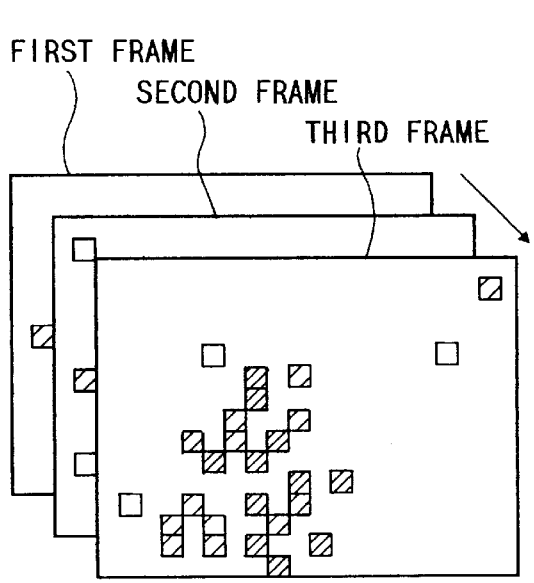
ANALYSIS OF MOTION
AREAS OF 3 FRAMES
FIG. 24(a)
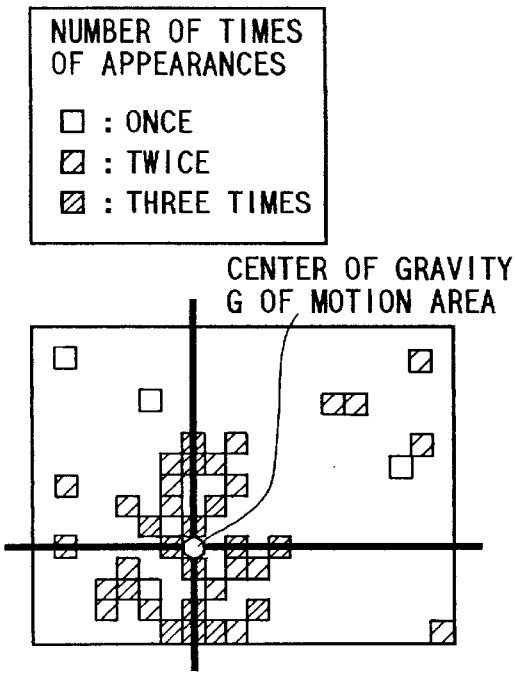
PILING-UP OF
MOTION AREAS
FIG. 24(b)
FIG. 24(c)
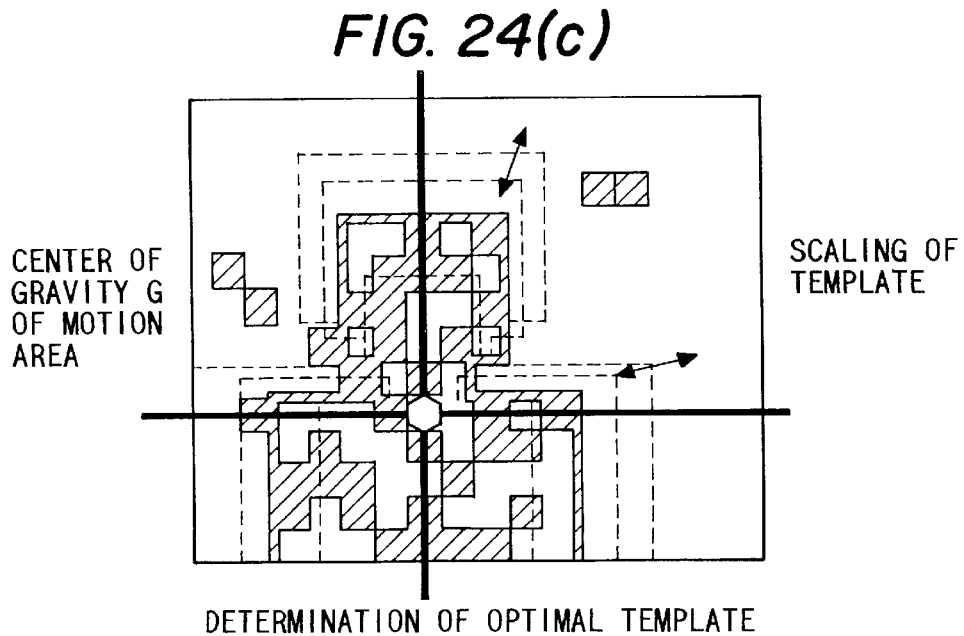
DETERMINATION OF OPTIMAL TEMPLATE

PRINCIPLE OF VERY LOW BITRATE VIDEO CODING USING AREA EXTRACTION

<THIS EMBODIMENT>

<H.261 STANDARD>

FIG. 33

MTP VLC TABLE

| NUMBER | VLC CODE | INTRA | MQ | MVD | CBP | TCOEF | FIL | |
|---|---|---|---|---|---|---|---|---|
| 0 | – | 0 | 0 | 0 | 0 | 0 | 0 | NoMC, NotCoded |
| 1 | 1 | 0 | 0 | 0 | 1 | 1 | 0 | NoMC, Coded |
| 2 | 01 | 0 | 0 | 1 | 1 | 1 | 1 | MC, Coded |
| 3 | 001 | 0 | 0 | 1 | 0 | 0 | 1 | MC, NotCoded |
| 4 | 0001 | 1 | 0 | 0 | 0 | 1 | 0 | Intra |
| 5 | 0000 1 | 0 | 1 | 0 | 1 | 1 | 0 | NoMC, Coded, +Q |
| 6 | 0000 01 | 0 | 1 | 1 | 1 | 1 | 1 | MC, Coded, +Q |
| 7 | 0000 001 | 1 | 1 | 0 | 0 | 1 | 0 | Intra, +Q |
| 8 | 0000 0001 | 0 | 0 | 1 | 1 | 1 | 0 | MC, Coded |
| 9 | 0000 0000 1 | 0 | 0 | 1 | 0 | 0 | 0 | MC, NotCoded |
| 10 | 0000 0000 01 | 0 | 1 | 1 | 1 | 1 | 0 | MC, Coded, +Q |

FIG. 34

| ORDER | CODE LENGTH | MACROBLOCK TYPE ATTRIBUTE | | | | | |
|---|---|---|---|---|---|---|---|
| | | INTRA | Q | MC | CBP | TCOEF | FIL |
| 1 | 3 | | | ○ | | | ○ |
| 2 | 2 | | | ○ | ○ | ○ | ○ |
| 3 | 6 | | ○ | ○ | ○ | ○ | ○ |
| 4 | 1 | | | | ○ | ○ | |
| 5 | 9 | | | ○ | | | |
| 6 | 5 | | ○ | | ○ | ○ | |
| 7 | 4 | ○ | | | | ○ | |
| 7 | 7 | ○ | ○ | | | ○ | |
| 7 | 8 | | | | ○ | ○ | ○ |
| 7 | 10 | | ○ | ○ | ○ | ○ | |

INTRA : IN-FRAME ENCODING, INTER OR FIXED EXCEPT INTRA
Q : MQUANT=1, CHANGE QUANTIZATION SCALE WITH THIS MBK
MC : MVD=1, PERFORM MOTION COMPENSATION
CBP : USING CBP INFORMATION
TCOEF : ENCODE DCT COEFFICIENT
FIL : OPERATE LOOP FILTER

INTER-FRAME PREDICTION
ERROR POWER SUM
INTER/INTRA DECISION
CHARACTERISTIC VIEW

INTER-FRAME ERROR SUM
(NO MOTION COMPENSATION)

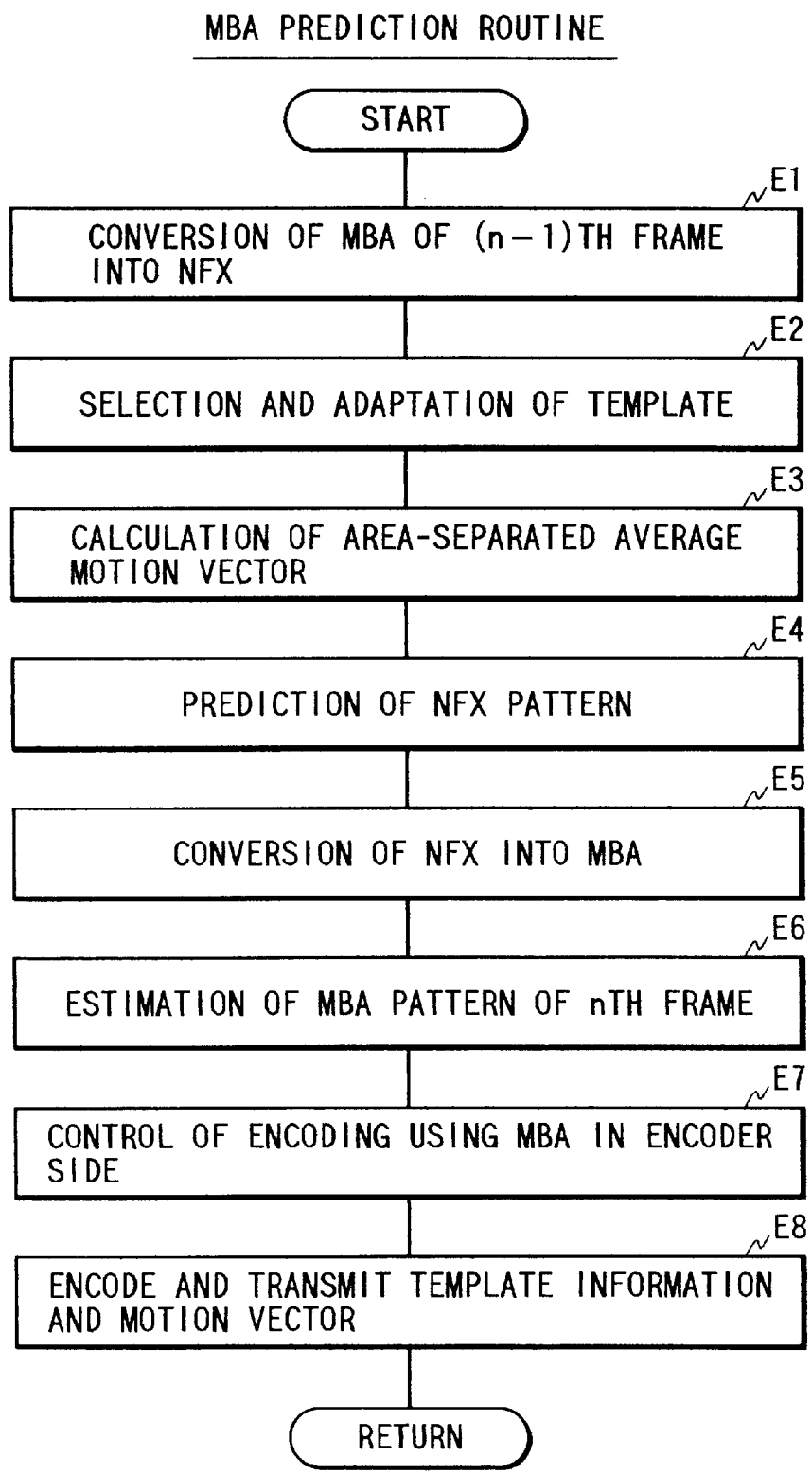

FIG. 39
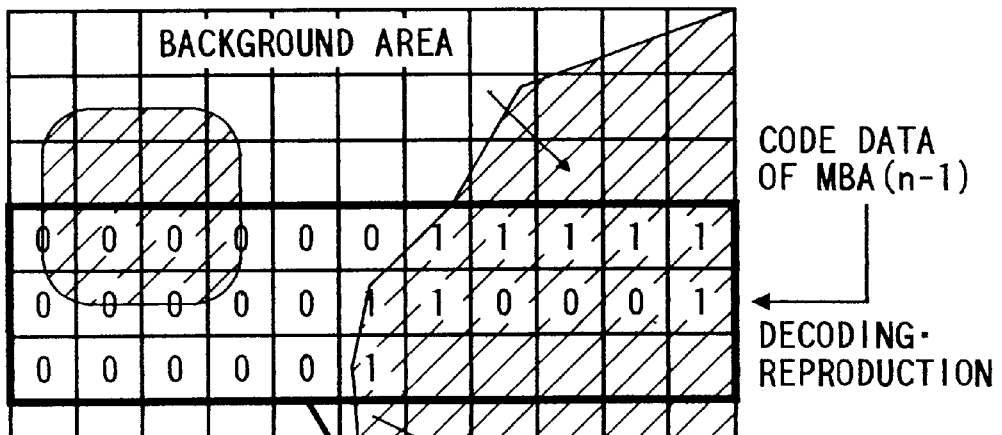
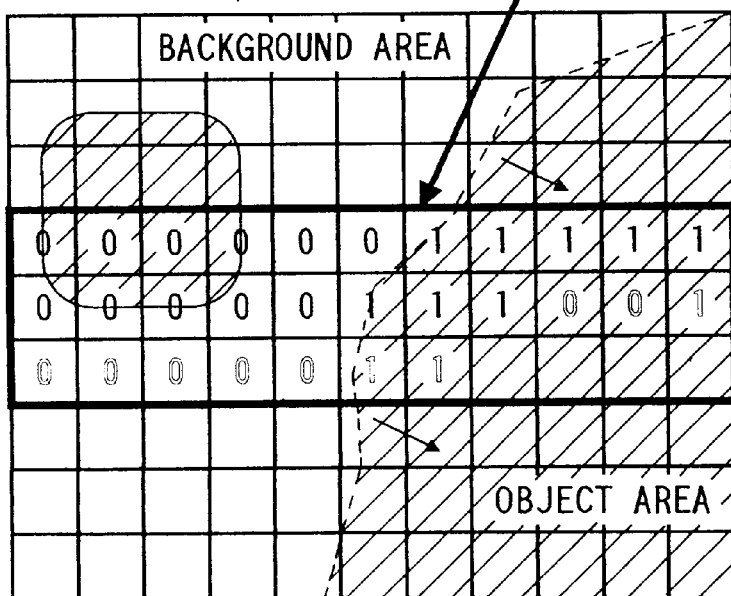

REDUCTION OF CODE QUANTITY BY AREA-SEPARATED AVERAGE MOTION VECTOR

AREA-SEPARATED QUANTIZATION
IN PERSON MODE

EXAMPLE OF QUANTIZATION
TEMPLATE

MODEL-BASED TRANSMISSION OF QUANTIZATION TEMPLATE

REDUCTION OF CODE QUANTITY BY AREA-SEPARATED AVERAGE MOTION VECTOR

AREA-SEPARATED MOTION COMPENSATION PREDICTION

FIG. 62
DEFINITION OF CBP
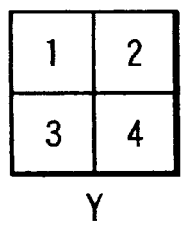
Y
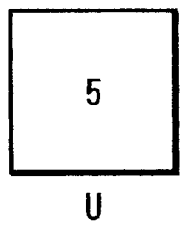
U
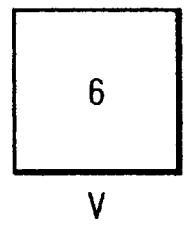
V
CBP = 32P1 + 16P2 + 8P3 + 4P4 + 2P5 + P6
Pn : THIS ASSUMES 1 WHEN ANY ONE OF TRANSFORM COEFFICIENTS IN nTH BLOCK IS NOT 0, OTHERWISE 0
FIG. 63
CONVERSION INTO YUV VECTOR
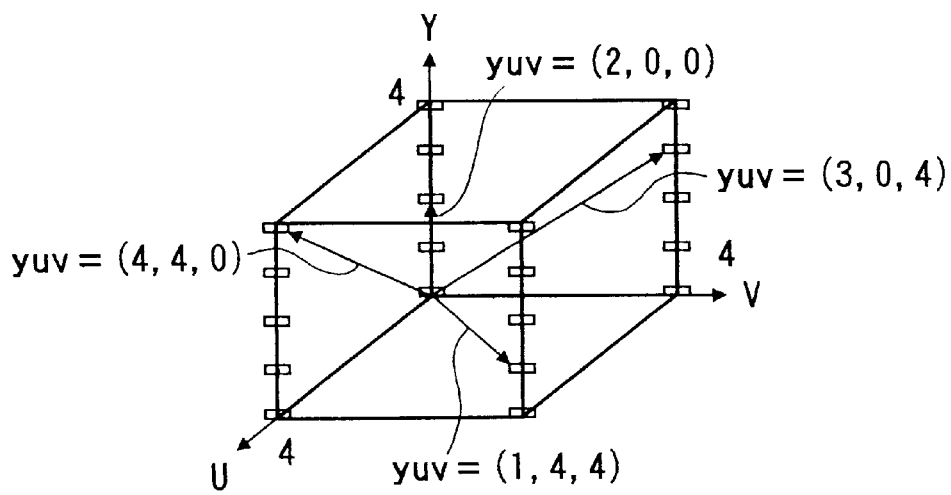
SINCE Y HAS 4 BLKs, VARIATION OF Y ASSUMES 0 TO 4. ACCORDINGLY, THE MAXIMUM VALUES OF U AND V ARE SET TO 4. THAT IS, YUV VECTOR = (4 TO 0, 4/0, 4/0)
  (EXAMPLE) WHEN cbp = 48 = [011000], yuv = (2, 0, 0)

GRID OF GOB, MBK IN CIF FORMAT

BLOCK-LIKE ERROR PATTERN

FIG. 66

```
              NORMAL BIT STREAM
CORRECT
   ↓
  [1] 1 1 1 0 1 0 1 1 1 0 1 1 1 0 1 1 0 1 1 0 1 0

1       →  MBA = 1

1       →  MTP = 1  →  CBP, TCOEF 1 1 0 1 →  cbp = 4

0 1 1 1 0 1 1 1 →  Y4 − BLK/INTRA_DC = 119

0 1 1 0  →  (Run, Level) = (1, 1)

1 1 0    →  (Run, Level) = (0, 1)

1 0      →  EOB (End Of Block)
```

(a) EXAMPLE OF CORRECT INTERPRETATION

```
          BIT STREAM CONTAINING BIT ERROR
BIT ERROR
   ↓
  [0] 1 1 1 0 1 0 1 1 1 0 1 1 1 0 1 1 0 1 1 0 1 0

0 1 1    →  MBA = 2

1        →  MTP = 1  →  CBP, TCOEF 0 1 0 1 1 →  cbp = 1

1 0 1 1 1 0 1 1 →  V − BLK/INTRA_DC = 187

0 1 1 0  →  (Run, Level) = (1, 1)

1 0      →  EOB (End Of Block)
```

(b) EXAMPLE OF INTERPRETATION THAT IS CORRECT
    IN GRAMMER BUT ERRONEOUS IN SIGNAL

PICTURE SIGNAL ENCODING SYSTEM, PICTURE SIGNAL DECODING SYSTEM AND PICTURE RECOGNITION SYSTEM

BACKGROUND OF THE INVENTION

1. Field of the Invention

The present invention relates to a picture signal encoding system for encoding and transmitting a picture signal in the form of an encoded bit stream compressed with a variable-length code, a picture recognition system for recognizing an object in the process of encoding an picture signal, and a picture signal decoding system for receiving such an encoded bit stream to decode it into a picture signal and for further having a function to eliminate the errors that take place in the picture signal.

2. Description of the Prior Art

Recently, information communication terminals or stations have abruptly been coming into multimedia, and even in the field of telephones, various additive values on a digital data transmission really need to be created for the future business development. Particularly, in the field of PHS (Personal Handy Phone System), studies have on a full scale been made for the purpose of, in addition to the conventional audio and character information communications, transmitting natural still pictures and motion pictures. Thus, the telephones are also expected to come into multimedia in near future. However, a problem still remains in that difficulty is encountered in the transmission of TV images of a signal quantity corresponding to approximately 166 Mbps in a non-compressed condition through the PHS (of 384 kbps, 32 or 48 kbps is assigned for the image) or through the existing transmission route (10 kbps) of a telephone line.

One possible solution may be to employ the motion picture compression technique for the conventional TV conference systems or video CD systems. However, for example, the current TV conference standard or specification ITU-T/H.261 is made to cover 64 kbps to 2 Mbps while ISO/MPEG1 is made to accept approximately 1.5 Mbps, and hence these standards can not cope with an extremely low rate transmission below 64 kbps. Incidentally, although the H. 263 standard advised in November, 1995 is made to handle 4.8 kbps to 64 kbps, its content is still unknown to make difficult the recognition of its method. Besides, that standard does not accept the connectability with the H.261.

Moreover, such a motion picture compression technique is principally for wire-based communications and can not completely demonstrate the countermeasures against the level (approximately $10^{-2}$ to $10^{-3}$) of the data transmission error that will take place in the wireless communications such as a mobile communication. Generally, the wireless systems employ the so-called demand refreshing method implementing a retransmission request based on ARQ (Automatic Repeat Request). There is a problem which arises with the use of the ARQ, however, in that in the reception side the freeze of the picture is unavoidable before the completion of the retransmission of the image information. For this reason, if the radio transmission circumstances go worse, the picture-frozen state can continue to virtually make impossible the motion picture transmission.

On the other hand, for the still picture transmission, there has been proposed a rate-controlling way in which the data are classified in groups in accordance with their degrees of significance, but it still has not been put to practical use. Further, for the transmission rate of approximately 384 kbps, there has been reported a method which copes with the transmission errors by means of a data transmission sequence and an error correcting code, which however is not a candidate for the extremely low rate wireless transmission below 64 kbps.

SUMMARY OF THE INVENTION

It is therefore an object of the present invention to provide a picture signal encoding and image recognition systems which are capable of greatly suppressing the necessity of the data retransmission mode and the occurrence of the picture freeze concurrently with transmitting a motion picture through extremely low rate transmission systems such as a PHS and a digital portable telephone system, and further to provide a picture signal decoding system which is capable of involving an excellent error correction function and, hence, also capable of greatly controlling the occurrence of the data retransmission mode and the outbreak of the picture freeze even in the case of transmitting a motion picture through the extremely low rate transmission systems.

In a picture signal encoding system according to the present invention which compresses a picture signal with a variable-length code to produce and transmit encoded bit stream data, mode control means sets a mode condition corresponding to an incidental situation of a picture for performing an encoding processing of the picture signal under the mode condition, while mode setting means adds a code corresponding to the mode condition to the encoded bit stream data at that encoding processing under the mode condition (claim 1). Thus, the occurrence quantity of the code related to the incidental situation set in advance as the mode condition is reducible, thereby realizing an extremely low rate transmission. In addition, the addition of mode condition indicative of the incidental situation in the encoding processing of the picture signal can make the matching with the mode information to provide an error correction function when an error due to the transmission error occurs during the decoding processing.

Furthermore, the mode control means can set a mode corresponding to a use environment as the incidental situation to increase the limited conditions for the encoding processing when using a use environment with a high use frequency, with the result that the occurrence of the code quantity is reducible. In this case, the mode control means is constructed to set as the use environment mode a fixed mode and a movable mode for each of an interior of a motor vehicle, an indoor spot and an outdoor spot, which can greatly reduce the code occurrence quantity by the increase in limited elements.

The mode control means can further set as the incidental situation a mode corresponding to a subject, with the result that, if a person or a landscape is set as the subject and when the information corresponding to the modes are stored in the person information storage means, the encoding processing can be made on the basis of the corresponding limited element to reduce the code occurrence quantity. In this case, the mode control means sets as the subject mode a person mode, a landscape mode and a stationary object mode and hence, if the mode is set in accordance with the situation of the picture, the code occurrence quantity is significantly reducible. Moreover, in the person mode, the mode control means performs the switching operations among a head portion mode, an upper-half portion mode, a full-length mode and a plural-person mode in accordance with a distance up to a person, thus reducing the code occurrence quantity through fine control.

Furthermore, the mode control means is made to set an encoding control mode so that the encoding processing is made under a specific condition, thus reducing the code occurrence quantity. In this instance, in the encoding control mode the mode control means sets a motion picture mode, a quasi-motion picture mode, a still picture mode and a background mode so that the mode setting is selectively carried into effect in accordance with a transmission condition and a picture quality condition to encode and transmit the picture signal adaptable to the picture within a given range of code occurrence quantity.

The mode control means sets as the encoding control mode a scene center preference mode to perform the encoding processing in which a larger quantity of bits are assigned to a portion which takes a high probability that it is positioned at a center portion of a scene captured, which allows proper encoding processing of the picture signal corresponding to the scene taken at random. Further, the mode control means sets as the encoding control mode an object area preference mode so that a larger quantity of bits can be assigned for the information on an attracted object area or assigned to other portions through different mode control for the object area or region.

The mode control means sets as the encoding control mode a motion preference mode for maintaining a frame rate in such a manner that the scene center preference mode and the object area preference mode are selectively switched in accordance with an occurrence quantity of a motion area in the scene, thus suppressing the code occurrence quantity. Moreover, the mode control means sets as the encoding control mode a model-based mode so that the position information or the color information corresponding to its motion is transmitted as the encoding data on the basis of a three-dimensional model, with the result that it is possible to implement the encoding control to suppress the code occurrence quantity to the utmost. In this instance, the mode control means calculates distance information on the basis of a two-dimensional template corresponding to a scene set in advance, and estimates a positional attitude of the three-dimensional model from the positional data of the feature area on the basis of two-dimensional motion information. Moreover, the mode control means transmits forced INTRA frame data at the time of the start of communication and makes a model-based prediction of a frame at the time of the start of the transform to transmit necessary data, with the result that the motion picture reproduction becomes possible at the time of the start of conversation.

Furthermore, the mode control means determines a transition between modes in accordance with a given transition decision condition. In this case, the mode control means is made to allow manual and forced setting of the inter-mode transition to set the essential mode by force in accordance with the use mode by the user, so that quick and sure processing become possible. In addition, the mode control means carries out the transmission in the mode decided according to an analysis of the picture signal, with the result that, when the state of the picture signal is adaptable to a mode, the encoding processing can be made in that mode. Further, when information necessary for the decision (judgment) according to the picture signal analysis lacks, the mode control means automatically shifts to a mode with a higher transmission probability in the actual use. In this instance, when an evaluation calculation is made of the transition result based on the transition probability and shows that an error value goes large, the mode control means updates the transition probability value so that the error value becomes smaller. Accordingly, it is possible to achieve the inter-mode transition suitable for the use state as the use advances. Moreover, the mode control means certainly performs the evaluation calculation to the decision result through the employment of a two-dimensional template, a color analysis result, a velocity and acceleration evaluation, and so on. Still further, a human interface is used to give the set information to the user for suiting the incidental situation corresponding to the mode set state by the mode control means, which also contributes to the reduction of the code occurrence quantity. In addition, Furthermore, in the system, object area extraction means extracts an area of an object existing in a scene, and encoding means adds to the picture signal the attribute data of the object area extracted by the object area extraction means and then transmits it, thus reducing the transmission quantity. In this case, for extracting the object area, the object area extraction means detects the area of the occurrence of a motion vector being the attribute information designated in block units. At this time, the object area extraction means detects an occurrence area of the motion vector through the analysis in the time direction over three or more frames, with the result that the object area is certainly detectable. Further, the object detects a block in which a maximum motion vector occurs and estimates as a main area an area including the maximum motion vector occurrence block, so that the object area can be extracted in a high probability. Still further, for the detection of the maximum motion vector the object area extraction means subtracts a panning vector given through the panning vector calculation means and then extracts the object area.

Moreover, for extracting the object area the object area extraction means calculates the feature quantity on the basis of the block patterns comprising motion blocks and performs the scaling in accordance with the presence or absence of the template information, with the result that it is possible to quickly carry out the selection of the template and the adaptive processing. In this case, the object area extraction means performs a model-based transmission of the template information as the attribute information in block units (29) and analyzes a pattern taken when the object in the scene moves two-dimensionally to simply detect the motion.

Furthermore, in the person mode under a limited environment, the object area extraction means produces a two-dimensional template through the perspective transformation of a three-dimensional model, and the object area extraction means decides a category of the object area on the basis of a control state based on mode information, with the result that the shifting to the decision condition for performing the state transition becomes possible. In addition, the object area extraction means decides the category of the object area in accordance with a state transition condition in mode control. On the other hand, the object area extraction means can decide the category of the object area on the basis of attribute information set in units of a block.

Still further, the object area extraction means performs the area extraction processing at the time of transmission of a forced INTRA frame and designates and transmit information on a background area estimated from the object area at that time. This allows appropriately performing the decoding processing using this information in the decoder side. In this instance, the object area extraction means stores the background information on the basis of the information designated in the decoder side to reproduce the background area information with reference to the stored information when the information quantity on the object area portion increases, which can maintain the motion picture reproduction while preventing the increase in the code occurrence quantity. Moreover, in performing the encoding processing, the data whereby the information designated as the background information is combined with the person information being under transmission is provided so that in the decoder side the picture to which the background area picture is added is reproducible in such a manner that the person picture reproduced by the person information in the object area portion is combined with the background area information decoded in terms of a past frame.

Moreover, encoding control means controls the code occurrence quantity in accordance with the picture signal so that it becomes below a given level to produce bit stream data, so that a proper encoding processing for the motion picture transmission becomes possible under an extremely low rate restriction. In this case, the encoding control means encodes the picture signal by reducing the number of codes indicative of a header and a number for a block group comprising one frame to half of the number of block groups in such a way that, for example, they are omitted at every even number, thus decreasing the code occurrence quantity. In addition, the encoding control means performs the substitute so that a short code length is assigned to a variable-length code indicative of the macroblock attribute which has a high occurrence frequency.

The encoding control means is equipped with adaptive control means for executing adaptive control of a decision characteristic taken for a decision of an attribute set in units of a block. In this case, the adaptive control means executes the adaptive control on the basis of area information in a frame or executes the adaptive control in accordance with a buffer quantity to make a decision on whether to choose an INTER frame, an INTRA frame, or executes the adaptive control in accordance with a buffer quantity to make a decision on whether or not to make a motion compensation. Further, the adaptive control means or the encoding control means predicts an attribute of a frame to be encoded, on the basis of encoding attribute data obtained in terms of the past frame to control the code occurrence quantity, performs the attribute prediction in units of a block on the basis of each of the past encoding attribute data in a macroblock layer, or carries out the attribute prediction in units of a block on the basis of area information.

A quantization control means is further provided for controlling a quantization step in encoding the picture signal, which can produce a bit stream enabling effective motion picture reproduction so that the code occurrence quantity does not exceed a given value. In this instance, the quantization control means assigns the quantization step using the information on every area such as an object area and a scene center. Further, the quantization control means assigns the quantization step in accordance with a buffer quantity to control the code occurrence quantity so that the buffer quantity does not exceed a given value.

Moreover, the quantization control means sets the quantization step in accordance with an encoding rate of the picture signal, thus preventing the deterioration of the picture quality due to the change of the encoding rate and the increase in the code occurrence quantity. In addition, since the quantization control means assigns the quantization step to the information occurrence quantity itself at the time of the encoding processing, the appropriate quantization is possible in accordance with the frame information quantity at that time. Further, the quantization control means decides the information occurrence quantity on the basis of the result of a calculation of a degree of an intensity of motion or movement of the current frame with respect to that of the past frame. Accordingly, it is possible to perform the motion picture transmission giving priority to its motion while suppressing the code occurrence quantity even if the motion is intensive. The same effect is attainable even by deciding the information occurrence quantity on the basis of the result of calculation of the degree of intensity of a color variation of the current frame with respect to that of the past frame. Further, the quantization control means can also make a decision in accordance with the result of a calculation of an increment of a virtual buffer quantity in the setting of the quantization step based on the degree of intensity of motion or the degree of intensity of a color variation.

The encoding control means is provided with limiting means for controlling the number of significant coefficients of transformation coefficients after quantization in units of a block so that it is below an upper limit value determined in accordance with various conditions, which enables an appropriate motion picture transmission and substantially prevents the deterioration of the picture quality while reducing the information occurrence quantity. Further, the encoding control means is provided with switching means for switching a frame rate in accordance with the information occurrence quantity. Thus, the encoding control means can take measures such as lowering the frame rate when the information occurrence quantity increases and, hence, can suppress the increase in the code occurrence quantity while preventing the deterioration of the picture quality.

Furthermore, the encoding control means executes the encoding control based on a picture encoding under one of the H.261 standard and the MPEG standard so as to reduce the code occurrence quantity, thereby realizing the extremely low rate transmission while keeping the structure according to the existing standard. In addition, the encoding control means is equipped with data transform means made according to the H.261 standard which is designed to carry out the processing such as a simple substitute and a code addition. Thus, the transmission and reception of the picture signal become possible in a state with providing a simple exchangeability.

Furthermore, in accordance with this invention, there is provided a picture signal recognition system which analyzes a picture signal in the process of encoding the picture signal to recognize an object existing in an area of a frame. In this system, mode control means stores a mode condition setting an incidental situation with a code determined in advance and recognizes the picture signal under said mode condition. The mode control means sets three-dimensional model data indicative of an object shape by a rough three-dimensional model and further setting a model-based mode to produce, as encoding data, one of positional information and color information relative to the three-dimensional model data. That is, the model-based mode is set as the encoding control mode, and through the use of a three-dimensional model the positional information or the color information corresponding to its motion is transmitted as the encoding data, thus enabling the encoding control so that the code occurrence quantity is suppressed to the utmost. In this case, the mode control means calculates distance information on the basis of a two-dimensional template and estimates a positional attitude of the three-dimensional model from positional data of the feature area on the basis of two-dimensional motion information. When information necessary for the decision according to the picture signal analysis lacks, the transition is automatically made to a mode with a higher probability on the basis of the transition probability values set in advance. In this instance, when an evaluation calculation is made with respect to the mode transition decision based on the transition probability value and shows that an error value goes large, the mode control means updates the transition probability value so that the error value becomes smaller.

Accordingly, the inter-mode transition adaptable to the use mode is achievable with use. The aforesaid evaluation calculation can surely be made through the use of the two-dimensional template, the color analysis result, and velocity and acceleration evaluation, and so on. On the other hand, the mode control means gives set information through a human interface to the user so that an incidental situation corresponding to a given mode setting state is taken, which can contribute to the reduction of the code occurrence quantity.

Moreover, the object area extraction means extracts an area of an object existing in a scene, and encoding means adds the object area information as the attribute data to the picture signal and transmits the resultant, thereby reducing the transmission quantity. In this instance, the object area extraction means extracts the object area by detecting the occurrence area of a motion vector being the attribute information designated in block units. Further, the object area extraction means detects an occurrence area of the motion vector through the time-direction analysis over three or more frames. This allows sure detection of the object area. In addition, the object area extraction means detects a block in which a maximum motion vector occurs and estimates as a main area an area including the maximum motion vector occurrence block. Accordingly, the object area can be extracted in a high probability. For the detection of the maximum motion vector the object area extraction means, through panning vector calculation means, calculates a panning vector and subtracts the panning vector before the extraction of the object area.

Furthermore, for extracting the object area the object area extraction means decides a block pattern comprising motion blocks to calculate its feature quantity and scales a corresponding template in accordance with the presence or absence of the template information. Thus, it is possible to quickly execute the template selection and the adaptive control. In this case, the object area extraction means performs a model-based transmission in a state that the template information is treated as the attribute information in block units. In addition, the object area extraction means analyzes a pattern taken when the object in the scene moves two-dimensionally, thus simply detecting its motion.

Still further, in the person mode under a limited environment, the object area extraction means produces a two-dimensional template through the perspective transformation of a three-dimensional model. The object area extraction means decides a category of the object area on the basis of a control state according to mode information, whereupon a decision condition can be taken for the state transition. In addition, the object area extraction means decides the category of the object area on the basis of a state transition condition in mode control. That is, the decision of the category of the objection area is made in accordance with the state transition condition in the mode control. The decision of the category of the object area can also be made on the basis of attribute information set in units of a block.

Moreover, the object area extraction means always performs the area extraction processing at the time of transmission of a forced INTRA frame and designates and transmit information on a background area estimated from the object area. Accordingly, the decoder side can surely perform the decoding processing through the use of this information. In this case, the background information is stored on the basis of the information designated in the decoder side, and hence, when the information quantity on the object area portion increases, the background information can be reproduced with reference to the stored information, which can maintain the motion picture reproduction while preventing the increase in code occurrence quantity. Further, in the encoding processing the information designated as the background information is combined with the person information being under transmission, with the result that the decoder side can reproduce the background area added picture in such a manner that the person picture reproduced on the basis of the person information on the object area portion is combined with the background area information decoded in the past frame.

Moreover, in accordance with this invention, there is provided a picture signal decoding system which receives a picture signal transmitted in the form of an encoded bit stream compressed with a variable-length code to decode it to reproduce the picture signal. In this system, NFX transform means detects MBA data included in the picture signal corresponding to one frame for the transform between the fixed (FXD) data and the non-fixed (NFX: NOT-FIXED) data, while on the basis of the transform result of the past frame (for example, the last frame) by the NFX transform means prediction means predicts an NFX pattern singly corresponding to an MBA pattern by shifting the region through the use of the average motion vector information or the like. In addition, calculation means calculates the degree of similarity between the NFX data pattern predicted by the prediction means and an NFX pattern being under decoding and further calculates the degree of its reliability, while on the basis of the calculation result evaluation means evaluates the MBA being under decoding in accordance with a condition set in accordance with the degrees of the similarity and reliability, and in response to the detection of an error, correction processing is made such that it is replaced with the MBA data based on the estimated NFX pattern or relies upon a different correction means. This arrangement allows the decoding error correction based on the estimated data depending on the past attribute data.

On the other hand, in a decoding system, comparative area setting means sets a comparative area in relation to the MTP of the block being currently under decoding on the basis of the MTP pattern of the past frame detected by MTP detection means and the motion vector value, while in the comparative area set in relation to the block being currently under decoding, calculation means calculates the degree of similarity between the MTP data estimated by the MTP detection means and the MTP data being currently under decoding, for example, by integrally obtaining a score representative of the degree of coincidence among attribute data according to a method in which the attribute included is weighted and then the score values are summed, and further calculates the degree of reliability of the calculated similarity. In addition, on the basis of the calculation result, evaluation means decides, for example, that the MTP being under decoding is correct when both the similarity and reliability are high, while choosing one of the decoded result and the estimated value to adopt it as the decoded result when at least one of them is low. This arrangement permits the MTP decoding processing with a high reliability concurrently with performing the error correction.

Moreover, in a decoding system, MV data estimation means estimates a motion vector, being currently under decoding, from the MV data of a past frame transformed by MV transform means or MV data of a peripheral block. In this case, the motion vector MV data thus estimated has a considerably high reliability since the continuity from the peripheral block or the past frame is high as long as the scene change or the INTRA frame is not taken. Further, error correction means calculates the error between the MV data based on the MVD data being under decoding and the estimated MV data to decide in accordance with the magnitude of the error whether the MVD data being under decoding is correct or not. If the error is large, it temporarily employs the MVD data being under decoding or replaces the data with the MVD data based on the estimated MV data to selectively use one of them as the decoded result. Thus, it is possible to carry out the decoding processing with a high reliability while performing the error correction.

Furthermore, in a decoding system, YUV vector transform means transforms the CBP data into a YUV vector which is comparable in quantity, and comparative area setting means sets a comparative area by making a motion compensation of a portion corresponding to the comparative area using a motion vector on the basis of the YUV vector of the past frame transformed by the YUV vector transform means. Further, YUV vector estimation means estimates a YUV vector of a block being under decoding on the basis of the YUV vector of a past frame within the set comparative area or a YUV vector value of a peripheral block. In this case, the YUV vector thus estimated has a considerable high reliability since the continuity from the peripheral block or the past frame is high as long as the scene change or the INTRA frame is taken. Error correction means calculates as the absolute distance or the like the error between the YUV vector data based on the CBP being under decoding and the estimated YUV vector data to decide in accordance with its magnitude whether the CBP data is correct or not. If the error is large, the error correction means temporarily employs the CBP data being under decoding or replaces it with the CBP data based on the estimated YUV vector data to employ the selected one as the decoded result. Accordingly, it is possible to carry out the decoding processing of the CBP data with a high reliability.

Still further, in a decoding system, when the mode information is included in the picture signal, mode control means sets the mode condition designated by the mode information for the decoding processing, and when the decoding processing result of the picture signal is not adaptable to the set mode condition, error correction means performs the error correction by giving priority to the mode condition. Accordingly, the quantity of the information of the picture signal is reducible, while the incidental situation similar to the mode condition in the transmission side is set, thereby improving the error correction ability in the decoding process.

The use environment or the subject is set as the mode condition in the above-mentioned mode control, so that the decoding processing and the decoding error correction processing are effected on the basis of the data stored in the person information storage means or the background information storage means in accordance with the set use environment or subject. That is, since there are limited elements naturally determined in accordance with the difference among the use environments such as the use in the interior of a motor vehicle, the use in an indoor place or an outdoor place, the difference among the camera use conditions such as the use in a fixed state and the use in a movable state, and the difference among the subjects such as a person and a landscape, the error correction function in the decoding processing are improved by taking these limited elements into consideration (use environment modes).

Furthermore, an encoding mode is set as the mode condition in the mode control. The mode control means sets a decoding condition on the basis of the set encoding mode information, while the error correction means checks the conformity to the encoding mode condition to improve the error correction ability. In this instance, among the encoding mode are a motion picture mode, a quasi-motion picture mode and a still picture mode. A model-based mode is also selectable. These modes are selectively set in accordance with the communication path conditions, the transmission rate restrictions, and so on. In addition, when the decoding stopping takes place because of, for example, the error included in the picture signal during the decoding processing, the error correction function selectively sets the four request signals to transmit it to the transmission side, with the result that the reproducing picture level is switched hierarchically in accordance with the communication path conditions or the like to prevent the decoding stopping from continuing. Further, the person picture of a specific person is registered in the person information storage means if required, and therefore, it can adequately be read out when the mode control means performs the mode control and can be read out even at the time other than communications when needed in order to confirm the registered condition of the person. This can make the system more available. In addition, the individual information in the person information storage means is used in the model-based mode. Accordingly, even if the communication situation goes worse, the movements of the other party are reproducible to some extent on the basis of the person picture being the registered individual information under the model-based mode control.

Moreover, color information estimation means estimates color information of each of blocks of pixel data decoded on the basis of the past color information data and the color information of a peripheral block. This estimation is based on the fact that the normal picture signal has a tile configuration corresponding to the grid or lattice of the pixel block and the probability that a color different from the color of the peripheral block accidentally appears is very low. Further, error evaluation means calculates the error value between the color information data obtained by the decoding process of the object block and the color information data estimated by the color information estimation means, and error correction means decides that the picture signal is correct when the error value is small while replacing the color information data of the object block with the color information data estimated by the color information estimation means for the error correction when the error value is large. Thus, it is possible to improve the error correction ability in the decoding processing of the color information in the signal level. That error correction has hitherto been impossible in the code level or in the pattern level. In this case, when the error value between the color information data of the object block and the estimated color information is large, returning to the code level the error correction is made by retrieving an ESC code (escape code) indicative of the fact that the code describing the orthogonal transformation coefficient data is written by a fixed-length code but not a variable-length code. That is, transformation coefficient decoding means detects the ESC code to the degree of similarity between the ESC code at that time and the variable-length code decoded before the correction, and ESC position storage means stores the position thereof that the bit coincidence is above a given value (for example, 5 bits of 6 bits) so that the decoding processing again returns to a stored different position to carry out the decoding of the picture signal at the time of the error detection of the signal level and the error correction means again makes the evaluation. Accordingly, the operation returns to the code level when the detection of the decoding error in the signal level is made, thus exerting a high-accuracy error correction function.

In addition, in the case that the color information data detected in the picture signal decoding processing is replaced with the estimated color information or the like, since for the performing the decoding processing for the next block there is a need for determining the position of the decoding resumption of the encoded bit stream in the code level, EOB detection means retrieves an EOB code representative of the end position of the data of each of blocks. That is, when the EOB detection means does not detect the EOB code in the object block within a given condition range, the error of 1 bit is expected and the detection of the EOB code is again carried out. When satisfying the given condition range, the detected code is specified as the EOB code to resume the decoding processing. Further, in the case that the color information of the pixel data obtained by the decoding processing in block units involves an error, the error correction means estimates color information from past color information or color information of a peripheral block for an error correction, and error propagation prevention means requests from a transmission side periodical transmission of forced INTRA block data in terms of the picture signal in block units in terms of the picture signal in block units which corresponds to a an important area of a decoded picture in accordance with the frequency of the error correction by the error correction means. Accordingly, even if the error due to the error correction is accumulated, since the block data refreshed is periodically obtained on the basis of the forced INTRA block data, it is possible to prevent the turbulence of the picture signal coming from the accumulated error.

Furthermore, in a decoding system, area specification means specifies an object area on the basis of area information data described in a user data area of the encoded bit stream data, so that error correction means can correct an error included in the picture signal in the process of a decoding processing of the object area specified by the area specification means, on the basis of the area information data. In this case, a plurality of basic templates is provided, so that the area specifying means selectively sets the basic template designated by the area information described in the encoded bit stream data from the transmission side and specifies its portion by deforming the set basic template so that it confirms to the object area. In addition, the plurality of basic templates are hierarchically provided to express the specified portion in the form of a two-dimensional coordinate in the basic template. Moreover, the system further comprises motion compensation means for, when the area specification means specifies an area including a block being currently under decoding, performing a motion compensation for the block on the basis of a motion vector of a block of an area already decoded. Further, the system includes color information compensation means for correcting color information of the block on the basis of color information including a luminance, a color and a texture in a block of an area already decoded. Still further, when an error occurs during the decoding of the picture data in the background area, the error correction effects the correction on the basis of the background information in the background information storage means.

Furthermore, in a decoding system, pseudo area specification means specifies a pseudo object area by performing an evaluation calculation centering on the center of gravity of a picture on the basis of pattern information data of a past frame when an object is not specified from a decoded result of the picture signal. Moreover, in a decoding system, code check means globally checks or collates the start code of a specific bit pattern indicative of the head position of one frame with respect to the bit stream data accumulated in the buffer (108). For starting the decoding processing it is possible to effectively obtain the other information with reference to the frame starting position. Further, the code check means performs the global checking in a similar way to detect a GOB (group-of-blocks) start code of a specific bit pattern positioned at a head portion of a first block group of a plurality of block groups of the pixel data corresponding to one frame. Accordingly, it is possible to more effectively effect the decoding processing. Moreover, when the bit error rate in the specific bit pattern is below a given value, the code check means specifies the bit pattern as the start code in carrying out such a global checking the bit stream data. Thus, even if the bit error is introduced, it is possible to specify the start code in a high probability and, hence, to prevent the retrieval impossible to the utmost. Further, the code check means specifies the start code on the basis of data indicative of a necessary number of bits subsequent to the start code while taking the correlation with the other start codes. Thus, even if the data indicative of the necessary number of bits involves an error, it is possible to specify the correct position of the start code. Still further, for detecting the necessary number of bits, the code check obtains the detected bit pattern of the GB start code as inversion pattern data in which a higher rank side and a lower rank side are interchanged. Accordingly, when the data indicative of the necessary number of bits set in the transmission side is within a given bit range, the number of bits to be used for that data is reducible.

BRIEF DESCRIPTION OF THE DRAWINGS

The object and features of the present invention will become more readily apparent from the following detailed description of the preferred embodiments taken in conjunction with the accompanying drawings in which:

FIG. 15 is an illustration for describing an operation of area setting with a distance scale;

Figure 20:
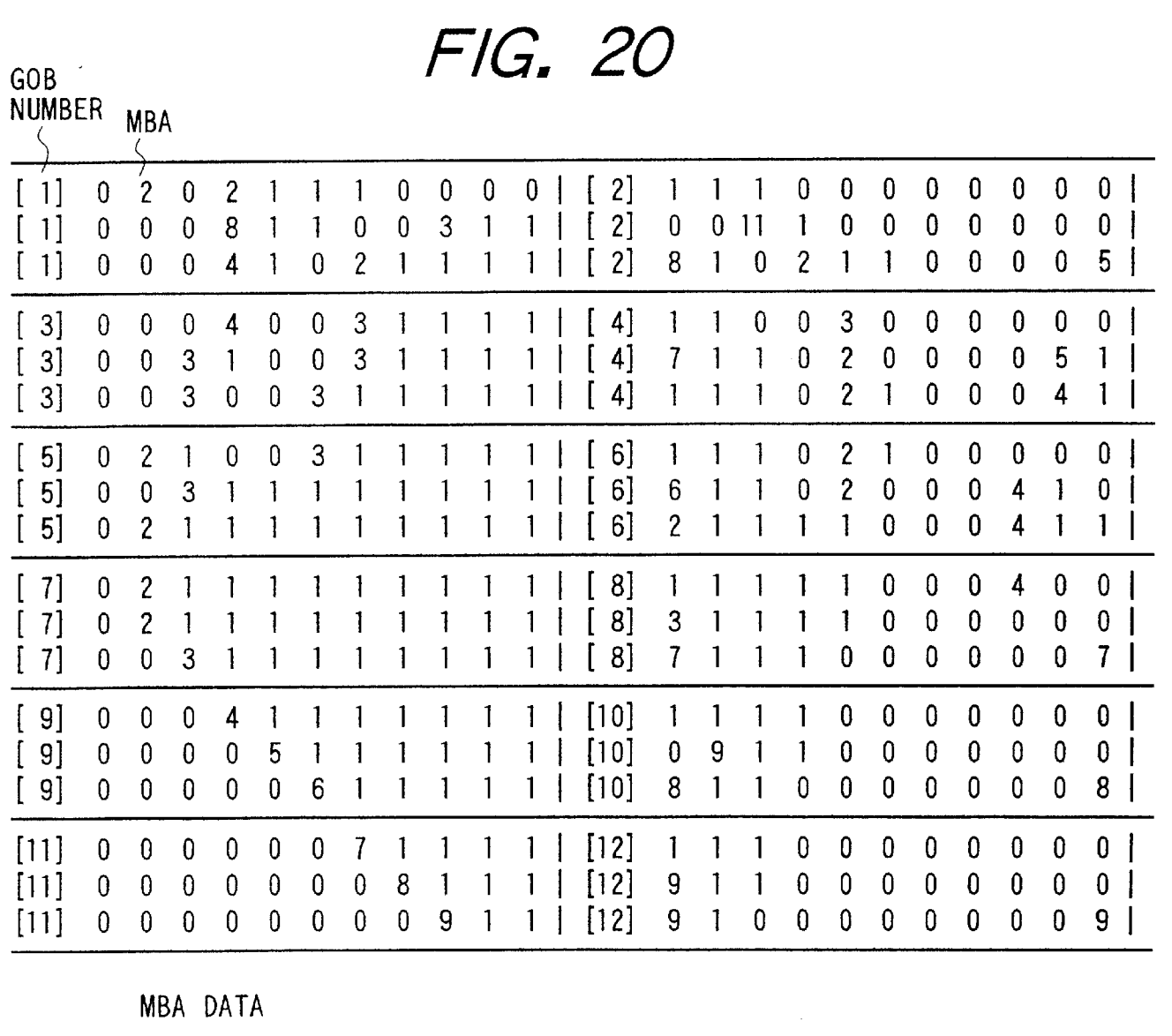

FIG. 20 shows an example of a macroblock attribute array based on an H.261 syntax;

FIG. 21 shows another example of a macroblock attribute array based on an H.261 syntax;

FIG. 22 shows a further example of a macroblock attribute array based on an H.261 syntax;

FIG. 24 is an illustration for describing an operation for a motion area extraction and a template decision;

FIG. 33 is a comparison table of a variable-length code (VLC) of MTP in the H.261 standard;

FIG. 34 is a correspondence table between a code length and a occurrence probability of each MTP value with respect to a person picture;

FIG. 37 is a flow chart showing an MBA prediction routine;

FIG. 39 is an illustration for describing a prediction of an MBA pattern from the previous frame;

FIG. 62 is an illustration for describing the definition of CBP;

FIG. 63 is an illustration for describing a transformation processing from a CBP value to a YUV vector;

FIG. 66 is an illustration for describing an interpretation error of a bit stream caused by a bit error in a picture signal level and the influence on a signal error;

DETAILED DESCRIPTION OF THE INVENTION

Figure 1:
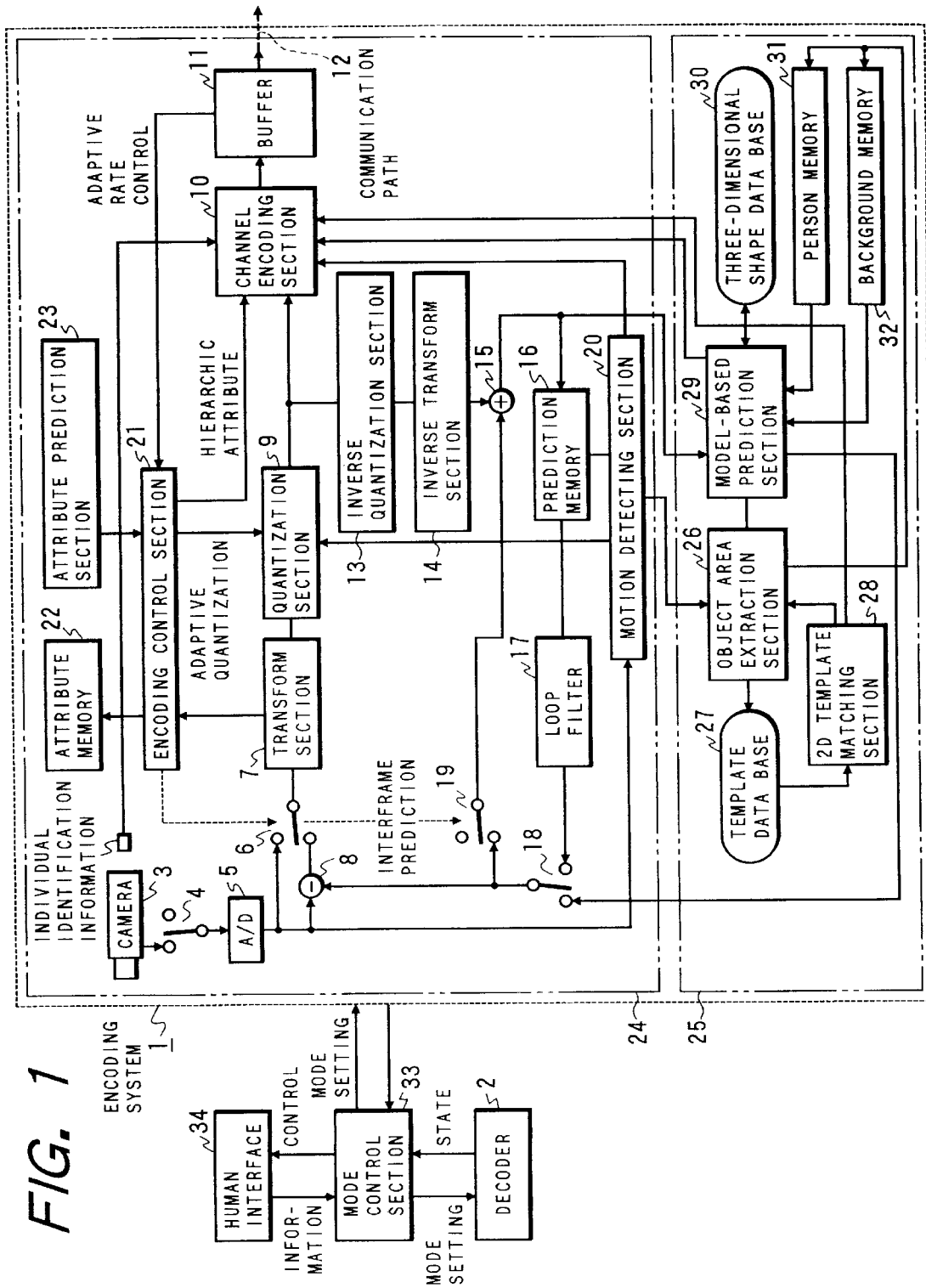
FIG. 1 is a block diagram showing an arrangement of an encoder according to a first embodiment of the present invention.

Referring now to the drawings, a description will be made hereinbelow of embodiments of the present invention on the supposition of the applications to automobile telephone systems.

Figure 2:
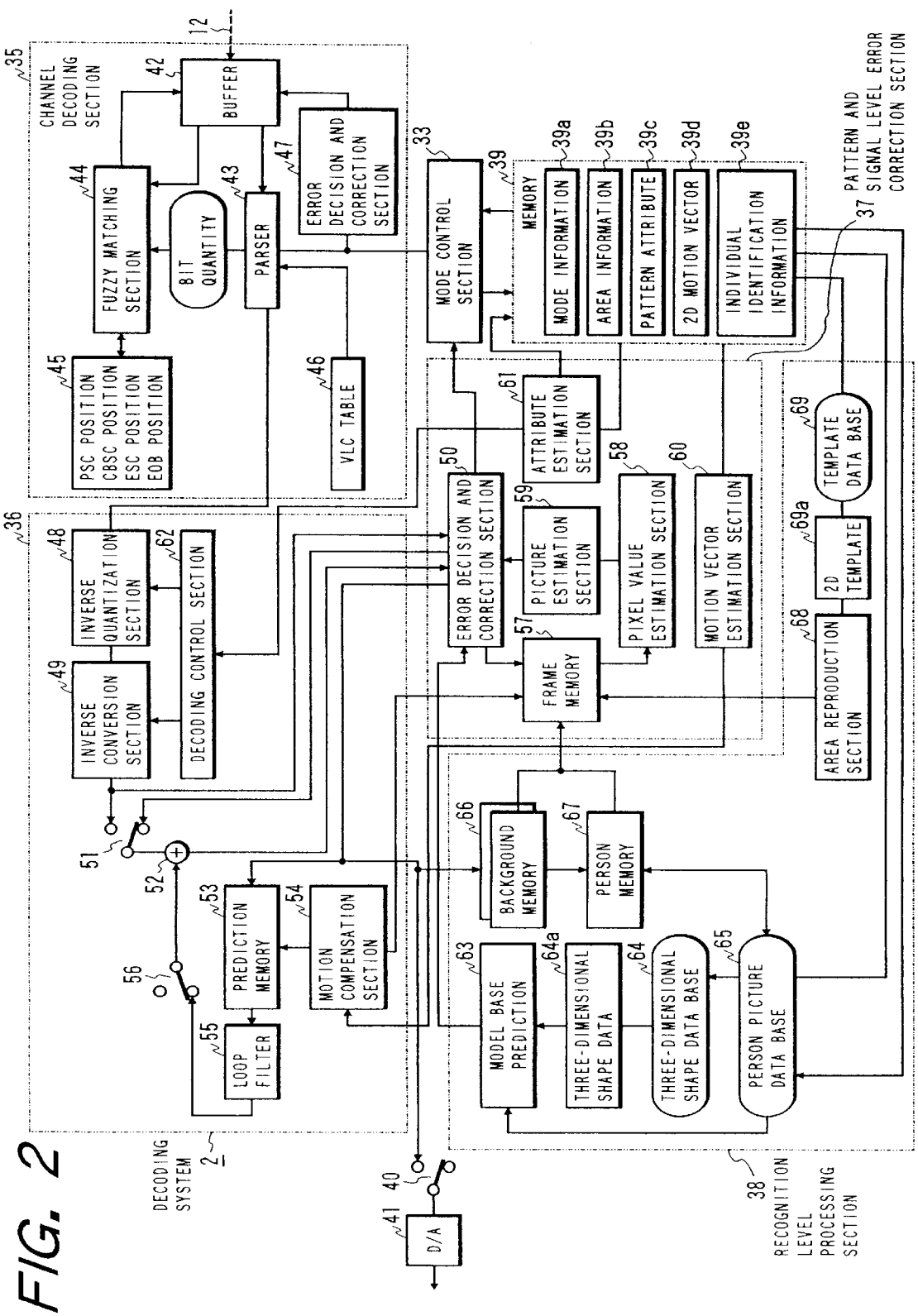
FIG. 2 is a block diagram showing an arrangement of a decoder.

FIG. 1 is a block diagram showing an arrangement of an encoder serving as an encoding system, and FIG. 2 is a functional block diagram showing an arrangement of a decoder acting as a decoding system. The outline of the whole arrangement will first be explained hereinbelow with reference to FIGS. 1 and 2. In the encoder 1 of FIG. 1, a camera 3 acting as an image pickup means captures a subject and outputs image data as an image source in the form of an ordinary analog signal. In this instance, the image source is not limited to data taken through the image pickup means such as the camera 3 but a video signal recorded in advance is also usable as the image source. The image source based on the image data taken by the camera 3 is inputted through a change-over switch 4 to an analog-to-digital (A/D) converter 5 to undergo transform into a digital signal. Further, the A/D converter 5 establishes connection through a change-over switch 6 to an orthogonal transform section 7. In addition, in this case, the A/D converter 5 is also connected thereto through a subtracter 8 and a change-over switch 6, so that switching control is made through the switching operation of the change-over switch 6 as to whether or not to interpose the subtracter 8 therebetween.

The orthogonal transform section 7 is for performing the two-dimensional orthogonal transformation (discrete cosine transformation (DCT) because this embodiment follows H.261 standard) of the original image or a predicted difference image in units of a block in accordance with the CIF (Common Intermediate Format) as well as a device under the H.261 standard, with its transformed output being outputted to a quantization section 9. This quantization section 9 is designed to implement the quantizing transformation of the transformation coefficient data, given from the orthogonal transform section 7, at the accuracy of 9 bits through the linear quantization or quantization with dead zone and to output the transformation result to a channel encoding section 10. The channel encoding section 10 is made to transform the picture signal quantization-transformed by the quantization section 9 into an encoded bit stream according to a given translation rule, and to once store the bit stream in an FIFO buffer 11 before outputting it to a communication path 12 such as wire and wireless channels.

An inverse quantization section 13 accepts the quantization-transformed signal from the quantization section 9 and again transforms the quantized picture signal from the quantization section 9 into digital data to output the result to an inverse transform section 14. This inverse transform section 14 transforms digital data into analog data to restore data virtually equaling the picture data from the image source, and then outputs the analog data through an adder 15 to a predictive memory 16. The predictive memory 16 is provided to predict the picture data in the next frame on the basis of the picture data taken from the image source, then outputting the predicted data as a subtraction signal through a loop filter 17 and a change-over switch 18 to the subtracter 8. The loop filter 17 serves as a spatial low-pass filter to perform a smoothing operation with a view to controlling the abrupt variations of color and luminance relative to the adjacent blocks, with its output being given as an addition signal through the change-over switch 18 and another change-over switch 19 to the adder 15. Further, the output of the predictive memory 16 is given to a motion detecting section 20 which in turn, on the basis of that given data and the picture data of the image source given from the A/D converter 5, supplies a signal to the quantization section 8 to compensate for the motions between the frames and further supplies a signal to the channel encoding section 10. An encoding control section 21 is for the purpose of executing various control for the encoding operation, and accepts the transformed information from the orthogonal transform section 7 and data such as the buffer activity ratio from the FIFO buffer 11. On the basis of these data, the encoding control section 21 implements the adaptive quantization control to set the quantization transformation level in the quantization section 9 in addition to executing the adaptive rate control. Further, an attribute memory 22, being made to store the attribute data of the picture signal obtained through the encoding, receives the attribute data from the encoding control section 21, while an attribute predicting section 23 predicts the current attribute data under the encoding on the basis of the past attribute data stored in the attribute memory 22 and outputs the predicted result to the encoding control section 21. The above-mentioned devices organize an encoding processing section 24 based on the H.261 standard.

Secondly, a description will be taken hereinbelow of a feature of this embodiment. That is, the arrangement of an area extraction and recognition processing section 25 is as follows. In the area extraction and recognition processing section 25, an object area extraction section 26 carries out an object area extraction processing, which will be described later, on the basis of motion vector information given from the motion detecting section 20 and outputs information to a template data base 27. Further, a 2D (two-dimensional) template matching section 28 fulfills a matching processing on the basis of the data from the template data base 27 to supply the process result to the object area extraction section 26 and the channel encoding section 10. A model-based prediction section 29 reads out the data from a three-dimensional shape data base 30 and implements the picture reproduction processing in a model-based mode on the basis of the data stored in a person memory 31 and a background memory 32, with the process result being given as a subtraction input through the channel encoding section 10 and the change-over switch 18 to the subtracter 8. The person memory 31 and the background memory 32 receive and store the person data and the background data from the object area extraction section 26.

Moreover, to this encoder 1 there is connected a mode control section 33 which is designed to execute various mode control which will be described later. Further, this mode control section 33 is also in connection with a human interface 34 for giving an receiving information to and from the user. Concretely, the human interface 34 is equipped with a display section, a speech input and outputting section or an operational inputting section, and so on, and is made to come under control to complete the quick and proper mode control. The mode control section 33 is also in connecting relation to a decoder 2 side in order to similarly perform the mode control for each section of the decoder 2, thus permitting the utilization of the human interface 34 in the decoder 2. Incidentally, in the system the person picture information can be registered and stored as individual identification information in the person memory 31 through the human interface 34. This individual identification information is read out from the person memory 31 on the basis of the information inputted through the human interface 34 at an adequate timing and further is made to be displayed as the registered individual identification information in applications other than the communications.

Furthermore, a description will be made hereinbelow of the arrangement of the decoder 2 with reference to FIG. 2. In FIG. 2, receiving an encoded bit stream of picture signal data transmitted through a transmission path, a channel decoding section 35 decodes and outputs a hierarchical encoded attribute (of macroblock type or the like). This channel decoding section 35 is connected to a decoding processing section 36 having a basic arrangement made in accordance with the H.261 standard. In addition, a means to fulfill the error correcting function is composed of a pattern and signal level error correcting section 37, a recognition level processing section 38, and a memory 39 for storing various kinds of data. Further, the aforesaid mode control section 33 controls the decoding processing by giving and receiving a signal to and from the aforesaid respective sections. The finally decoded picture signal is output through a change-over switch 40 and a digital-to-analog (D/A) converter 41.

In the above-mentioned channel decoding section 35, an encoded bit stream data of a picture signal transmitted through a transmission path 12 such as an external communication path and an antenna system is inputted into an FIFO buffer 42 so that the data corresponding to at least one frame is accumulated therein. The encoded bit stream data accumulated in the FIFO buffer 42 is inputted in a parser 43 so that the code level is parsed in grammar. A fuzzy matching section 44 globally retrieves the bit stream data accumulated in the FIFO buffer 42 and fixes PSC and GBSC described or written with a specific code through a fuzzy matching processing, and further retrieves and specifies ESC (escape code) and EOB (end of block) similarly described with a specific code, with their positions being stored in a storage section 45 and used in carrying out the error correction function as will be described later. Further, the parser 43 retrieves and grammar-parses other codes and data on the basis of the position of the specific code retrieved in the fuzzy matching section 44. In this case, it uses a reference table 46 on a variable-length code (VLC). When the parser 43 performs the grammar parsing (interpretation) on the basis of the position of the specific code fixed in the fuzzy matching section 44, an error decision judgment) section 47 checks whether or not an error occurs, and in the case of detecting the error, corrects it in a code level before outputting. In addition, the parser 43 supplies the mode control section 33 with the mode information attained through the decoding processing of the bit stream data.

In the decoding processing section 36, an inverse quantization section 48 accepts the decoded output from the parser 43 and performs the inverse quantization transform of the quantized picture signal data to output it to an inverse transform section 49. The inverse transform section 49 inversely transforms the orthogonal transformation data corresponding to the frequency signal included in the picture signal into the data corresponding to the position signal and outputs the inverse-transformation result as the decoded data. The output of the inverse transform section 49 passes through a path to be inputted into an error decision and correction section 50 of the pattern and signal level error correcting section 37 and further passes through another path to be inputted into the same error decision and correction section 50 through a change-over switch 51 and an adder 52. A predictive memory 53 receives data from the error decision and correction section 50 and a motion compensation section 54, and is coupled through a loop filter 55 and a change-over switch 56 to the addition input of an adder 52.

In the pattern and signal level error correcting section 37, the error decision and correction section 50 gives data to a frame memory 57 while receiving an estimated picture data through a pixel value estimating section 58 and a picture estimating section 59. A motion vector estimating section 60 obtains the data from the memory 39 and outputs the motion vector data estimated in the motion compensation section 54. In addition, an attribute estimating section 61 reads out the past attribute data stored in the memory 39 and supplies it to a decoding control section 62 of the decoding processing section 36 to give the information on the decoding operations of the inverse quantization section 48 and the inverse transform section 49. The memory 39 comprises a mode information section 39a, an area information section 39b, a pattern attribute section 39c, a 2D (two-dimensional) motion vector section 39d, and an individual identification information section 39e.

In the recognition level processing section 38, a model prediction section 63 accepts a 3D (three-dimensional) shape data 64a from a three-dimensional shape data base 64 and further receives a person picture data from a person picture data base 65, and implements the model-based prediction to output the data to the error decision and correction section 50. The person picture data base 65 and the three-dimensional shape data base 64 accept the data from the memory 39.

A background memory 66 serving as a background information storage means and a person memory 67 acting as a person information storage means are made to store the background information and person information of the picture signal outputted to the D/A converter 41, and outputs the data to the frame memory 57 concurrently with giving and receiving the data to and from the person picture data base 65. An area reproducing section 68 receives a 2D (two-dimensional) template 69a selected on the basis of the data from the memory 39 in a template data base 69, and further carries the area reproduction into effect to output the result to the frame memory 57.

Figure 68:
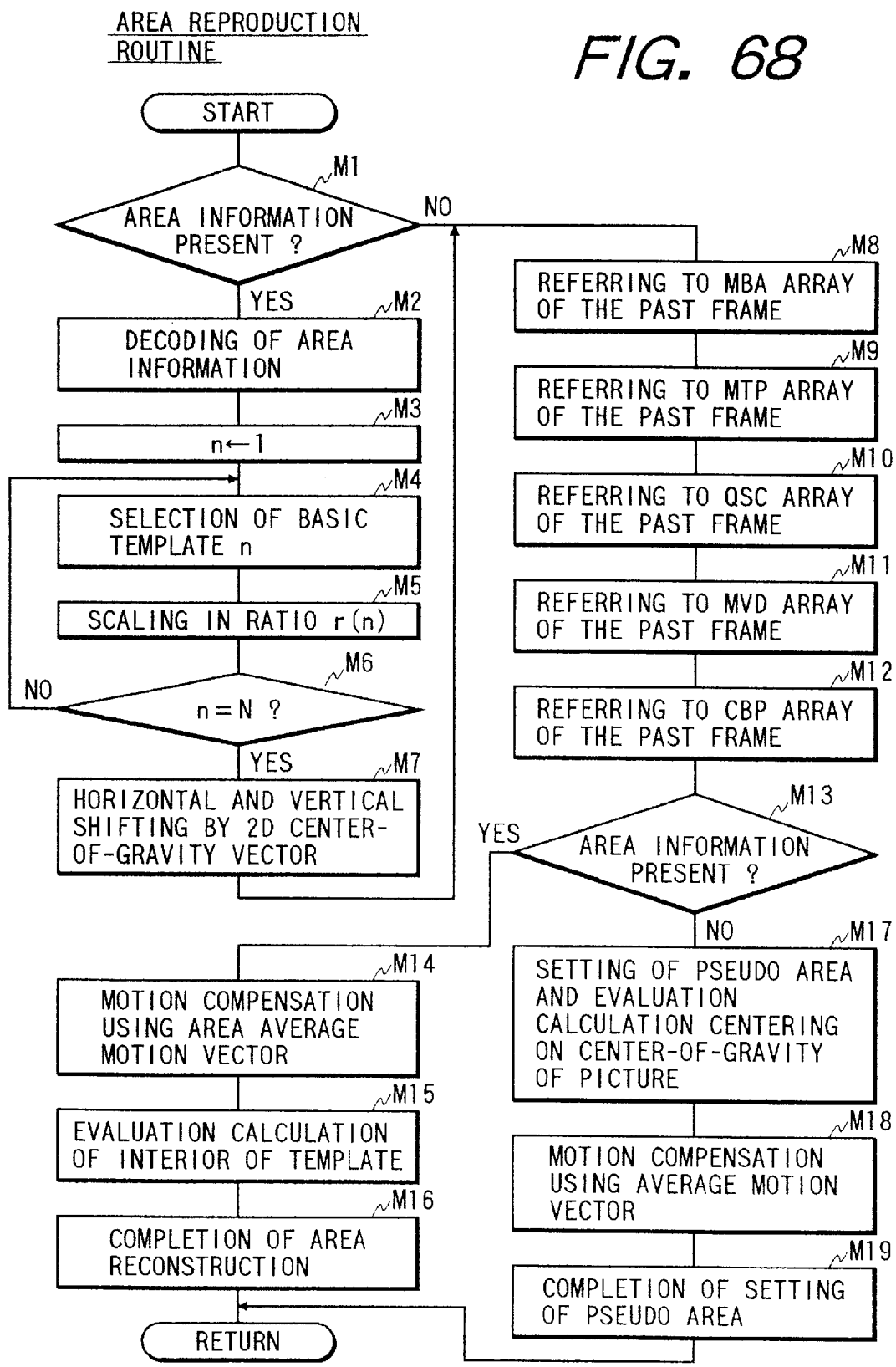
FIG. 68 is a flow chart showing a routine for an area reproduction or a pseudo area setting.

An operation of this embodiment will be described hereinbelow with reference to FIGS. 3 to 68. In [A] a description will be made of an operation for the reduction of the code quantity for the extremely low rate during the encoding processing in the encoder 1, while in [B] a description will be taken of an operation for the decoding processing of the encoded bit stream in the decoder 2. In addition, various ways of accomplishing the encoding processing for an extremely low rate will be described in [A-1] to [A-4] items, while in [A-5] item a description of the operations thereof will principally be made with reference to the flow charts (FIGS. 5 to 7 ) of the encoding processing programs. Further, in [B] item, various ways of carrying out the decoding error detection and correction will be listed with [B-1] to [B-8] items, whereas in [B-9] head a description of the operations thereof will chiefly be made with the flow charts (FIGS. 8 to 11 ) of the decoding processing programs.

[A] ENCODER

[A-1] Basic Operation

First of all, the description will start with the basic operation of the encoder 1. The basic operation of the encoder 1 is that the picture data captured by the camera 3 is taken to undergo the encoding processing to be outputted as the encoded bit stream data to the communication path 12. In this case, the encoder 1 is made to separately fulfill the encoding processing for the first frame and the encoding processes for the following frames. For the first frame, the image source supplying a scene including a subject taken by the camera 3 is converted into a digital signal in the A/D converter 5 and subsequently the in-frame encoding operation (INTRA) therefor is implemented in units of a macroblock conforming to the CIF coming under the H.261 standard, with the resultant being transmitted as an INTRA picture.

On the other hand, after the first frame (the second frame and following frames), only the motion compensation prediction difference undergoes the two-dimensional orthogonal transformation (in this case, the discrete cosine transformation (DCT) following H.261), and then is subjected to the adaptive quantization by the encoding control section 21 in accordance with the buffer quantity, the encoding rate, and other encoder 1 state values, with the resultant being temporarily stored and accumulated through the channel encoding section 10 in the output FIFO buffer 11. This output FIFO buffer 11 supplies the communication path with the encoded bit stream, whose information quantity different in units of a frame, in accordance with a given encoding rate. As will be described later, the encoded bit stream is transformed into data with a four-hierarchical structure: PICTURE/GOB/MBK/BLK (see FIG. 30), in accordance with the CIF, which is produced in a state that an attribute header is added for a set of variable-length codes expressing a sequence of the DCT significant coefficients of the BLK (block) hierarchy at every hierarchy. On the other hand, the motion compensation prediction frame is produced as the output of a frame adding loop of FIG. 1 and is compared with the original picture so that new difference information is fed to the encoding mechanism.

In the above-described encoding, the encoder 1 according to this embodiment carries out the following unique processing, thus accomplishing the encoding for the extremely low bit rate. That is, according to this embodiment, supposing the H.261 standard being an international standard for the existing TV conference technique and TV telephone motion picture compression technique, the mode control function and the area extraction function are added thereto as the unique processing. With this arrangement, the process such as encoding control and syntax alteration is implemented in each stage of signal, pattern, code and recognition to finally encode the picture for an extremely low rate of approximately 64 to 4.8 kbps. The conceptional correlation between these control contents is shown in FIG. 3.

Furthermore, a description will be made hereinbelow of the encoding format principle and the encoding method in the roughly classified items: [A-2] (mode control), [A-3] (object area extraction), [A-4] (encoding control operation) and [A-5] (encoding operation program) which will further fall into small sections.

[A-2] Mode Control

Figure 3:
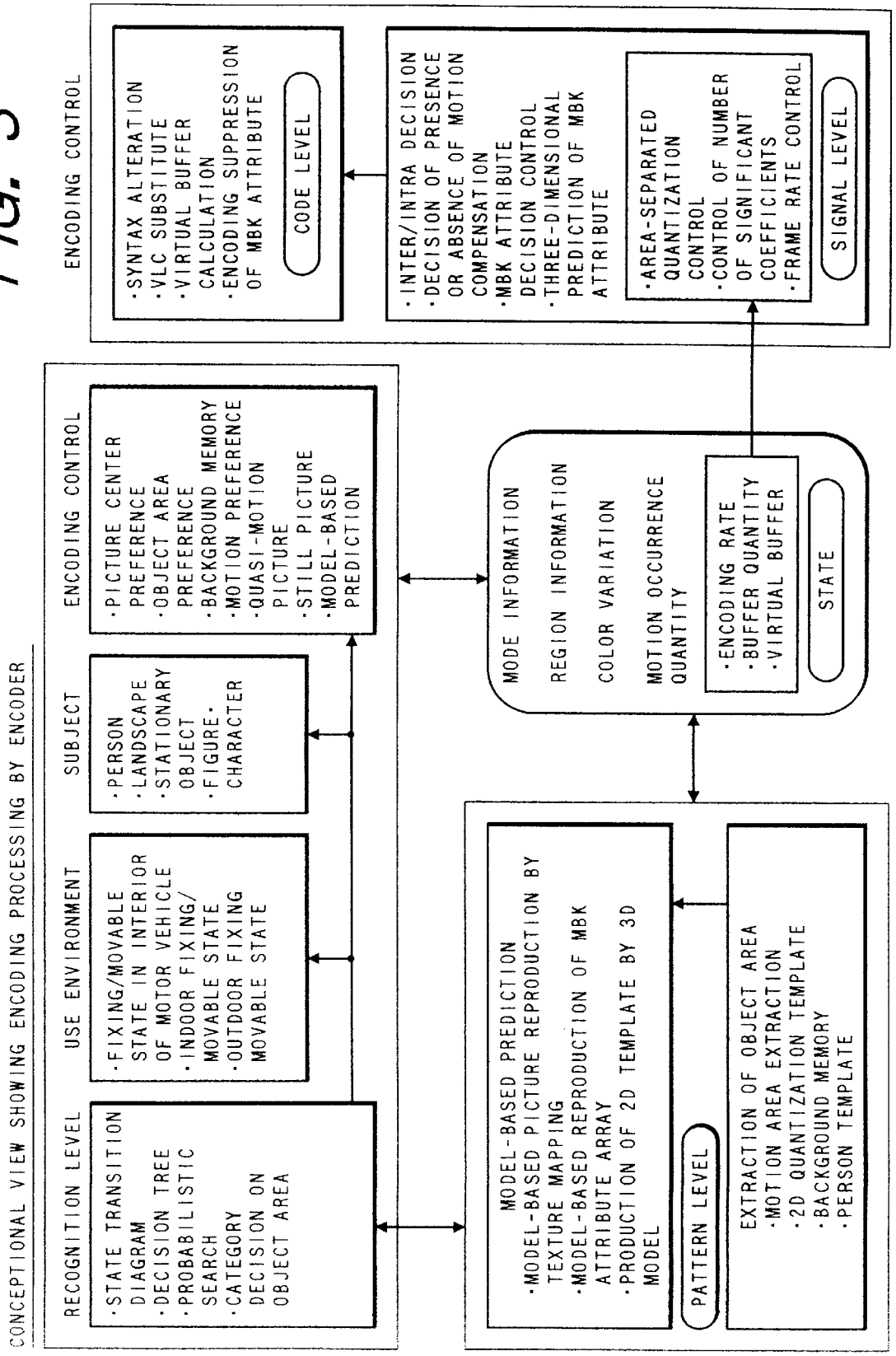
FIG. 3 is a conceptual block diagram showing an encoding processing.

FIG. 3 is an conceptional view showing the encoding method for the extremely low rate. In this embodiment the mode control is put into practice in each of three categories: for example, (1) use environment, (2) subject, and (3) encoding control. In this instance, the modes in the respective mode control do not necessarily proceed independently. For example, the encoding can simultaneously be put into practice using two or more modes in each category. Further, the relationship in transition therebetween depends upon the states of the encoder 1 and the decoder 2, such as the buffer quantity of the FIFO buffer 11, the current set mode state, the encoding rate and the motion occurrence quantity or the decision information, and also depends upon the stochastic state transition. The following description will be made of the mode control operations in the categories (1) to (3) and by the difference between the state transitions.

(1) Use Environment

In the mode control for the use environment, there are six modes: (a) an in-car fixed mode, (b) an in-car movable mode, (c) an indoor fixed mode, (d) an indoor movable mode, (e) outdoor fixed mode and (an outdoor movable mode, taken in consideration of the fixed and movable states in each of the interior of a motor vehicle, an indoor spot and an outdoor spot.

(a) In-car Fixed Mode

Figure 12:
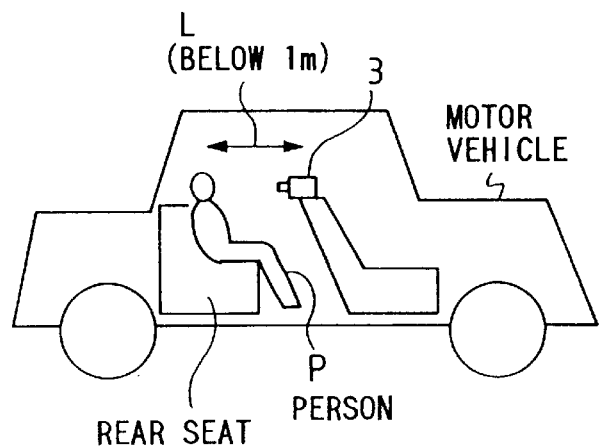
FIG. 12 is an explanatory illustration for describing a use environment in which a camera is fixed in the interior of a motor vehicle.
Figure 13:
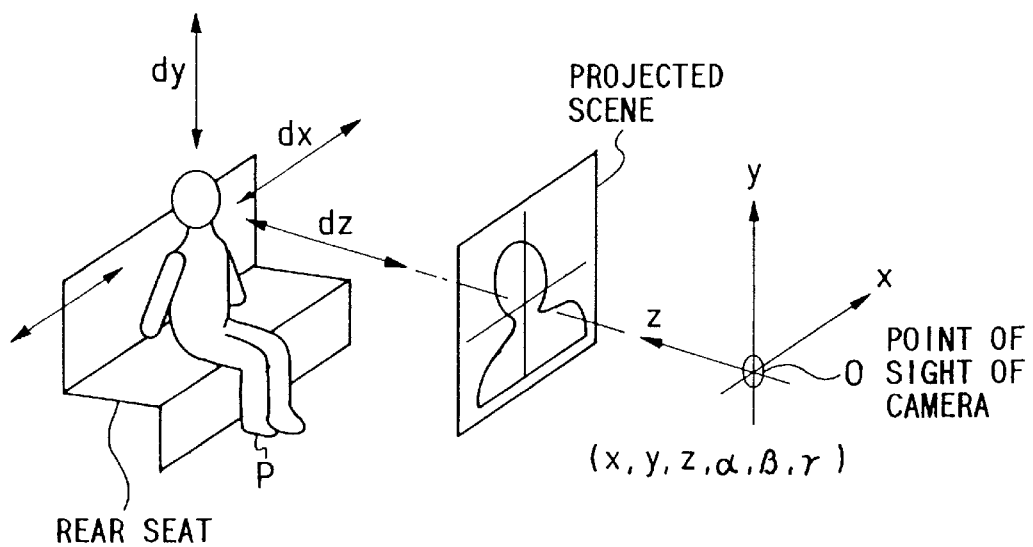
FIG. 13 is an illustration for explaining the three-dimensional positional relationship of a person in the interior of a motor vehicle.

This is a mode for setting a use environment of a TV telephone for motor vehicles in the most possible back seats. For example, as shown in FIGS. 12 and 13, its feature is that it is possible to define various conditions on the basis of the positional relationship. That is, 1) The motor vehicle internal portions of the background are almost fixable while the background outside the motor vehicle viewed through windows becomes a movable area while the motor vehicle is running;

2) The distance L from the camera 3 to a person P is definable (see FIG. 12), and the actual value of the distance L can be set to below, for example, approximately 1 m;

3) As will be described in the next subject mode item, in this use environment the subject is almost a person(s) (see FIG. 13), and according to the result of the motion area extraction the probability that the area constituting the largest area ratio corresponds to a person become extremely high;

4) In the case of using the motor vehicle TV telephone in the back seats, that the number of persons P to be image-captured is one takes place at a highest probability; and 5) In the case of a passenger car, the maximum number of persons P who can exist within the field of view of the camera 3 is considered to be proximately four.

(b) In-Car Movable Mode

In this mode, there is a high possibility that a landscape mode being a subject mode is used in addition to the person mode.

(c) Indoor Fixed Mode

This is nearly the same as the in-car fixed mode, while the scene looked through a window is fixed in a high possibility, which is advantageous to the reduction of the information quantity is possible.

(d) Indoor Movable Mode

There is a high possibility of the landscape mode being employed in addition to the person mode.

(e) Outdoor Fixed Mode

This mode may be applicable to traffic monitor, security, pet monitor and so on. Further, in this case, the camera 3 is set in a fixed state and, hence, the wire transmission becomes possible to lower the transmission error rate.

(f) Outdoor Movable Mode

This signifies the severest condition in the use environment. In this case, because of being movable, a wireless type extremely low bit rate transmission is a precondition. Further, in the case of using portable type equipment, in addition to the person mode the landscape mode is used in a high possibility. Moreover, because of the hand oscillation or the like during transform, the camera 3 is expected to frequently shake, with the result that actually this mode is considered to be carried into effect centering around the operation of a quasi-motion picture mode or still picture mode.

(2) Subject

In this instance, the following four encoding modes are selectively taken in accordance with the encoding object and the application.

(a) Person Mode

Figure 14A:
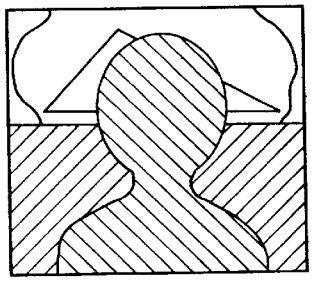
FIG. 14 illustrates examples of an in-car camera-taken picture, an indoor camera-taken picture and an outdoor camera-taken picture which include a person.
Figure 14B:
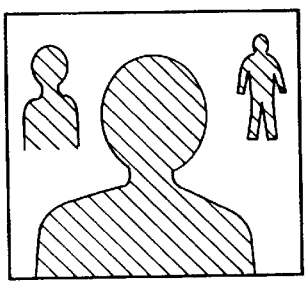
Figure 14C:
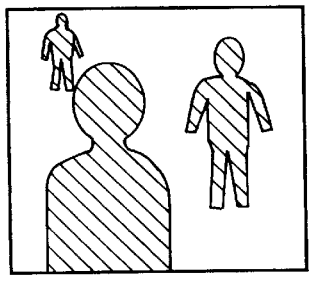

This person mode is set as a default mode used in the highest preference in the ordinary communications. Further, in this person mode, as also shown in FIG. 14 the switching among the following modes is further made in accordance with the background and the use environment. In this case, the mode switching is made by automatically setting it on the basis of the extraction result of the object area and the distance decision.

i) head mode (when the object person P is one in number)

ii) upper-half mode (when the object person P is one in number)

iii) full-length mode (when the object person P is one in number)

iv) plural-person mode

For instance, as shown in FIG. 14, the head mode of i) is set when the use environment is the interior of a motor vehicle indicated at (a), the upper-half mode of ii) is set when the use environment is indoors indicated at (b), the upper-half mode of ii) or the full-length mode of iii) is used when the use environment is the open air shown at (c). Further, in the case of the plural-person mode of iv), a particularly detailed template (see FIG. 25 and referring to a description which will be made later) is not prepared, and since it is considered that the scene is transient and ends for a short time. For this reason, the plural-person mode relies upon a different control to be executed in accordance with the encoding information quantity and the occurrence condition.

(b) Landscape Mode

In the interior of a motor vehicle that is running, generally the subject is a person during the transform, and in the mode decision tree the person mode is set in a high probability. On the other hand, if the user intends to transmit as an picture the scenes and things outside the motor vehicle, the encoding mode is shifted to a quasi-motion picture mode or a still picture mode judging from the presence or absence of motion, the occurrence quantity of the information due to the fineness of texture and the presence or absence of a person.

(c) Stationary Object Mode

In the case that an object is a stationary thing, since the occurrence of quantity the information is relatively little, the common motion picture mode can be chosen as the encoding mode.

(d) Figure and Character Mode

A high-resolution still picture mode can be chosen as the encoding mode.

(3) Encoding Control (a) Picture Center Preference Mode

This mode is set in cases where there is not any anticipative information concerned with the object in the scene and there is no initial set mode manually set in preference to this. That is, this applies to the case that the camera 3 is pointed at a thing that the user does not intend. In this case, when the object at which the camera 3 is pointed is positioned at the center of the picture, it is possible to assume that the area to which the user paid attention is in the vicinity of the center of the picture (that is, it is assumed that the horizontal and vertical angles α and β of the position of the camera 3 take a value close to zero with respect to the center of the object). Accordingly, the encoding control operation is put into practice such that the bits are preferentially assigned to the vicinity of the center of the picture and encoded and the bit quantity to be assigned is gradually decreased in accordance with the separation from the center of the picture. Concretely, this is accomplished through the area-separated quantization control of the [A-3] encoding control, which will be described later, the use of the background memory, the control of the maximum number of significant transformation coefficients. Further, in this mode, the conditions for transferring to other modes are set in correspondence with the following three cases.

1) the Case of Detection of Motion of Object Area

If the object area is extracted, the operation enters the object area preference mode. At this time, in the following cases, the area center-of-gravity mode of that object area preference mode is selected because the following of the object area is difficult.

i) no decision of the 2D (two-dimensional) template;

ii) no completion of the adaptation of the 2D template; and iii) landscape mode having no 2D template.

(The 2D template will be described later.)

2) the Case that Subject Mode is Person Mode

In the case of the object area preference mode and the person mode, the 2D template is adaptable as long as the visual field of the camera 3 does not deviate from the front image. In this case, the identifications of the parts such as the head, the eyes and the mouth begin.

Figure 5:
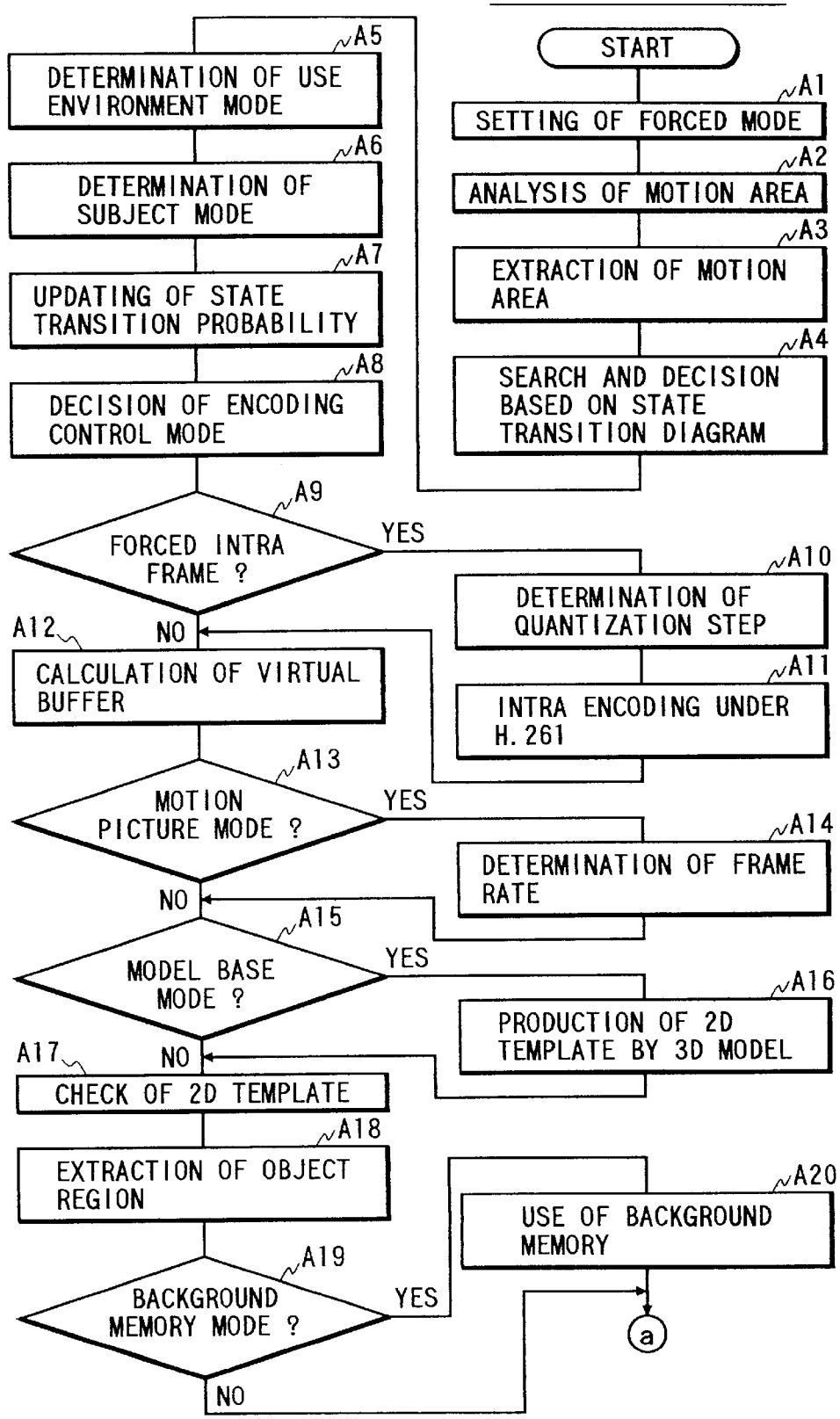
FIG. 5 is a flow chart showing a portion of an encoding processing program.

3) the Specification of Object Category by the Object Area Extraction and the Motion Analysis Result In the case of no motion information nor area information, a scene center area is preferentially encoded in detail. In this instance, the preference of the scene center area, as shown in FIG. 5, is to regard as the object area a block within a range of a value calculated on a given distance from the scene center, for example, the average distance Dav. Further, for calculating the average distance Dav, the Eucrid distance $D(n)$ shown in (a) of FIG. 15 or the absolute distance $D(n)$ shown in (b) of the same illustration is used as the distance scale, and as seen from the following equation (1) the average value Dav of the distance $D(n)$ (in this case, based on the absolute distance) is calculated in terms of a block (18 in the vertical directions and 22 in the horizontal directions) set in the scene. The average distance Dav being the calculation result is approximately 12, and the shaded portion having an obliquely rectangular configuration in (b) of the same illustration makes the scene center area.

$$Dav = \frac{1}{N}\sum_{n=1}^{N} D(n) \qquad (1)$$

$$= \frac{1}{N}\sum_{i=1}^{22}\sum_{j=1}^{18} dd(i, j)$$

where $N=22\times18=396$, $dd(i, j)$ becomes $dd(i, j)=|i-11|+|j-9|$ in the absolute distance.

(b) Object Area Preference Mode

1) Background Memory Use Mode

This is a mode for, on the basis of the area information to be obtained through the area extraction in [A-2] (extraction of object area) which will be described later, executing the following control by utilizing the background information stored in the background memory 66 using the background picture previously prepared or the background picture transmitted with the first frame in the person mode.

i) The information about the background is not transmitted at all afterwards; and ii) Although the background information is transmitted, with being dispersed periodically, the variation information of the background is fed to gradually update the background.

2) Area Center-of-Gravity Mode

In this area center-of-gravity mode, the picture center in the aforesaid picture center mode is considered as the center of gravity of the object area and the area-separated quantization control is executed centering around the center of gravity. The area-separated quantization control will be described later in [A-3] (encoding control) and omitted here.

3) Object Area Follow-up Mode

This mode is made such that the above-mentioned area center-of-gravity mode of 2) is applicable by detecting the position of the center of gravity in the object area varying with time when the object area moves on the picture surface.

(c) Motion Preference Mode

This mode is for preventing the decrease in frame rate even if the number of motion blocks and the absolute value of motion increase. In this case, the degree of motion is decided using an index AM (see equation (10)) representative of the degree of motion in the description of the adaptive control according to the information occurrence quantity in the encoding control of [A-3], which will be described later, so that the transmission rate is maintained through the use of the object area preference mode and the scene center preference mode, the model data base mode (which will be described later) and so on.

(d) Quasi-Motion Picture (INTRA Picture) mode

This is a mode in which in order to reduce the information quantity the frame rate is lowered to maintain the transmission rate concurrently with keeping the picture quality. In this instance, depending on the motion quantity, difficulty can be encountered in the compression using the inter-frame correlation, and in this situation only the INTRA picture is transmitted.

(e) Still Picture Transmission Mode

Supposition is made of the following two cases.

1) Breakdown of Encoding Control

In this case, a forced INTRA frame is newly transmitted as a picture signal picture-frozen in the encoder 1 side. After the completion of this transmission, the operation enters into a motion picture transmission mode which is a mode to resume the motion picture transmission.

2) the Presence of Retransmission request from Decoder 2 Side

Because of the Occurrence of Errors or the like

The picture signal is picture-frozen in the decoder 2 side, while the encoder 1 side transmits a forced INTRA frame in response to the retransmission request. Thereafter, the operation shifts to the motion transmission mode to similarly resume the motion picture transmission.

(f) Model-Based Prediction Mode

1) Cut-down of Texture Source

The cut-down of the texture source is made in terms of the initial front picture captured before the start of the conversation on the basis of the picture information in the person area obtained from the analysis result of a motion area in [A-3] (extraction of target area) which will be described later.

2) Selection and Adaptation of Model

A 3D (three-dimensional) model is defined by previously giving depth information to each 2D template 69a (front picture).

3) Model-Based Prediction Using 2D Template and Transmission

The distance information can be calculated by a table made through the use of a camera characteristic on the basis of a template number of the 2D template 69a and a scaling value for the front picture. In terms of this front picture, a model-based prediction picture of a person is producible by the held of the distance information based on the area extraction result and the 2D motion quantity on the picture surface. In addition, even in bad electromagnetic wave situations or other undesirable conditions, it is also possible to carry out the 2D model-based picture transmission.

4) Model-Based Prediction Using 3D Kinetic Information

Figure 16:
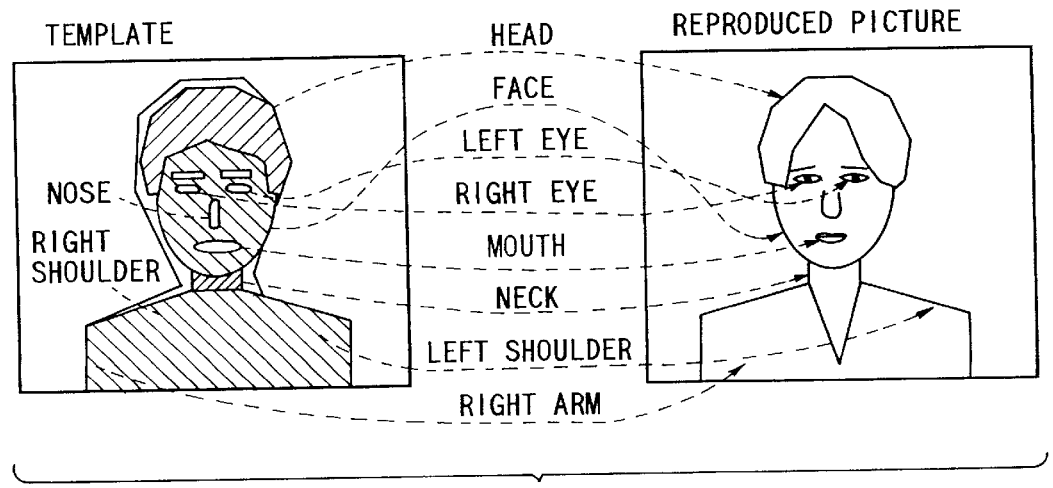
FIG. 16 is an illustration for describing a template of a person front view and a feature area.

For example, feature areas of the 2D template 69a of a person front picture is decided in advance as shown in FIG. 16, and on the basis of the 2D motion information the head portion and the portion lower than the shoulder are regarded as rigid bodies, respectively, so that a perspective transformation matrix indicative of a 3D positional attitude is obtainable from a set of 2D positions of N feature areas. Incidentally, obtaining the perspective transformation matrix is possible through the use of the space quantization method or the like which is a well-known technique. In addition, in this instance, it is also possible that the corresponding table is formed and stored beforehand. The positional attitude estimation for communications does not require a high accuracy unlike the positional attitude recognition for the robot control in a factory, and hence the use of such a table is possible as long as a sense of incongruity does not visually take place.

5) Background Memory

In the case that the camera 3 is fixedly set at a given position and when the background picture to be commonly taken is stationary, for example, in the situation where the camera 3 is fixed in the interior of a motor vehicle, use can be made of the background memory use mode of the object area preference mode.

6) Compensation for Forced INTRA Frame Transmission Delay Time Based on Model

Figure 17:
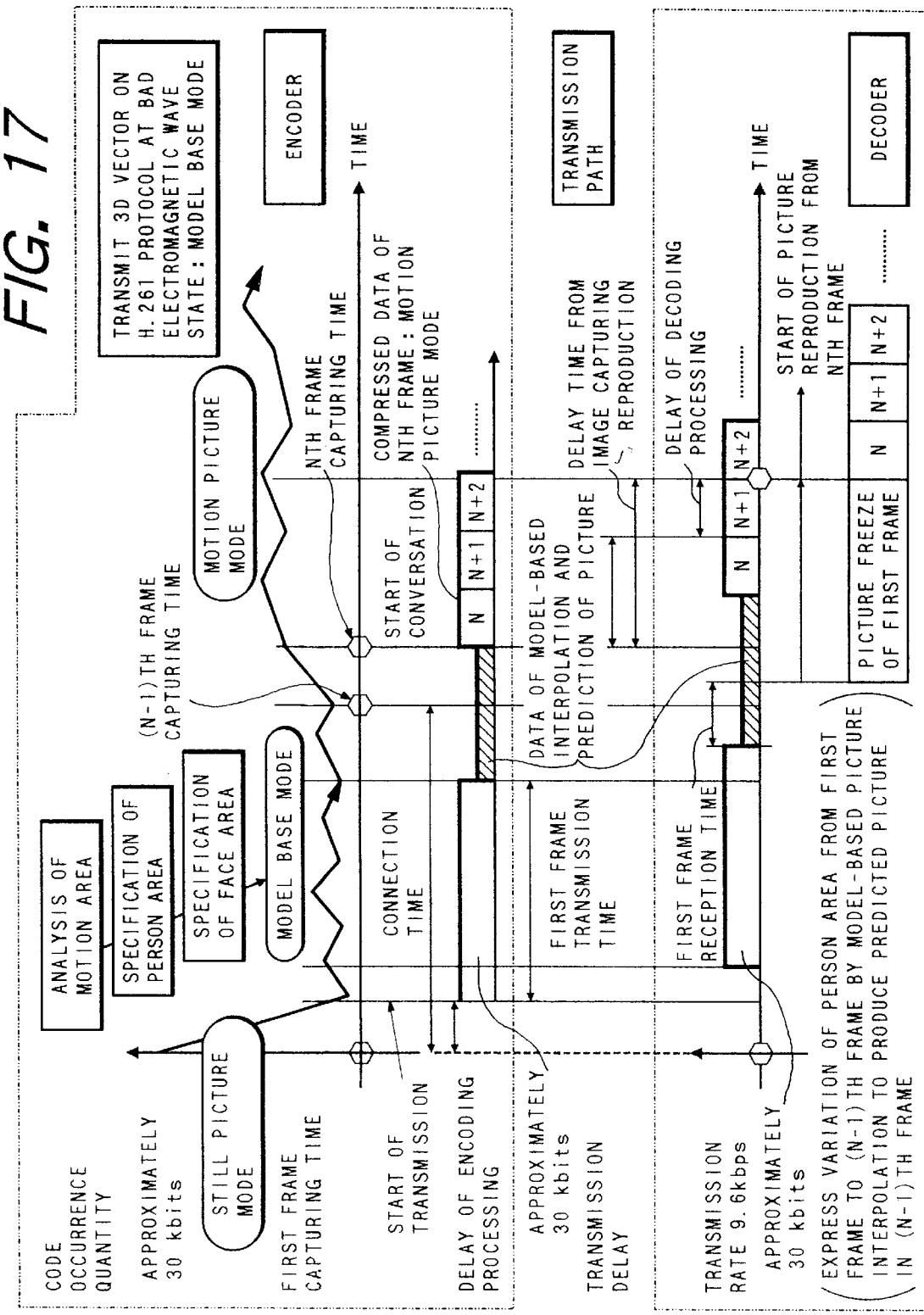
FIG. 17 is an illustration useful for explaining the compensation for a transmission delay in a model-based mode.

In the case of automobile telephone systems or the like, as shown in FIG. 17 generally a session set-up time is substantially taken 10 seconds or more before the start of conversation. Accordingly, during the session set-up time, the front face is transmitted with a forced INTRA frame (approximately 30 kbits) at the time of the start of session (not the start of transform). Simultaneously, the analysis of the motion area, the correction of the template, the adaptation of the 3D model and others are completed before the start of conversation. Further, the 3D motion vector is roughly calculated on the basis of the distance information L and the 2D motion information. On the basis of this calculation, the frame immediately before the start of conversation is obtained with the model-based prediction. Thus, if the first frame is encoded in the motion picture transmission mode after the start of conversation, the code quantity is more reducible as compared with the transmission of the forced INTRA frame (it is considered to be effective to at least the background area), with the result that it is possible to significantly relax the freeze, the lowering of the frame rate and deterioration of the picture quality.

(4) Exchangeability for Devices under H.261

Figure 18:
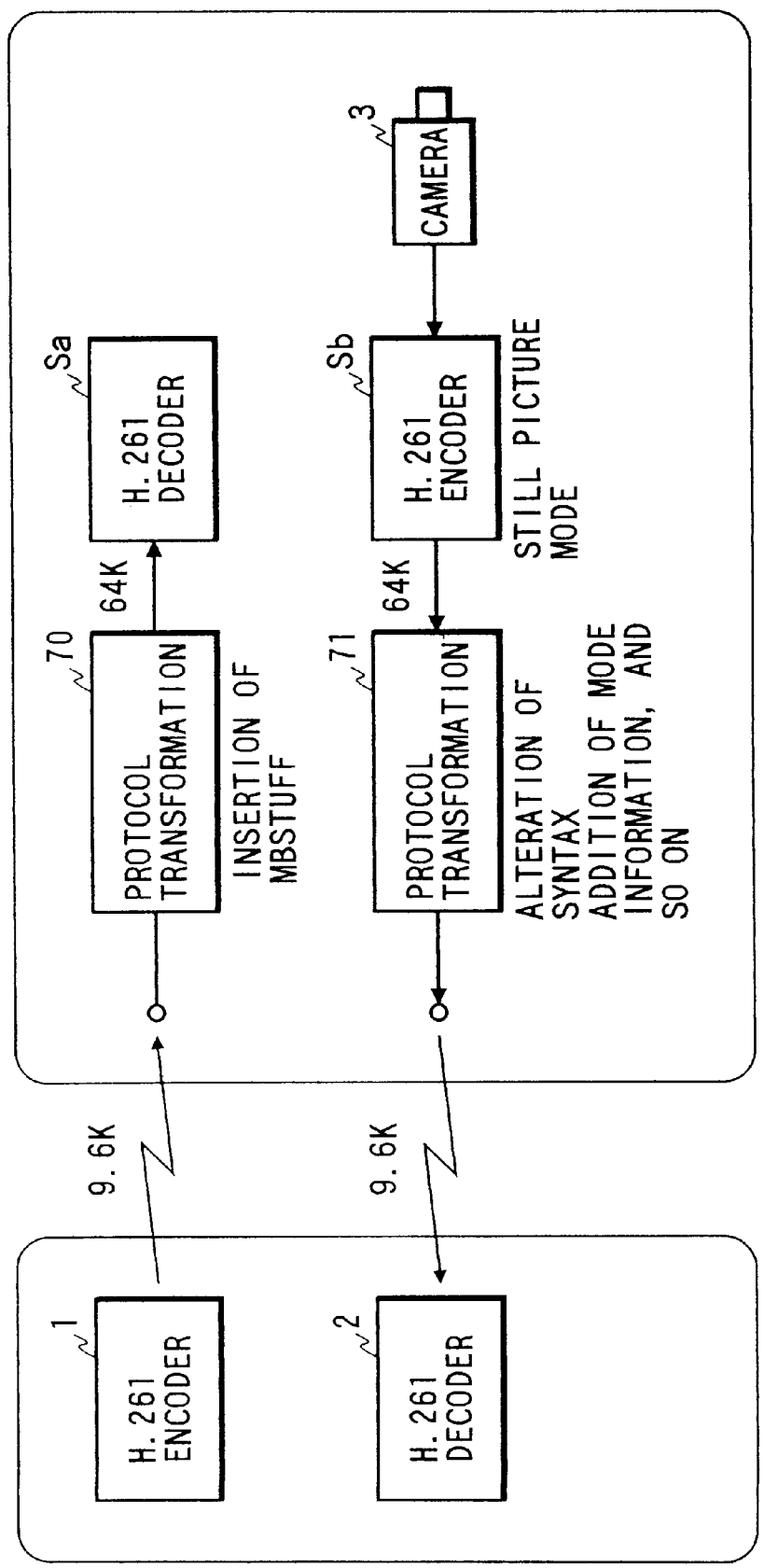
FIG. 18 is an illustration useful for describing a structure for communication with an H.261 terminal.

In the encoder 1 according to this embodiment, a bit stream below 64 kbps under the protocol can easily be transformed into the protocol according to the H.261 standard. Accordingly, for example, protocol transformers 70, 71 as shown in FIG. 18 can be constructed to maintain the exchangeability. For transforming the picture signal bit stream according to the H.261 standard into the protocol in the decoder 2 according to this embodiment, there is no means to achieve the standardized transform under the existing circumstances. However, the connection is possible in the quasi-motion picture mode based on, for example, the INTRA picture or still picture mode.

In the FIG. 18 arrangement, for example, when receiving an encoded bit stream from the encoder 1, the protocol transformer 70 adds a redundant code such as MBSTUFF thereto to transform the data quantity of 9.6 kbps into the data quantity of 64 kbps or more under the H.261 standard or carries out such a simple code-level practicable transform control as to replace a variable-length code having a altered syntax for the purpose of the reduction of the code quantity with a code conforming to the H.261 standard, and supplies the result to an H.261 encoder Sa. On the other hand, in the protocol transformer 71, although as described before there is no means for the uniform transform, for the transmission of the INTRA picture, the picture signal of the camera 3 is transformed through an H.261 decoder Sb into an encoded bit stream under the H.261 standard and the alteration of the syntax or addition of the mode information or the like are made to lower the frame rate to reduce the transmission code quantity so that the conformity with the transmission rate of 9.6 kbps is achievable.

With these operations, the mutual transform of the picture signal becomes possible between the encoder Sa and the decoder Sb under the H.261 standard and the encoder 1 and the decoder 2 according to this embodiment, and in a similar way the picture communication becomes possible with respect to devices under the conventional H.261 standard.

(5) Decision of State and Transition of Mode (a) Forced Setting

For example, in the above-described encoding modes, the switching between the texture source extraction mode of 1) and the model selection and adaptation mode of 2) can automatically be done according to whether or not the object area extraction result shows a person, while it can also be made forcibly through the manual setting by the user.

(b) Decision of Category of Object Area

Figure 19:
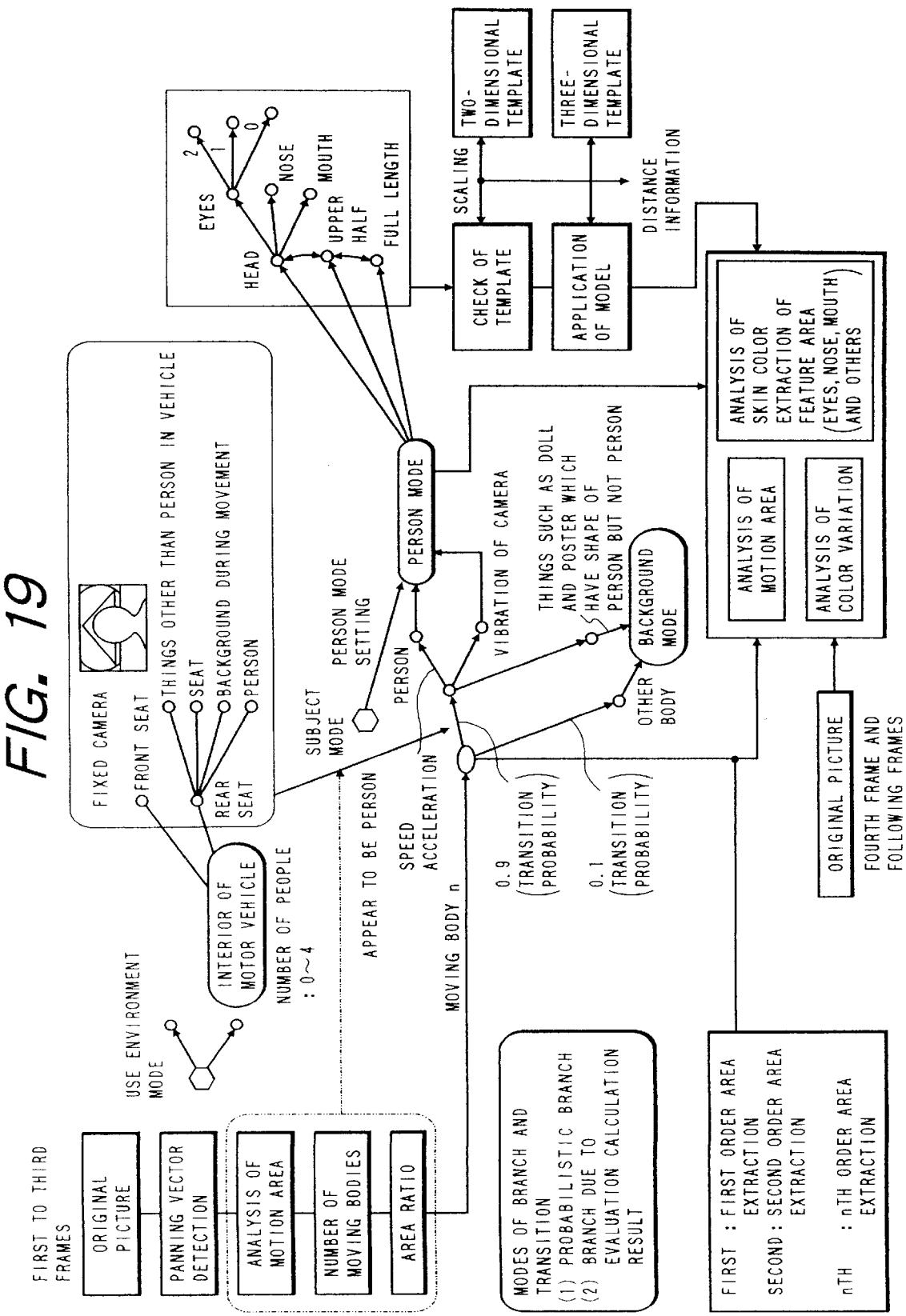
FIG. 19 is a state transition diagram showing mode control relating to a use environment and a subject.

In this decision operation, taking various conditions into consideration the mode is made to proceed in accordance with the state transition diagram of the mode control related to the use environment and the subject as shown in FIG. 19.

1) Stochastic State Transition

For the lack of the decision information necessary for the state transition, an automous state transition or search is implemented through the use of the probability given by the default or a transition probability table selected on the basis of the incomplete information. For example, this is taken in the following cases.

i) no presence of a forced mode given from the external;

ii) no completion of the area extraction based on the motion area analysis; and iii) no completion of the signal analysis result of a color signal or the like.

2) Decisive State Transition Based on Decision Information

As illustrated in FIG. 19, as will be described later, the motion area analysis in a range from the occurrence of the original picture to approximately the three frame time is carried into effect without relying on the stochastic reference, so that after the extraction of a motion area or a motion occurrence situation a person area is extracted to choose a template through the extraction of a shape parameter. The degree of adaptation of the template is given through the evaluation calculation, and if the template satisfies the reference, the operation terminates. On the other hand, if not satisfying the reference, the next template becomes a candidate for selection. This operation is repeatedly done until encountering the satisfied template.

(c) Updating of Transmission Probability on Propagation of Decision Result Based on State Transition In cases where one decision result significantly produces errors in the subsequent evaluation calculation, in returning through a motion area analysis module to the initial joint of a moving body decision, the transition probability is updated (in the illustration, as the branch point of the moving body n, "0.9" is given to the person side while "0.1" is set to the other object side). For instance, when the area that is decided as a person on the basis of the utter stochastic state transition at the initial decision outputs an evaluation function value that makes it difficult to make decision as a person judging from the subsequent results of the 2D template checking, the color analysis result, the velocity and acceleration evaluation, the transition probability of the decision of "probable person" is reset to be lowered from "0.9" to approximately "0.2".

(6) Human Interface Leading to Mode Selection

The optimal encoding control is possible even by the above-mentioned state decision and mode transition, while mode control section 33 can greatly reduce the probability of mistaken decision by means of the guidance through the human interface 34. For example, if the following processes are completed in the mode control section 34 during the set-up time before the start of the session, the mode shifting for the subsequent encoding control can smoothly be carried out.

1) The user selects the person mode and looks at the position of the camera 3.

2) The message "Please sit down in front" is given with a speech or on a display through the human interface 34.

3) When the person deviates from the center of the scene, the message "Please move to the right (or left) a little bit" is given with a speech or on a display through the human interface 34. In this case, as a displaying method, it is also possible that a child scene is provided at a corner portion of the scene and the person's position is shown thereon.

4) The first frame is sent as the forced INTRA.

5) The message "You are connected with the other party. Please talk." is given with a speech or on a display through the human interface 34 (conversation can start)

(7) Transmission of Mode Information

The mode information and the template information accompanying mode information constitute the information quantity doing no harm in the extremely low rate transmission. In this case, the transmission is made in the state described in PSPAR being a user data area in the PIC hierarchy (see FIGS. 30 and 50 ).

[A-3] Extraction of Object Area

An object area such as a person watched is extracted on the basis of the motion vector or the camera setting. In order to reduce the operation quantity, the calculation is made in units of a macroblock (MBK). As described before, the causal relationship between this arithmetic operation and various modes is as shown in FIG. 19.

(1) Area Extraction Based on Occurrence of Motion Vector

Figure 23:
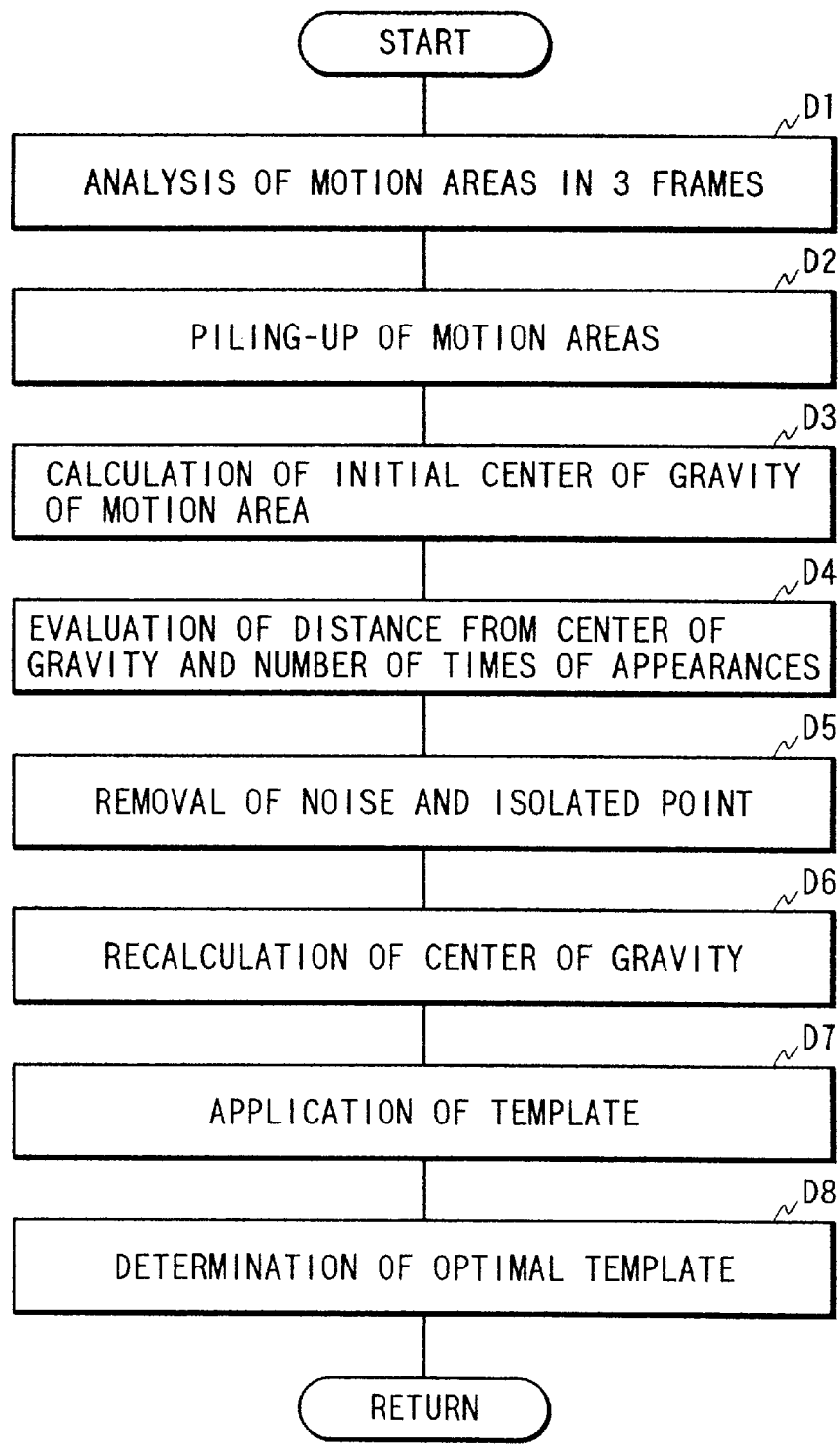
FIG. 23 is a flow chart showing a motion area extraction and template decision routine.
Figure 25:
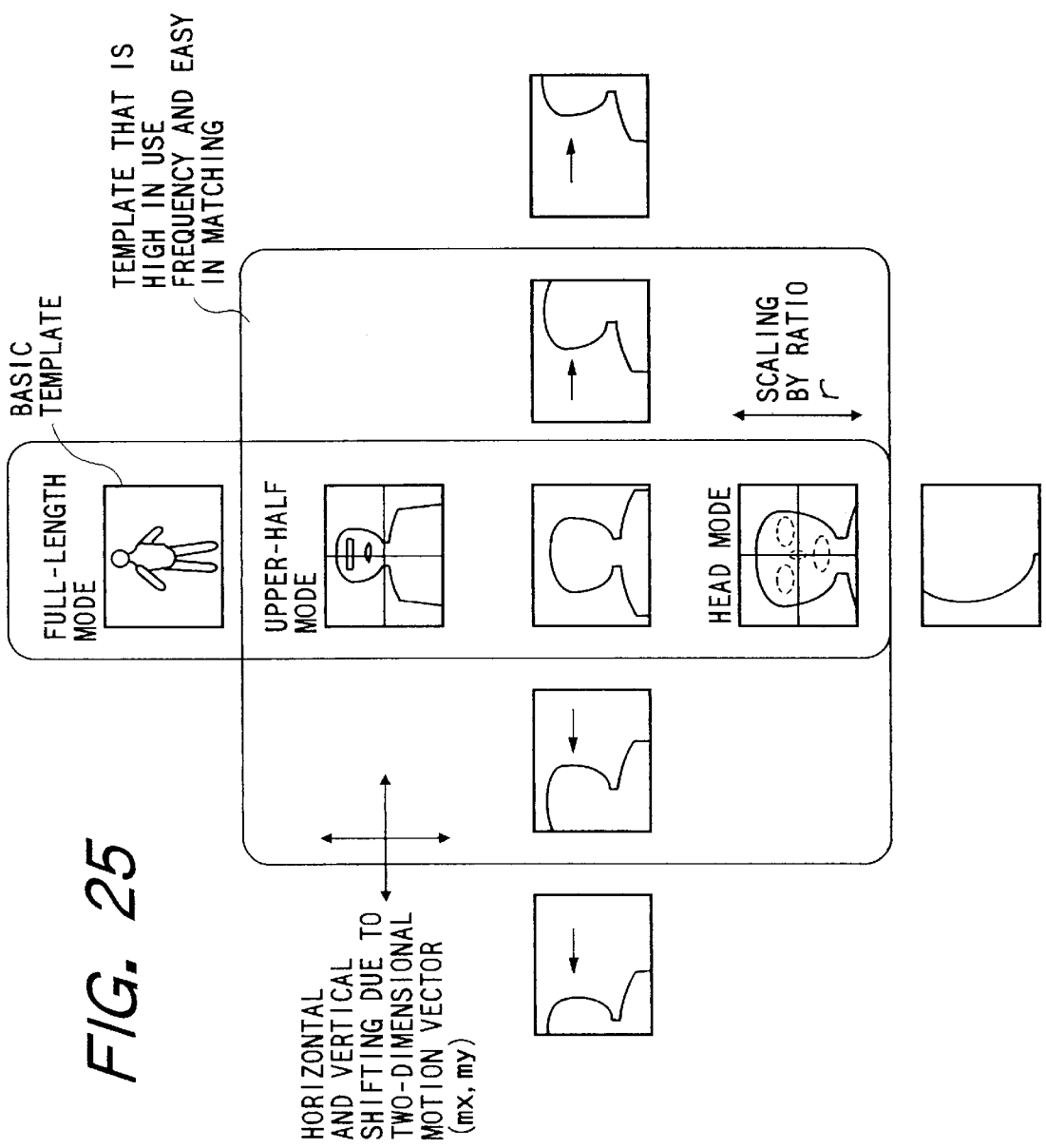
FIG. 25 is an illustration for explaining an operation for a basic template and a modification thereof.

The decision of the optimal template is finally made in accordance with a flow chart of FIG. 23 showing a routine for the motion area extraction. FIG. 24 is an illustration useful for describing the area analysis and FIG. 25 is an illustration of a basic template.

(a) Detection of Maximum Motion Vector and Estimation of Main Area

In the encoding standard such as H.261, the information representative of the presence or absence of the occurrence of the motion vector is included in MTP (macroblock type) being the data indicative of the attribute of the MBK. In this case, in the H.261 standard, when the MTP value is 2, 3, 6, 8 and 10, this is the data representative of the fact that the motion vector occurs (see FIG. 33). Accordingly, as the motion vector detection result in the H.261 encoding, there is made an array of the MBK attribute (MBK, MTP, CBP)

as shown in FIGS. 20 to 22. In FIGS. 20 to 22, 12 GOBs are arranged in two lines and in six steps and 33 MBKs stand in eleven lines and in three steps in relation to each GOB. In FIG. 20 MBA values are shown as the MBK values, in FIG. 21 MTP values, and in FIG. 22 CBP values. In this case, the area including the block having the maximum motion vector is taken as the main area. For the evaluation of the magnitude of the motion vector, a panning vector being a motion component accompanying the motion of the camera 3 is subtracted in advance. For this panning vector, there are known various calculating methods, for example, as a simple calculation there is known a method of calculating the average of the motion vectors in the circumferential portion of the scene.

(b) Analysis with respect to Time

In the above case, if the block attribute array is examined on only one frame, difficulty is experienced to specify the object area. Thus, the analysis with respect to time is made over the time corresponding to approximately three frames as shown in (a) and (b) of FIG. 24 (see FIG. 19 and see step D1 of FIG. 23). Particularly, in the area where the motion vector occurs, the three frames are piled up to form a pattern (step D2) and the position of the center of gravity of that pattern is calculated (step D3) so that the motion vector at each position is decided according to the number of decisions set as follows (step D4):

i) two times or more (appearance of the motion block) for three times (decision) in the case of a block in which the distance from the center of gravity exceeds a threshold; and ii) once or more (appearance) for three times (decision) in the case of a block in which the distance from the center of gravity is below a threshold.

An isolating point area and a noise area are removed from the object area through the obtained motion vector (step D5), and the center of gravity of the remaining object area is again calculated (step D6), and even the height h and width w of the object area is calculated. Subsequently, for example, for the person head, the 2D template head is scaled with (h, w) to roughly obtain the distance L0 to the camera 3 (step D7). For a higher-accuracy application of the template, the following operations are done (step D8).

(c) Check of 2D Template and Scaling

A block pattern comprising motion blocks is distinguished to extract a feature quantity. If the person mode is manually selected in advance, as shown in FIG. 25 the basic template for the person mode is selectable from a 2D pattern data base 27. For the basic template, front picture 2D templates of a person upper half, a full length, a head portion and so on are prepared as default patterns in accordance with a mode previously anticipated through a decision tree (see FIG. 19). Secondly, the selected template is adaptively corrected in shape. This correction includes the alignment of the center of gravity, scaling and local expansion and contraction (see (c) of FIG. 24). For the selection and correction of the optimal template, a calculation is made to obtain an evaluation function F in accordance with an equation (2) which will be shown later.

i) The selection starts with a template L (>L0) slightly smaller than the template given through the analysis of the time direction.

ii) The template is overlaid on a picture undergoing the extraction of only the motion blocks, and a calculation is made to obtain the number $N_{MBK}(L)$ of motion vector blocks included in its area.

iii) The scale is enlarged (the distance L is shortened).

iv) If the distance L goes below a constant value Lmin, the operation advances to the next step. Otherwise, the operation returns to ii).

v) The distance L is viewed as being optimal when the following evaluation function F assumes the maximum value Fmax.

$$F = -\times N_{MBK}(L) \qquad (2)$$

where B represents a second order differential value on L of a curve of $N_{MBK}(L)$.

In a discrete expression, $$F = -B(n) \times N_{MBK}(L_n)$$

$$B(n) = A(n) - A(n-1)$$

$$A(n) = N_{MBK}(L_n) - N_{MBK}(L_n - 1) \qquad (2a)$$

where $L0 > L_n - 1 > L_n$. That is, $L_n$ starts from a value slightly smaller than L0 and becomes discretely smaller. This corresponds to gradually increasing the template.

(d) 2D Template Including Quantization Scale Information

Figure 42A:
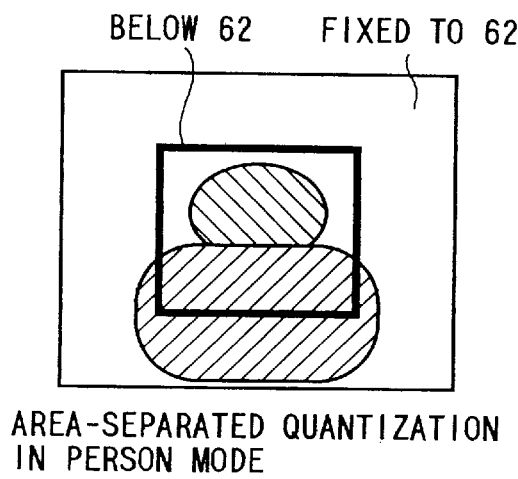
FIGS. 42A and 42B are illustrations useful for describing an area-separated quantization and a quantization template in a person mode.
Figure 42B:
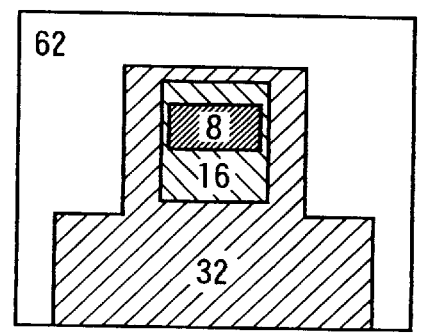
Figure 43:
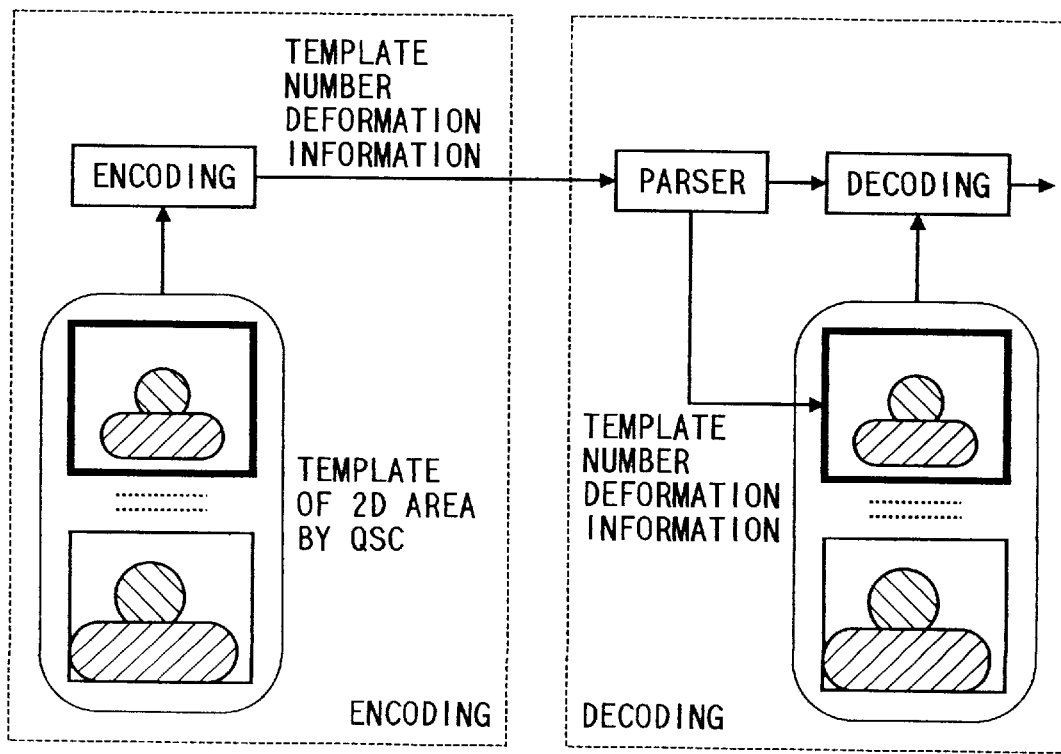
FIG. 43 is an illustration for describing a model-based transmission of a quantization template.

Although the binary expression of the 2D template is possible, as will be described later, each MBK attribute array values can also previously be expressed corresponding to a model. For example, a quantization scale as shown in FIGS. 42 and 43 comes into consideration, which will described later.

(e) Analysis of 2D Motion Pattern

As patterns a person moves in a scene, as also shown in FIG. 25 there are considered horizontal motions (corresponding to pictures arranged in transverse directions in the illustration) and motions along the optical axis of the camera 3 (equivalent to pictures arranged vertically).

(2) Production of 2D Template Based on 3D Model

As shown in FIGS. 12 and 13, in the person mode under a limited environment, the 2D template equal to that of FIG. 25 is producible through the perspective transformation of a 3D model. Thus, it is possible to achieve portions such as an upper half, a head, eyes, a mouth and a nose. However, in the case of the pictures other than the front picture, it is necessary to obtain the positional attitude of the object person with respect to the camera 3. This will depend upon a general method, and the description of its contents will be omitted for brevity.

(3) Decision of Category of Object Area (a) Decision Based upon State Transition Graph In the mode control state transition diagram of FIG. 19 there is partially included a decision tree for specifying the category of the object area. The transition between the joints on this decision tree is made through two ways: the probability search based on the default probability and the probability based on the decision information.

(b) Decision Using MBK Attribute

Of the blocks variation takes place, particularly in the block fine texture variation occurs, the score value of CBP is expected to rise, which is usable as the base for the decision of the head area in the person upper half mode.

(4) Background Memory

Figure 26:
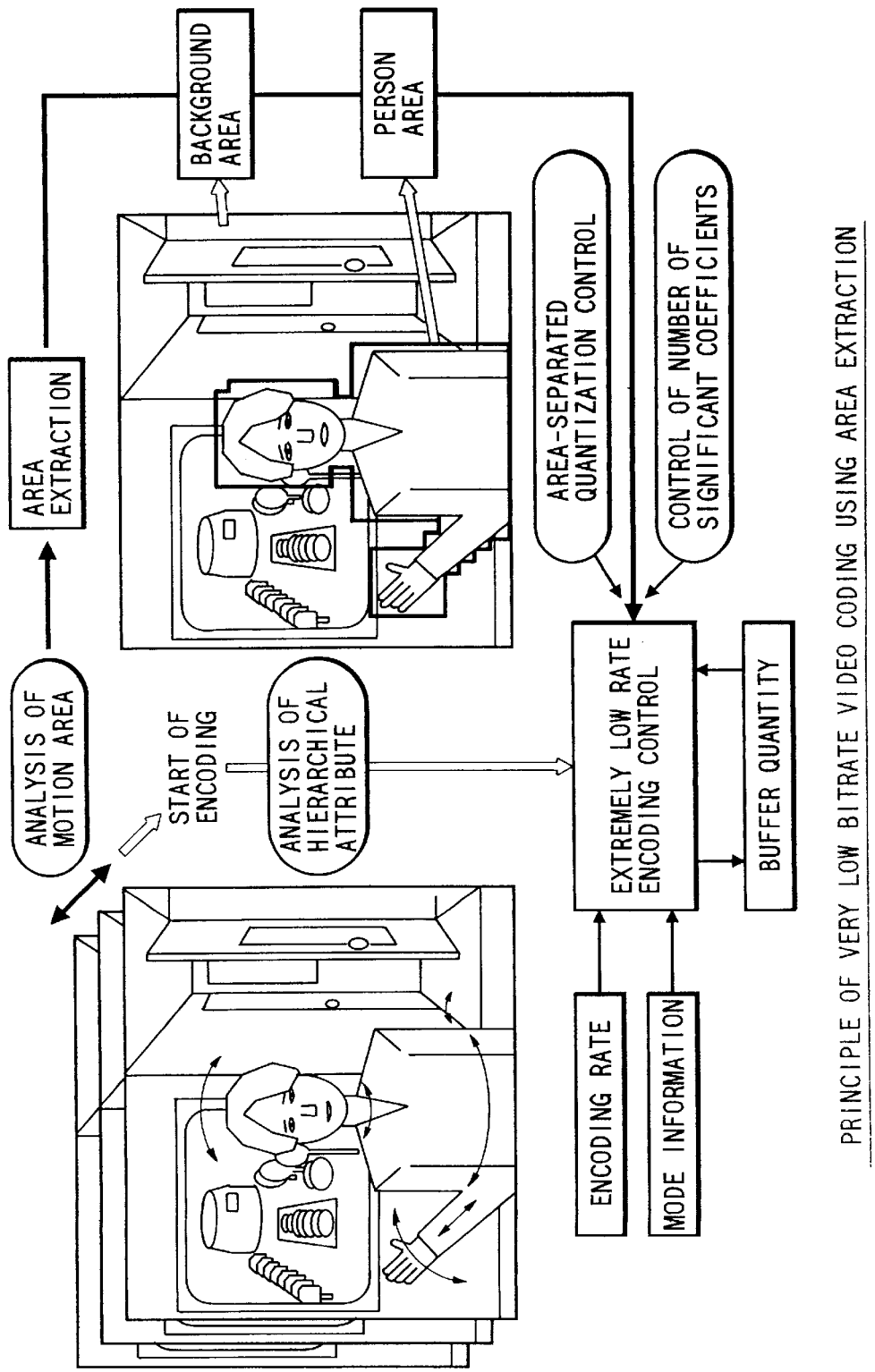
FIG. 26 is an illustration for describing the principle of accomplishing an extremely low rate by the extraction of a person area.
Figure 27B:
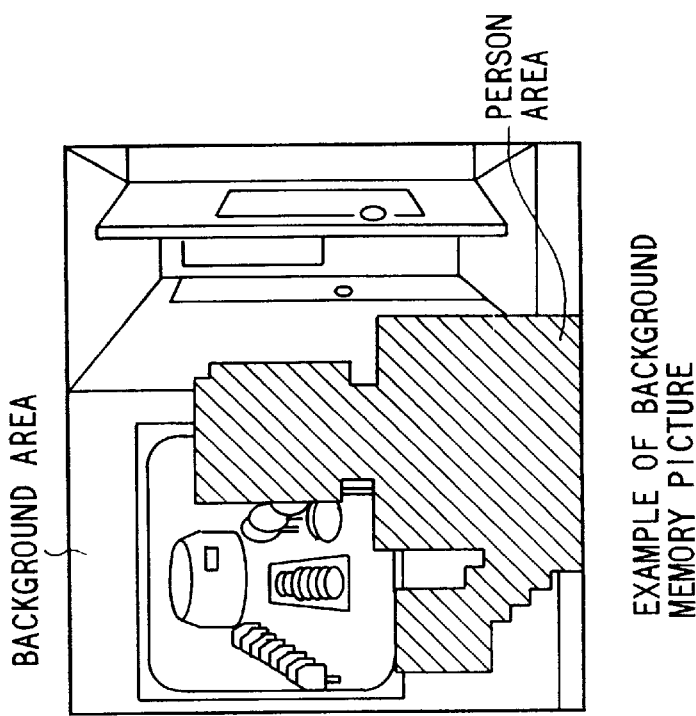
FIG. 27B is an illustration of an example of a background memory picture.
Figure 27A:
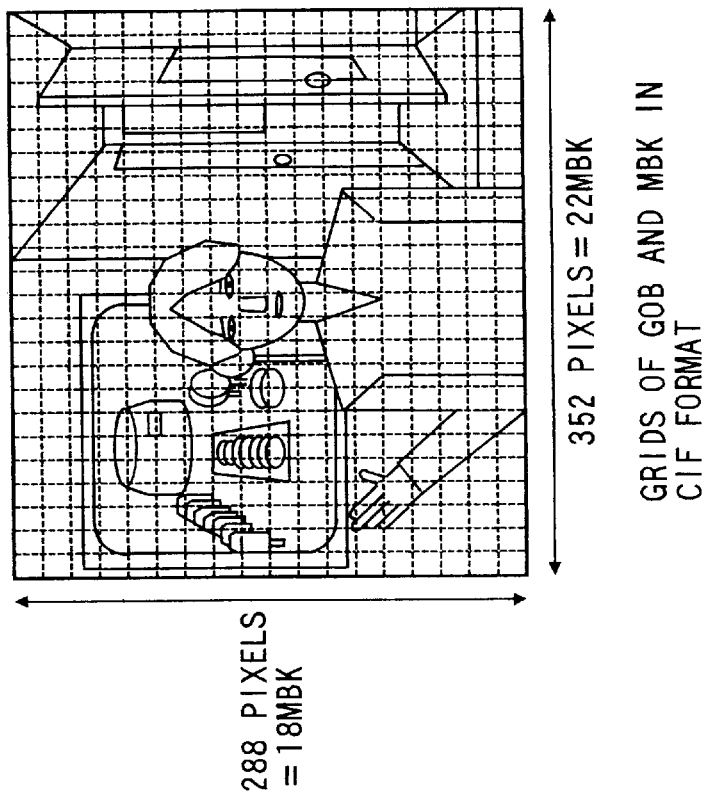
FIG. 27A is an illustration of GOB and MBK grids in CIF.
Figure 28:
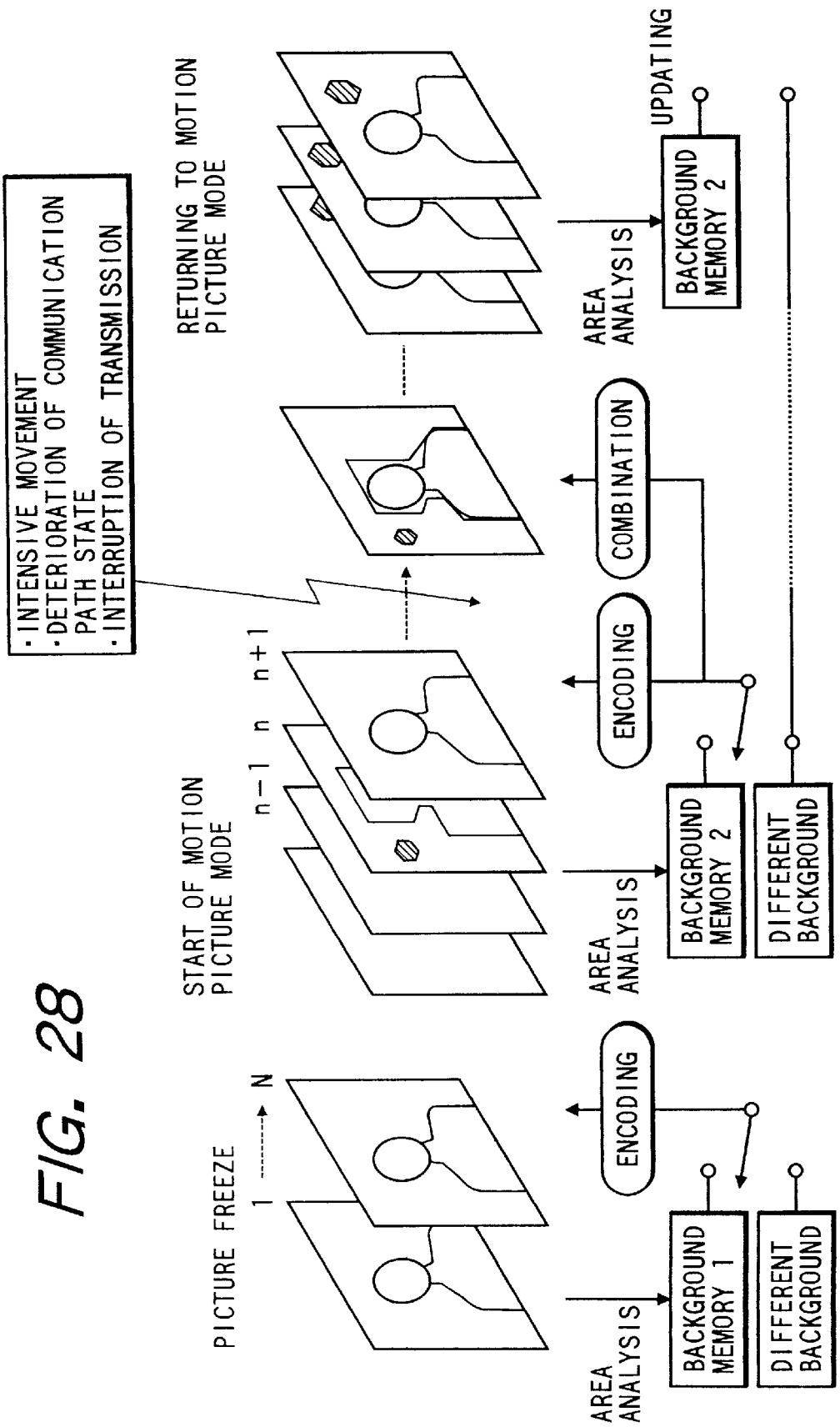
FIG. 28 is an illustration for describing the use and updating of a background memory.

At the time of the completion of the transmission of the forced INTRA frame, the area extraction processing is always done so that the encoder 1 carries out the processing to particularly store the information on the background portion in the background memory 32. This processing is also done for the storage in the background memory 66 of the decoder 2. This is for substituting the data stored in the background memory 32 for the background information in the frame in order to control the increase in data transmission quantity when a decision is made as intensive variation of motion or color takes place. That is, as shown in FIGS. 26, 27 and 28 all the background areas currently undergoing the encoding are set to FIXD, and the use of the background memory is declared in the user data area. On this declaration, the decoder 2 side reads out the latest background information from the background memory 66 and overlays the background information on the object area information such as a person picture transmitted to reproduce a picture.

FIG. 26 shows the outline of the encoding control for accomplishing the extremely low rate. The motion area is analyzed on the basis of the picture signals of a plurality of frames to extract the object area to obtain the background area and the person area to perform the area-separated quantization control and the number control of the significant coefficients on the basis of the obtained background area and person area. In addition, the setting of the encoding rate and the addition of the mode information are made while the encoding control is implemented in accordance with the buffer quantity. For extracting the person areas shown in FIG. 27A the area is specified in units of MBK of GOB in CIF, and, therefore, the background area is attainable in a similar way (see FIG. 27B).

FIG. 28 is a conceptional view showing the case of using the data stored in the background memory 32. The data of the background area obtained through the area analysis in the encoder 1 side is stored in the background memory 32 (the background memory 1 in the illustration), and in the middle of transmitting a motion picture after the start of the motion picture mode, it takes in and stores the data of the background area at all times. In addition, the decoder 2 side also stores the data of the background area in a similar way. In case that the data transmission interrupts due to the deterioration of the communication path or other troubles during the communication, the decoder 2 side reproduces the scene on the basis of the data of the background area stored in the background memory and compensates for the picture reproduction before the restoration of the motion picture transmission in such a manner as to transmit the retransmission demand to the encoder 1 side.

[A-4] Encoding Control Operation

Figure 29:
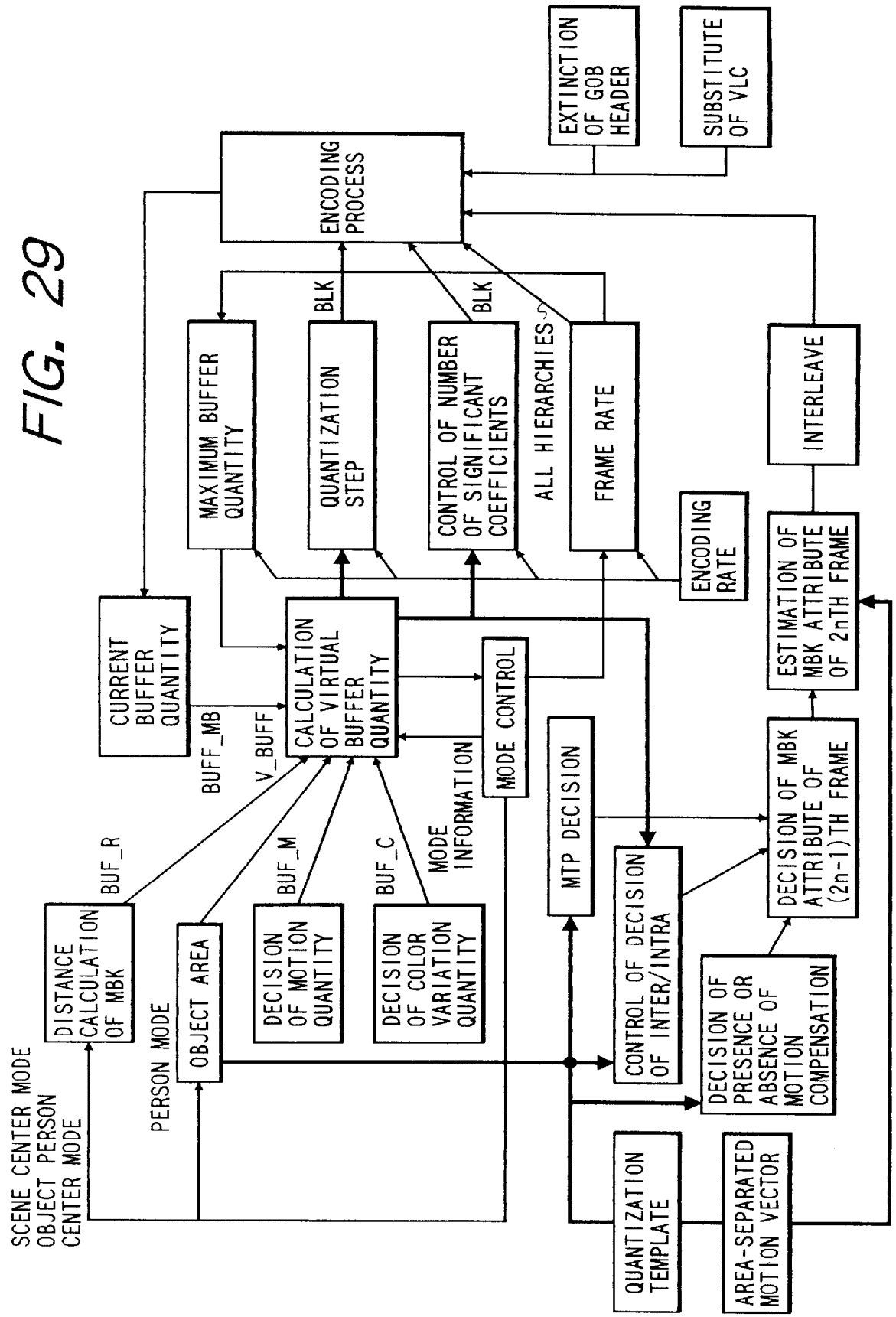
FIG. 29 is a chart available for describing the concepts of the entire encoding control.
Figure 30:
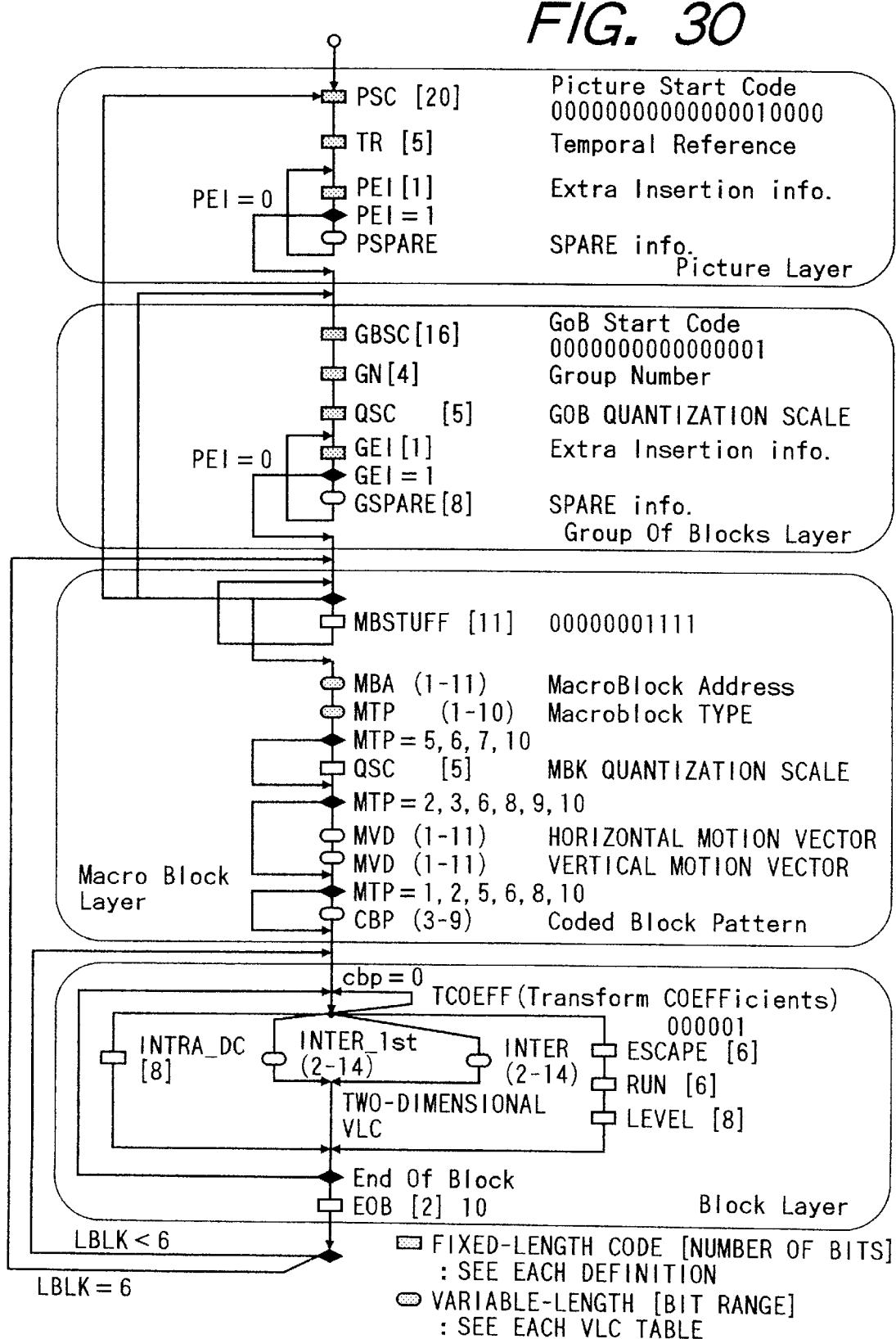
FIG. 30 is an illustration of a bit stream syntax according to the H.261 standard.

FIG. 29 entirely shows the outline of the encoding control operation, and FIG. 30 generally illustrates a syntax of an encoded bit stream under the H.261 standard. A detailed description will be made hereinbelow of the encoding control operation in items with reference to FIGS. 29 and 30.

(1) Change of Bit Stream Syntax

Figure 31:
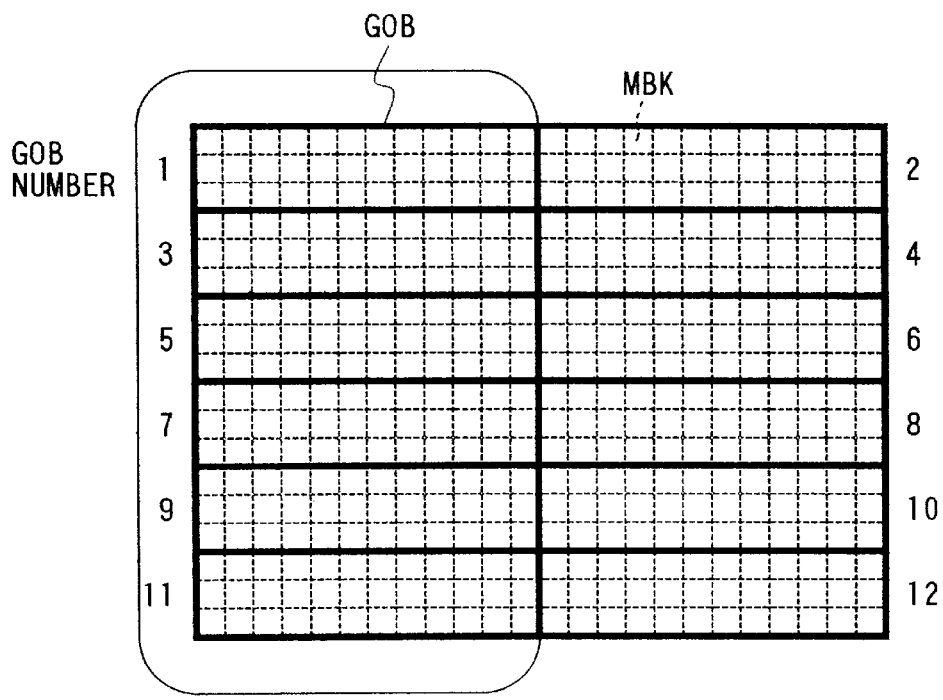
FIG. 31 is an illustration for explaining a GOB number and an added portion of a header (GBSC)
Figure 32A:
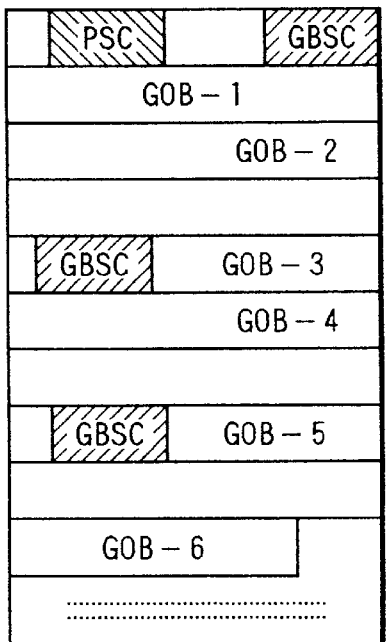
FIGS. 32A and 32B illustrations for the comparison between the reduction of a GOB header and no reduction of the GOB header.
Figure 32B:
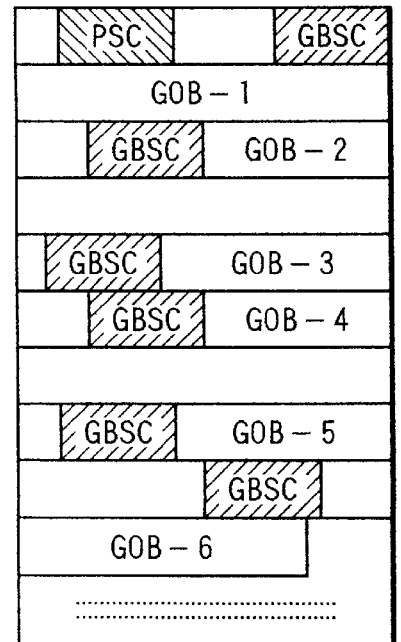

The redundant header in a syntax (see FIG. 30) under the H.261 standard is omitted with a view to accomplishing the extremely low rate. For this purpose, the arrangement of GOBs in the CIF structure does not undergo alteration, whereas in terms of 12 GOBs organizing the scene as shown in FIG. 31 the GBSC (16 bits) being the starting header of GOB and the GOB number code (4 bits) are added to the left-side GOBs but not added to the right-side half to halve the data quantity (see FIGS. 32A, 32B), with the result that the reduction of 20×6=120 bits per frame becomes possible.

(2) Adaptive Switching of Variable-Length Encoding (VLC) Table (a) Substitute of Code Word FIG. 33 shows variable-length codes of an MTP (macroblock type) attribute under the H.261 standard. For example, according to the experiment at an extremely low rate by the inventor, the occurrence probability of each MTP value with respect to the person picture is as shown in FIG. 34. Accordingly, with the substitute of the variable-length code relative to the MTP value according to the order as shown in FIG. 34, the number of bits for the statement of the attribute becomes reducible. If this substitute pattern is limited to be several in number and the selecting way thereof is written in the user data area, even the decoder 2 side can alter the substitute pattern in accordance with the situation so that the adaptation becomes flexible.

Incidentally, according to the experiment result, in the object area the MTP value generally results in being 2 or 3, and in the case of the person upper half, since the both reach approximately 100 to 150 in total, the reduction of approximately 200 to 300 bits per frame is possible in such a manner that each code or sign length is changed to 1 and 2 (2 and 3 at present).

(3) Adaptive Control of Decision Characteristic of Attribute (a) Adaptive Control for MTP Decision Using Area Information 1) In terms of the background area FIX (fixing) or NOMC (no motion compensation) can be set using the area information.

2) In terms of the object area, the person, particularly its face, is decided as being MC-CO (motion compensation and encoding).

(b) Adaptive Control for INTER/INTRA Decision

Figure 35:
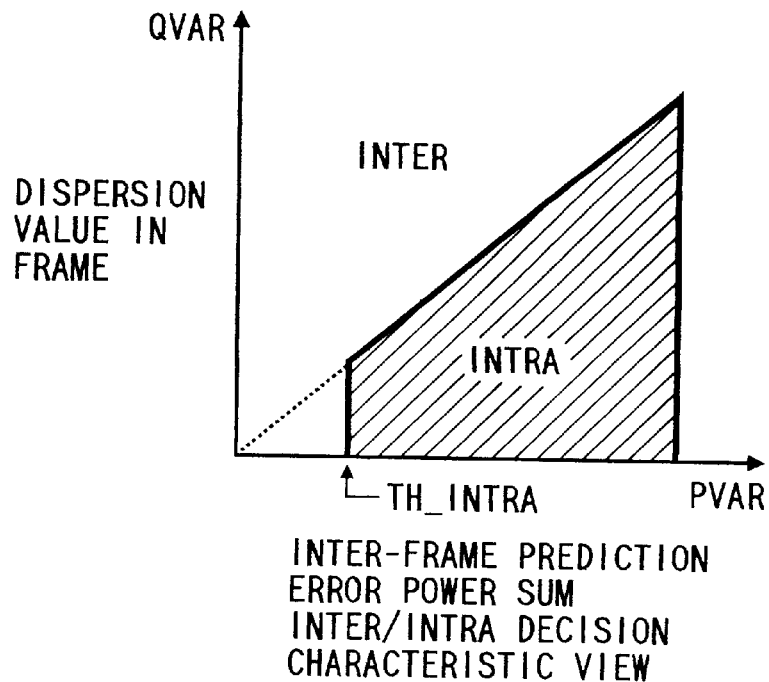
FIG. 35 is an illustration of an INTER/INTRA decision characteristic.

In general, the characteristic curve for the INTER/INTRA decision recommended under the H.261 standard above 64 kbps becomes as shown in FIG. 35. In this case, PVAR is indicative of an inter-frame prediction error power sum related to four Y blocks of MBK, while QVAR is representative of the dispersion value in a frame of an input picture concerned with four Y blocks of MBK. At the rate below 64 kbps, the decision is made as follows.

1) In order to prevent the error propagation, the forced INTRA is inputted in a state of periodic dispersion.

2) For example, a threshold TH_INTRA is set as follows. That is, the charging rate RB of the FIFO buffer 11 is calculated according to the following equation (3) and is decided using comparative reference values RB1 and RB2 or the like to set the threshold TH_INTRA.

$$RB = BUFF/BUFF\_MAX \qquad (3)$$

In this equation, RB, BUFF and BUFF_MAX are indicative of the current charging rate, the current number of used bits and the maximum bit capacity of the FIFO buffer 11, respectively. The decision is made by dividing into the following three cases.

(Case 1) $0 \leq RB < RB1$
(Case 2) $RB1 \leq RB < RB2$
(Case 3) $RB2 \leq RB$

In accordance with the decision result and in correspondence with each case, the threshold TH-INTRA is set as follows.

(Case 1) TH_INTRA=64×256
(Case 2) TH_INTRA=64×256 (the main portion of the object area)
TH_INTRA=64×512 (other than the main portion of the object area)
TH_INTRA=64×1024 (the background area)
(Case 3) TH_INTRA=64×256 (the main portion of the object area)
TH_INTRA=64×1024 (other than the main portion of the object area)
TH_INTRA=64×2048 (background area)

In the above-mentioned instance, when the area information is not clear, as described in the picture center preference mode or the object area center-of-gravity mode the area in which the distance from the center of gravity is within a given range is defined as the object area. Further, as described above, the threshold TH_INTRA comes under control.

$$R\_IR = IR\_MBK/IRMBK\_MEAN \quad (4)$$

$$NTH = TH\_INTRA \times (R0 + R\_IR) \quad (5)$$

$$RPQ = RVAR/(QVAR \times R\_IR) \quad (6)$$

In these equations, IR_MBK represents the distance from the center of gravity of the object area to MBK being currently under encoding, and IRMBK_MEAN designates the average distance from the center of gravity of the object area to all MBKs.

When the values obtained through the above-mentioned equations takes $RVAR \leq NTH$ or $RPQ\_VAR \leq 1.00$, the decision is made as INTER, otherwise the decision is made as INTRA. In this case, the R0 value is set to be 0.5.

(c) Decision of Presence or Absence of Motion Compensation

Figure 36:
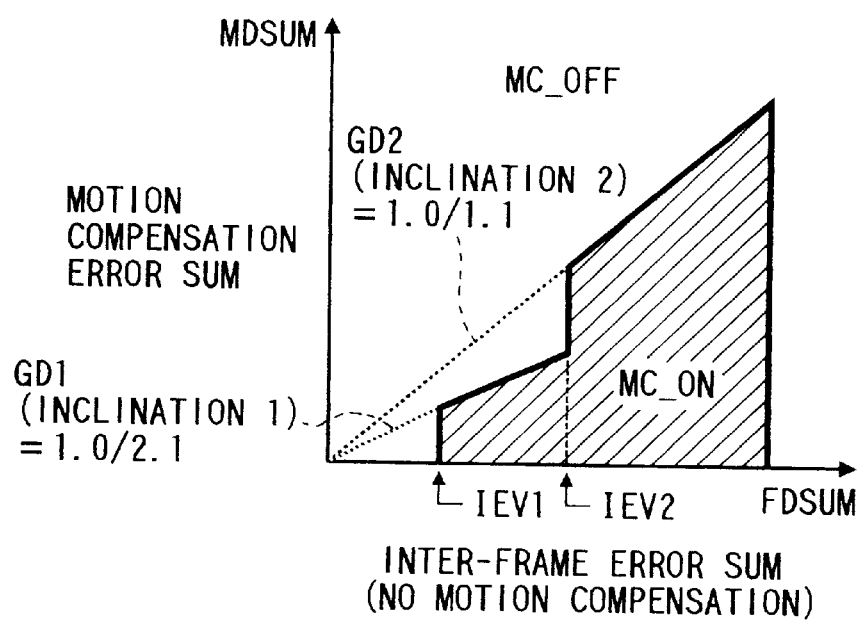
FIG. 36 is an illustration of a motion block decision characteristic.

In general, the characteristic curve for the motion decision recommended in relation to the H.261 standard above 64 kbps becomes as shown in FIG. 36. In FIG. 36, the horizontal axis represents the inter-frame error sum FDSUM in the case of no motion compensation while the vertical axis signifies the error sum MVSUM in the case of the presence of the motion compensation. In this instance, the area the motion compensation (MC-ON) is made is set to be surrounded by the parameters GD1 and GD2 indicative of the inclinations of two straight lines and the parameters IEV1 and IEV2 representative of the thresholds relative to two FDSUMs. At the rate below 64 kbps, the respective values of the parameter set (GD1, GD2, IEV1, IEV2) of the characteristic curve are altered as follows according to the buffer quantity and the area. The buffer charging rate RB can be expressed by the aforesaid equation (3).

$$RB = BUFF/BUFF\_MAX$$

where similarly RB, BUFF and BUFF_MAX are indicative of the current charging rate, the current number of used bits and the maximum bit capacity of the FIFO buffer 11, respectively.

(Case 1) $0 \leq RB < RB1$

In this case, the prior motion decision is employed for all the areas. Accordingly, The respective values of the parameter set of the decision characteristic are set as follows.
(GD1, GD2, IEV1, IEV2)=(0.50, 0.91, 256, 256×3)

(Case 2) $RB1 \leq RB < RB2$

In this instance, a common motion decision characteristic is employed in the interior of a size-larger rectangular area RM (which is automatically set every template taking the inter-frame motion range into consideration). Accordingly, the respective values of the parameter set of the decision characteristic are set as follows.
(GD1, GD2, IEV1, IEV2)=(0.50, 0.91, 256, 256×3)
Furthermore, in an area QM (equivalent to the background area) other than the aforesaid area, the threshold for the motion decision is set higher.
(GD1, GD2, IEV1, IEV2)=(0.40, 0.80, 256×2, 256×4)

(Case 3) $RB2 \leq RB \leq RB3$

In this instance, in the main area of RM,
(GD1, GD2, IEV1, IEV2)=(0.50, 0.91, 256, 256×3)
while in the portions other than the main area of RM,
(GD1, GD2, IEV1, IEV2)=(0.40, 0.80, 256×2, 256×4)
In the area QM,
(GD1, GD2, IEV1, IEV2)=(0.20, 0.50, 256×4, 256×8)

(Case 4) $RB3 < RB$

In this case, selection is made of one of the following operations.
1) The operation shifts to the quasi-motion mode to lower the frame rate.
2) The operation turns into the model-based mode.
3) The operation goes to the picture freeze mode.
(4) Use of Past Encoding Attribute
  (a) Feature of Each Encoding Attribute of MBK layer The MBK attribute of each frame to be stored in the attribute memory 22 forms an array of 22×18 per frame if being shown in correspondence with the MBA position on CIF.

1) MBA (macroblock address)

Figure 38A:
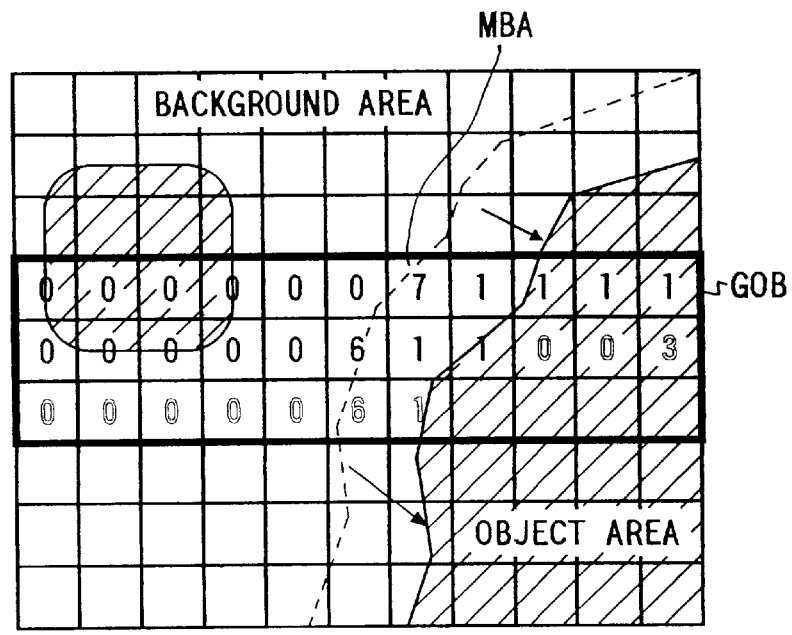
FIGS. 38A and 38B show the corresponding relationship between MBA and NFX.
Figure 38B:
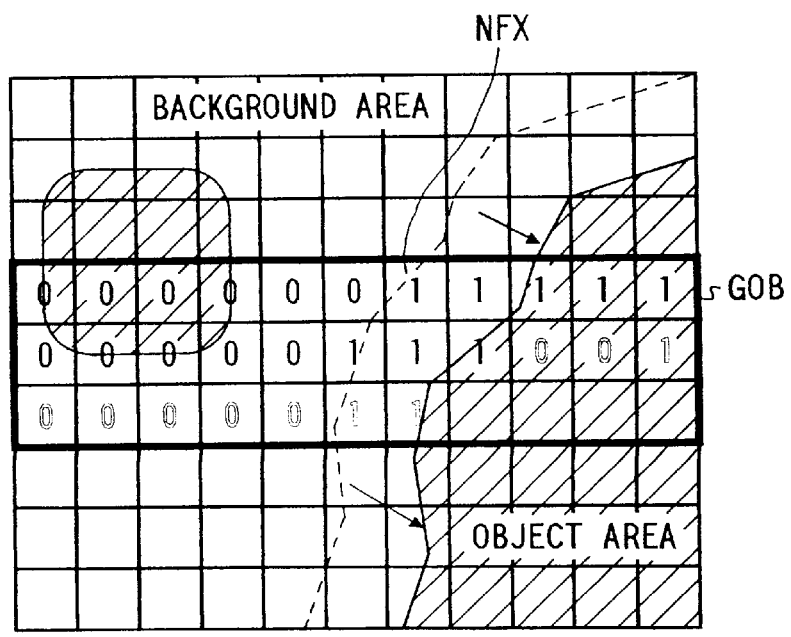

The portion corresponding to the object area from the third frame or so is treated as the significant encoding block and the MBA is given thereto. Particularly, the MBK (macroblock) the MBA shows two or more values corresponds to the outline portion of the object area. If as shown in the flow chart of FIG. 37 and FIGS. 38A, 38B and 39 the MBA pattern of the past frame (for example, preceding by one frame) is transformed into NOT_FIXED (NFX) pattern (see step E1 of FIG. 37 and see FIGS. 38A and 38B), the MBA array to be taken when proceeding by one frame (coming after one frame) can estimated and expressed through the use of the average motion vector of the area information and the template information (see steps E2 to E6, and see FIG. 39). Further, the encoding control is executed on the basis of the estimated value of the MBA, besides the template information and the motion vector are encoded and transmitted (steps E7 and E8). On the other hand, in the decoder 2 side, the MBA array corresponding to one frame is solely reproducible on the basis of the template information and the motion vector.

2) MTP (macroblock type)
  i) INTER/INTRA Mixture (common frame)

Figure 40:
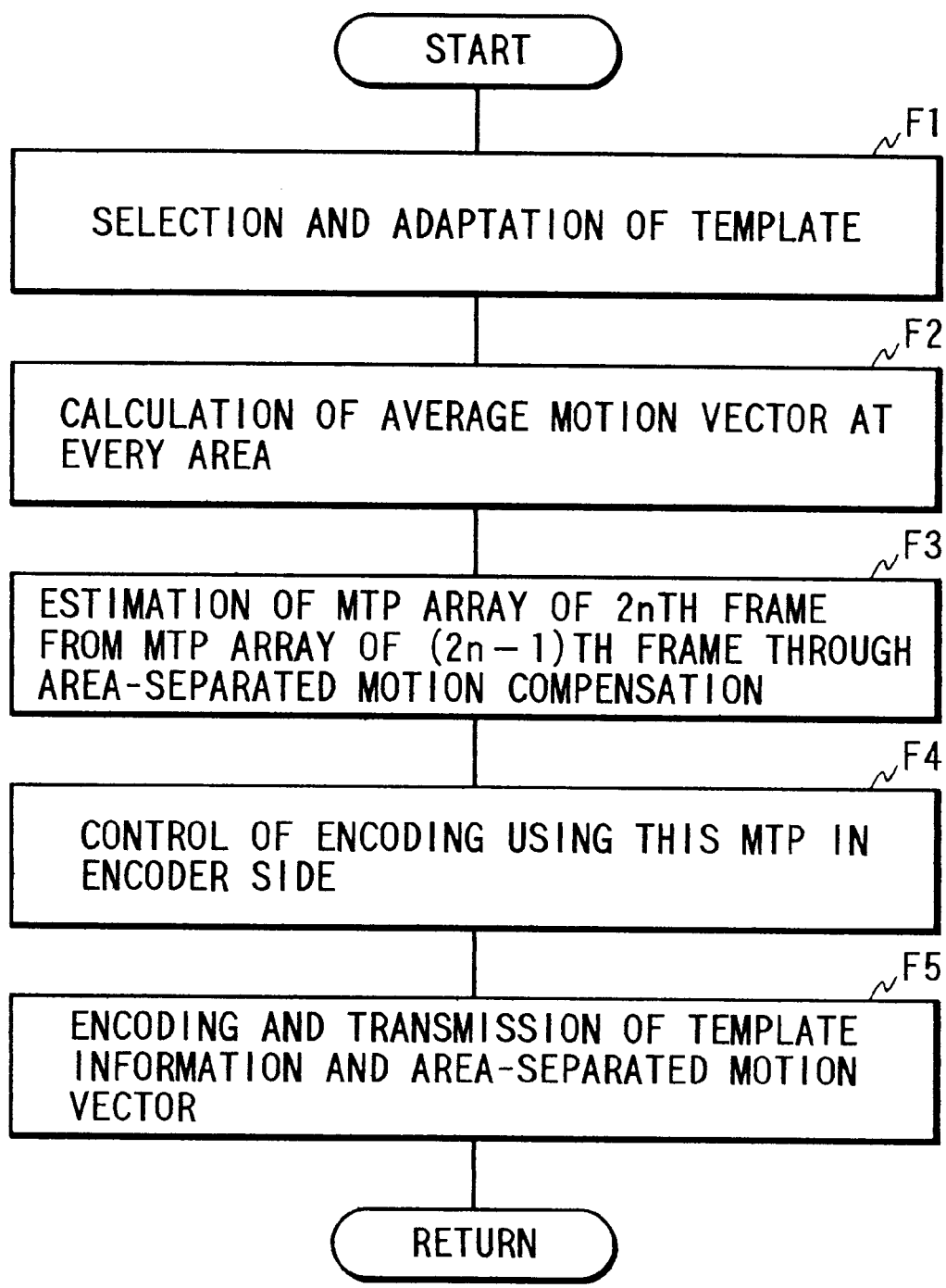
FIG. 40 is a flow chart showing a routine for reducing MTP information.
Figure 41:
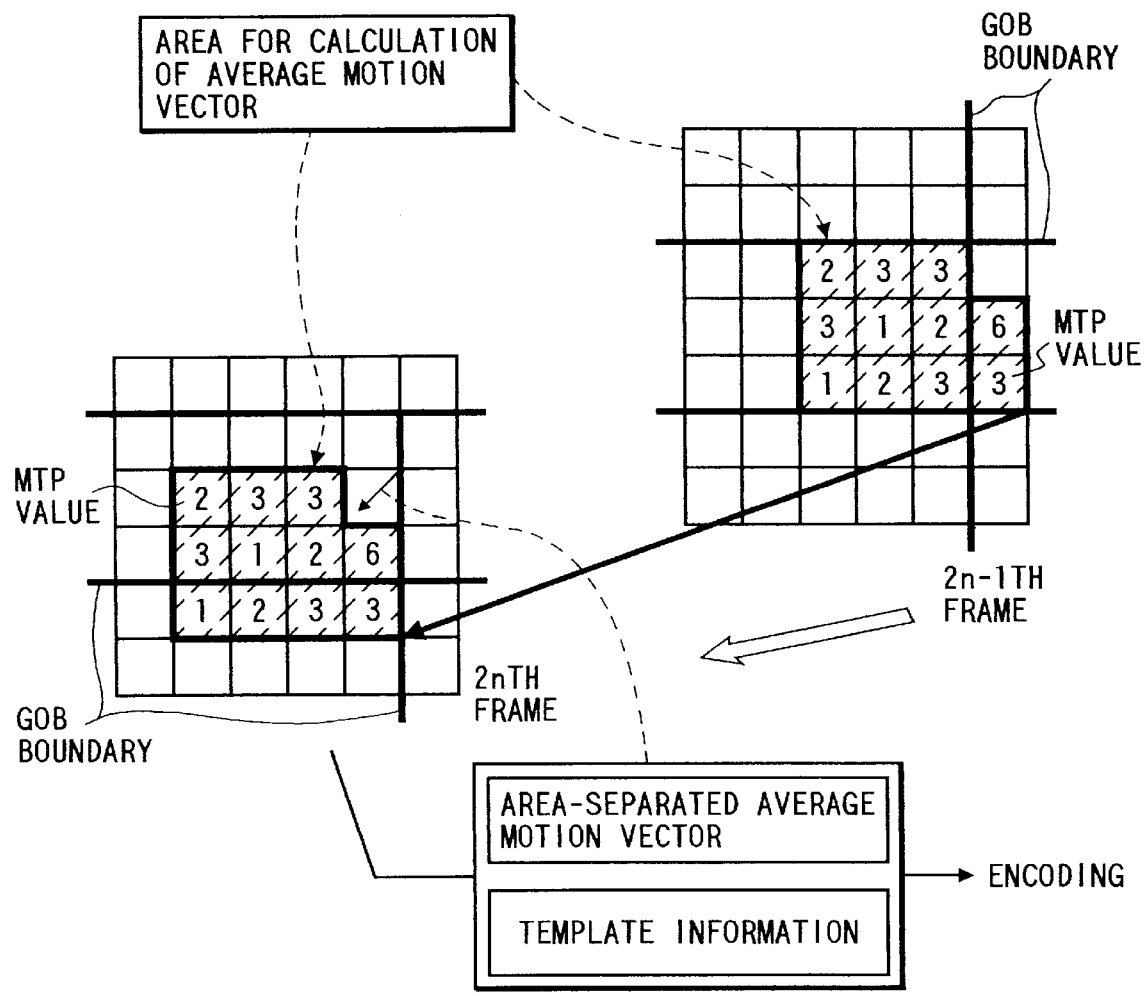
FIG. 41 is an illustration for describing the reduction of an MTP code quantity by an area-separated average motion vector.

It is found from experiments that at an extremely low rate the majority of object areas (person and so on) can be labeled with MTP=2,3. Accordingly, on the basis of the decision in the adaptive control according to the information occurrence quantity which will be described later, as shown in a flow chart of FIG. 40 and FIG. 41, if exceedingly intensive motion does not occur, the MTP array to be taken when proceeding by one frame is expressible using the average motion vector of the area information and the template information (see steps F1 to F3 of FIG. 40 and see FIG. 41). Subsequently, the encoding operation is further done by one frame on the basis of the estimated MTP value (step F4) and the template information and the area-separated motion vector are encoded and transmitted (step F5). On the other hand, in the decoder 2 side the MTP array corresponding to one frame is solely reproducible on the basis of the template information and the motion vector.

ii) Forced INTRA Frame

If declared in the user data, in the forced INTRA frame the description of the data of MTP=4 and the data of MBA=1 becomes unnecessary. Thus, it is possible to save 5×22×18= 1980 bits, i.e., approximately 2 kbits.

3) QSC (Quantization Scale)

Figure 44:
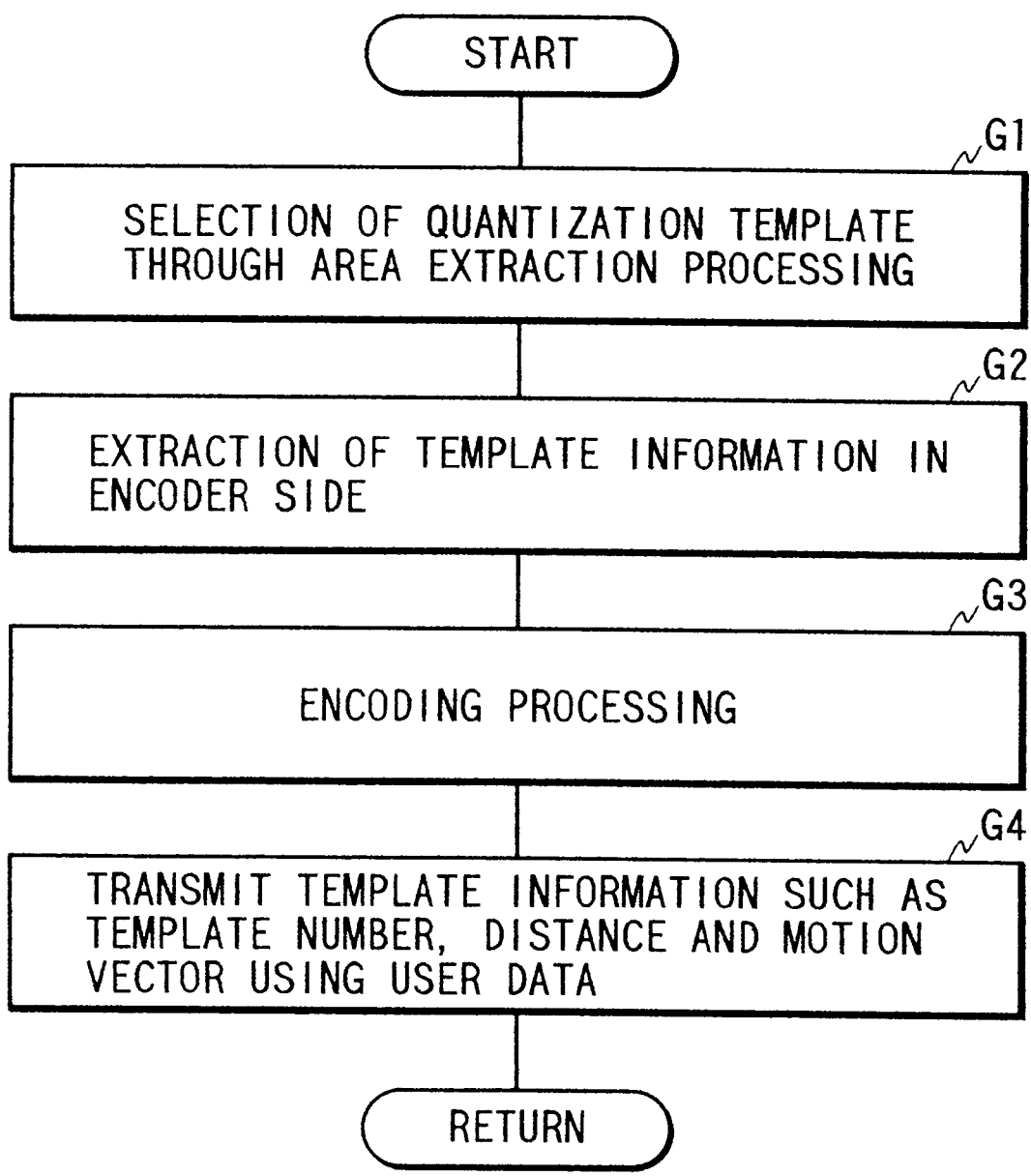
FIG. 44 is a flow chart showing a QSC setting routine.

The QSCs are all fixed to 31 (quantization step 62) when the rate is below 32 kbps, and only the main area determined through the area analysis is fixed to 16 (quantization step 32). Accordingly, in the case of the person mode at the extremely low rate, particularly below 16 kbps, the QSC information is not transmitted, with the result that the statement of the QSC information in the GOB layer becomes unnecessary to reduce the information quantity corresponding to 12×5=60 bits. In addition, the transmission of the alteration information of the quantization scale in unit of MBK becomes unnecessary. FIG. 42A shows an example of the area-separated quantization of the person mode and FIG. 42B illustrates an example of the quantization template. Further, FIG. 43 shows the outline of the transmission and reception of data between the encoder 1 and the decoder 2 at the model-based transmission of the quantization template and FIG. 44 is a flow chart showing a routine for setting the quantization scale QSC value.

4) MVD (Difference Motion Vector)

Figure 45:
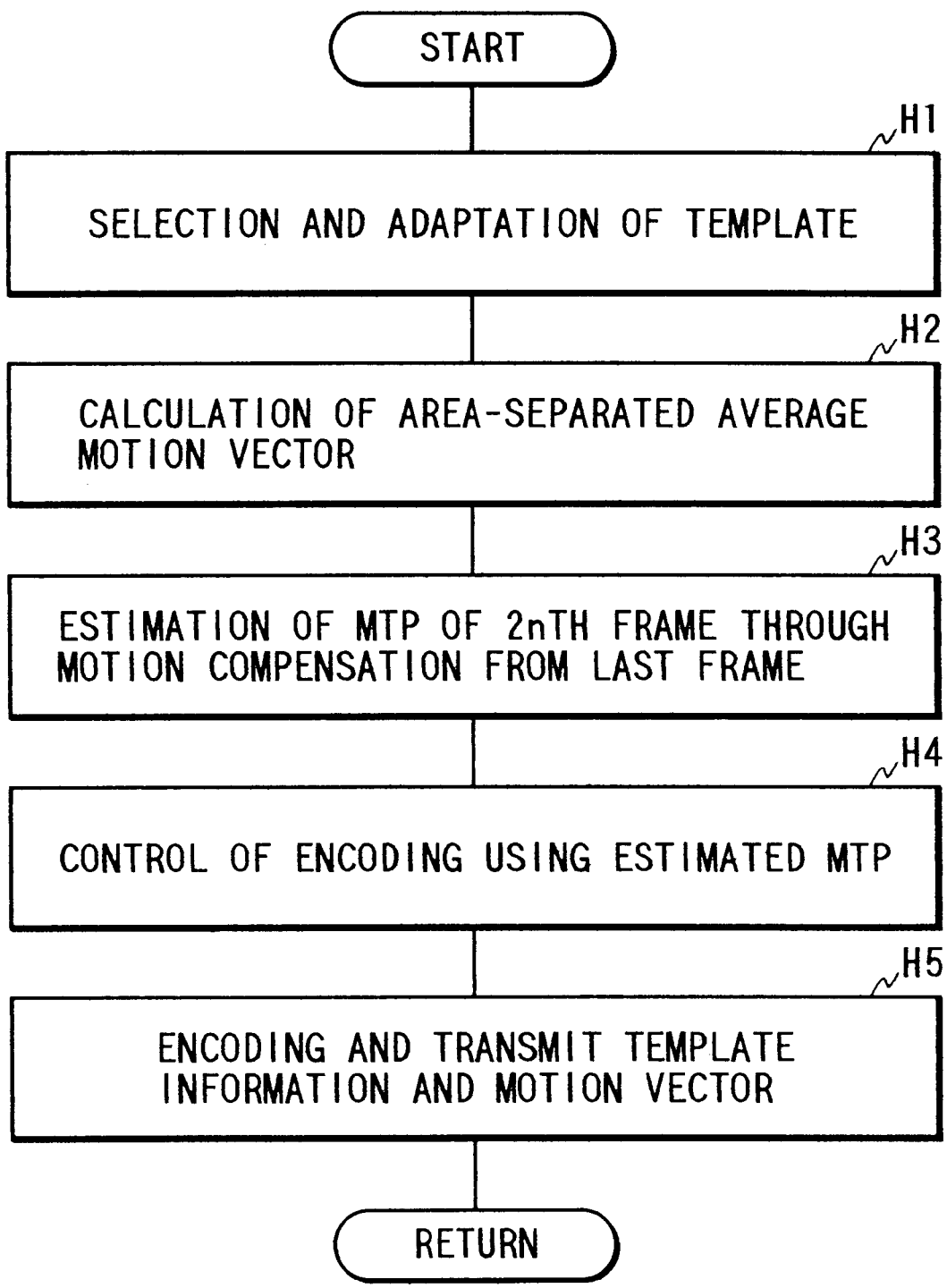
FIG. 45 is a flow chart showing an MVD information reducing routine.
Figure 46:
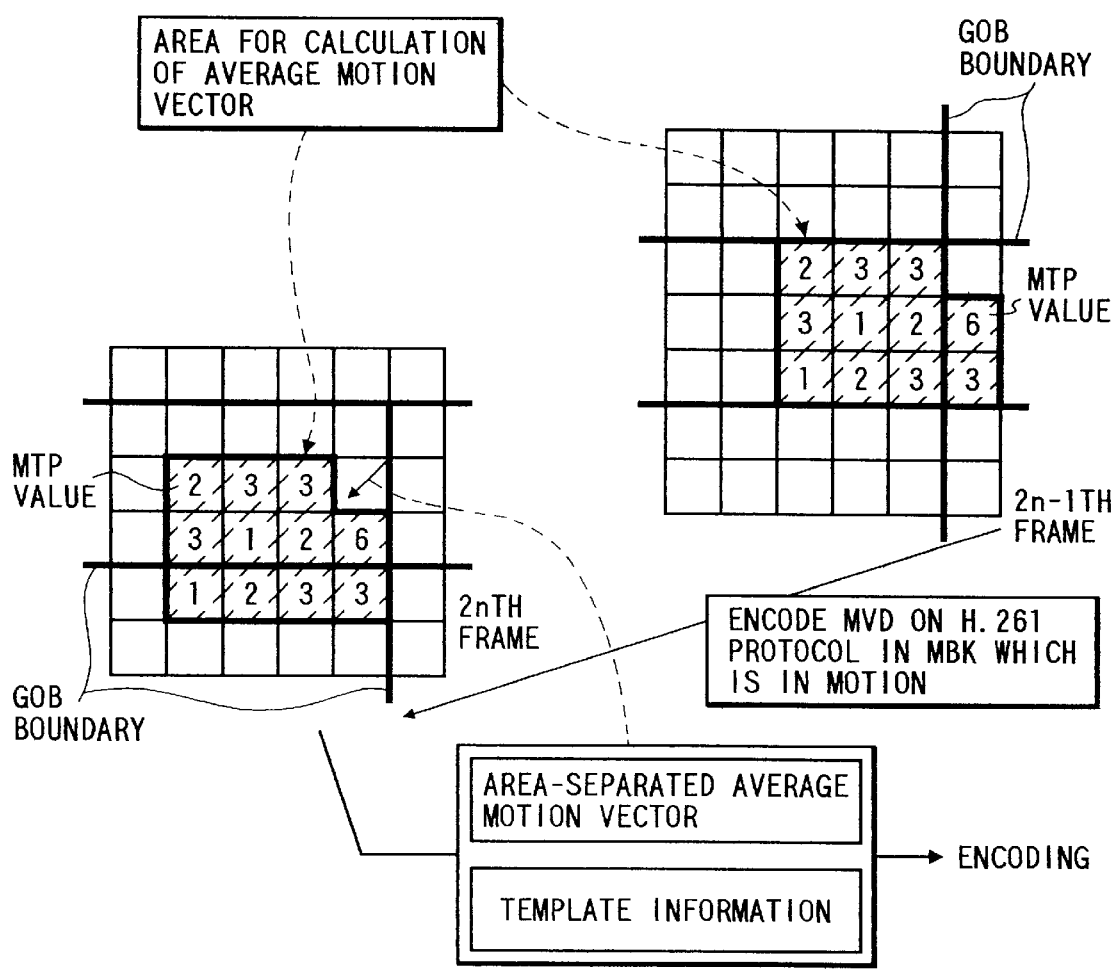
FIG. 46 is an illustration for describing the reduction of an MVD code quantity by an area-separated average motion vector.

The MVD signifies the variation of the motion vector in the horizontal direction within the frame and hence assumes values other than zero in the non-rigid motion or rotational motion, and in the case of a person, it is equivalent to the motions due to the face expression variation, the three-dimensional rotations of edge portions of the head and the upper half, and so on. Since these motions instantaneously take place, the prediction efficiency is not high when the prediction is made in the form of the difference vector. Thus, the prediction is made in such a manner that such a difference vector is transformed into a motion vector, and even the average 2D motion vector in area. The position of the occurrence of MVD is limited in MBK where the motion compensation is declared with MTP. In this case, generally the majority are expressible as MTP=2, 3. Accordingly, the MVBD information is controllable once at every two frames. FIG. 45 is a flow chart showing a routine for reducing the code quantity owing to the area-separated average motion vector and FIG. 46 is an illustration of pattern transition useful for describing the outline of the reduction control.

5) CBP (Encoded Block Pattern)

Figure 47:
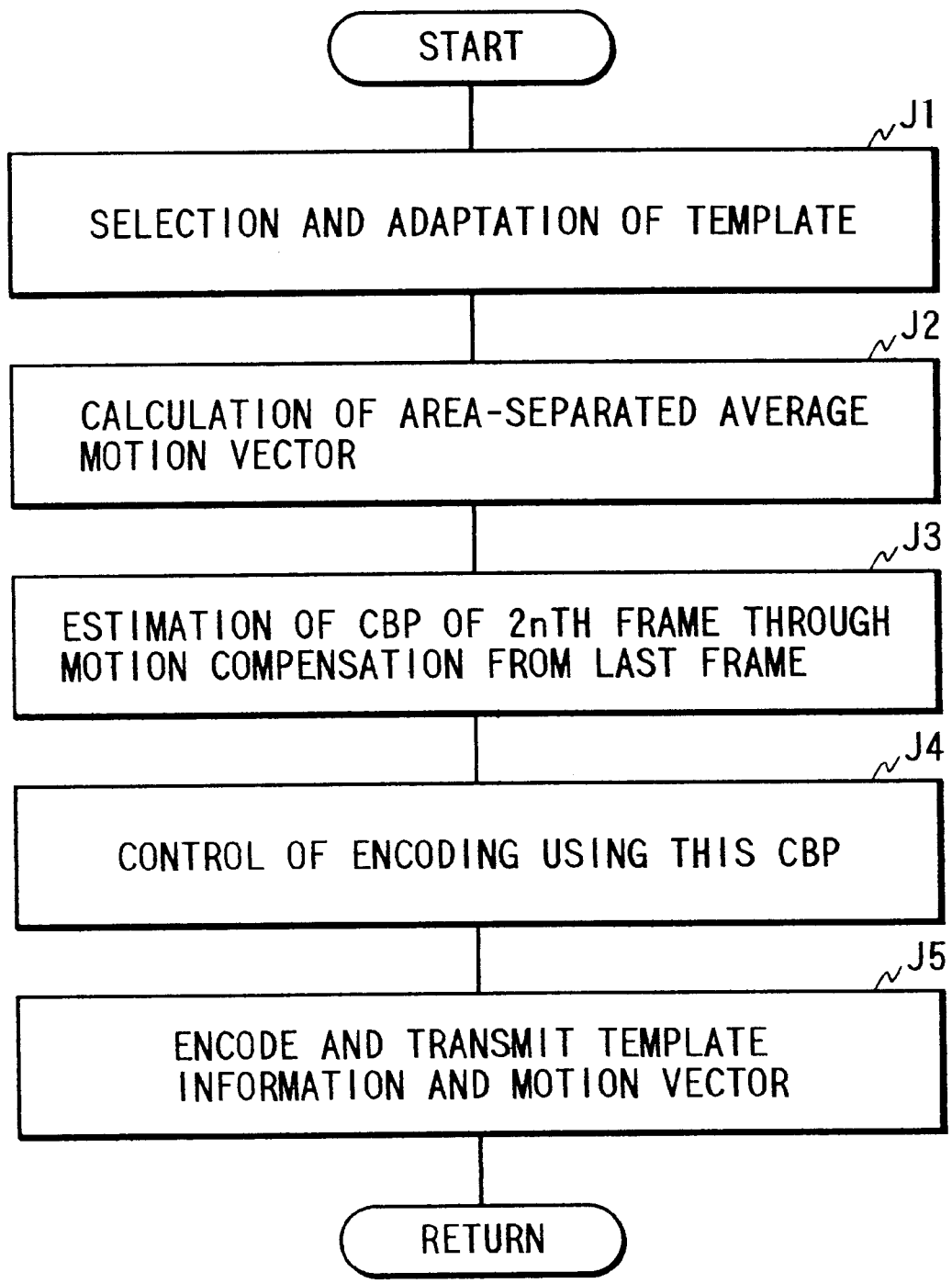
FIG. 47 is a flow chart showing a routine of a CBP prediction and evaluation.
Figure 48:
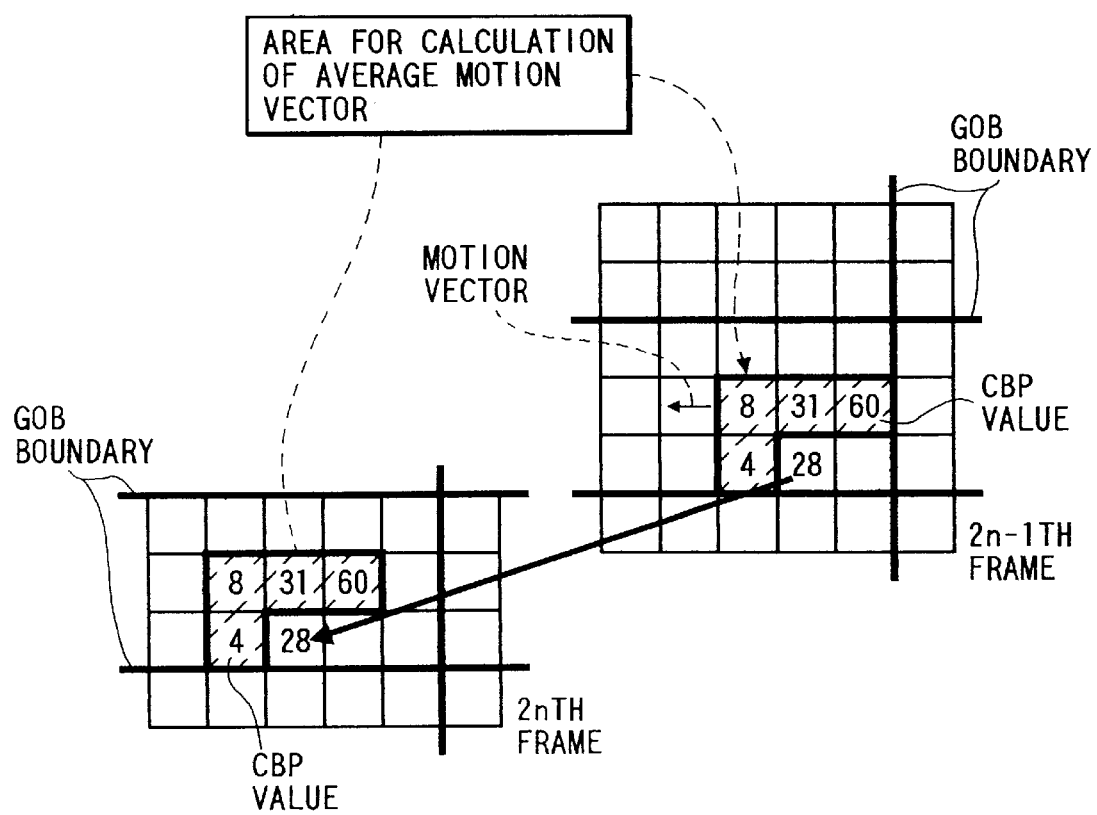
FIG. 48 is an illustration for describing an area-separated motion compensation prediction of CBP.

The CBP is for indicating, with bit information, whether or not to encode each of six BLKs (blocks) included in MBK. Thus, when the CBP value is transformed into the YUV vector, the CBP array coming after one frame is expressible using the average motion vector of the area information and the template information. On the other hand, in the decoder 2 side the CBP array corresponding to one frame is solely reproducible on the basis of the template information and the motion vector. FIG. 47 is a flow chart showing a routine for the area-separated motion compensation prediction, and FIG. 48 is an illustration of pattern transition useful for describing the outline of the prediction.

(b) Reduction of Code Quantity of MBK Attribute Using Area Information

1) Attribute Encoding at Every Two Frames

As described above, the prediction of the pattern attribute corresponding to one frame is possible by the motion compensation using the template information and the area-separated average motion vector, while even in the decoder 2 side it is solely reproducible. The predicted pattern attribute can reflect the encoding control not only in the decoder 2 but also in the encoder 1 side.

2) Alternate Prediction of Upper and Lower Portions or Interleave

Figure 49:
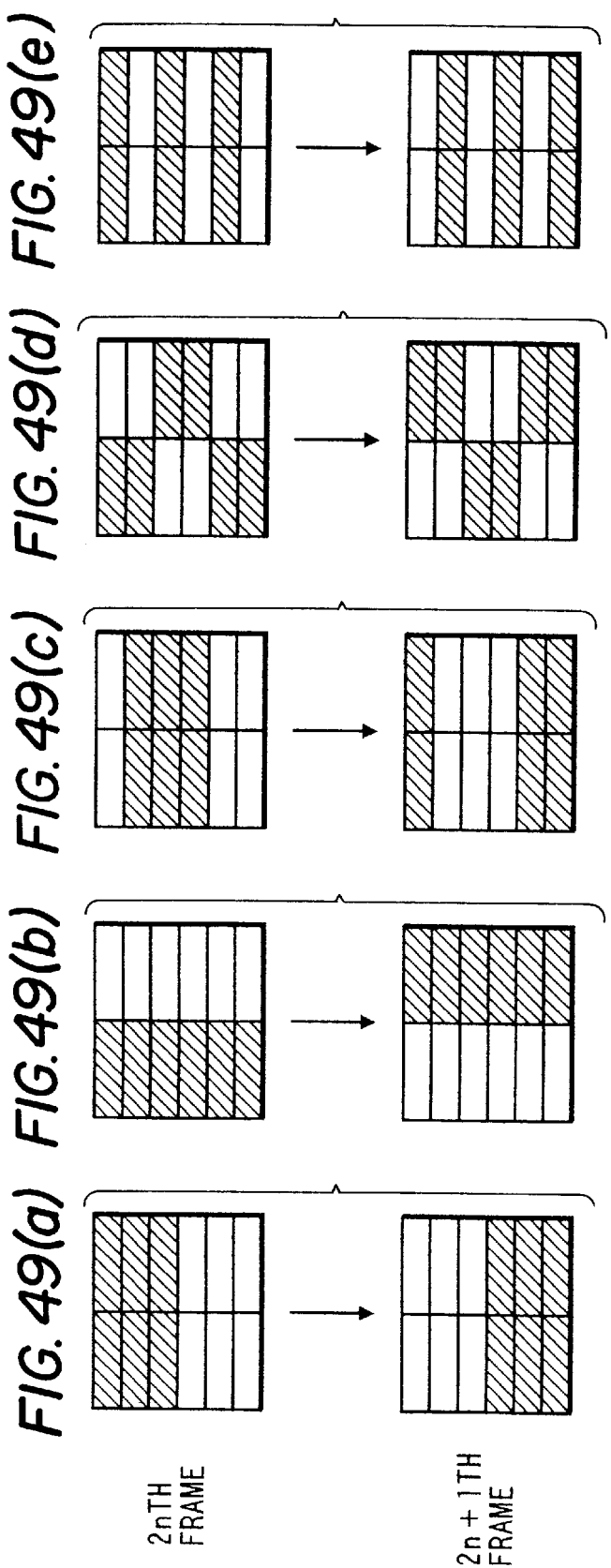
FIG. 49 is an illustration for explaining the execution of an interleave for an MBK attribute prediction.

In place of providing the completely predicted pattern attribute, as shown in (a) of FIG. 49 (or shown in (b) of the same illustration) the upper and lower portions (or the right and left side portions) can also alternately substituted for the predicted pattern in units of GOB. Although the interleaving every GOB line (see (c) to (e) of the same illustration) can be taken, since there is a possibility that discontinuity takes place in the outline indicative of the pattern, it is desirable to avoid the employment of the interleave when the object area is large.

(5) Quantization Control

The quantization control is executed in principle by the quantization step control. A method of setting the quantization steps is not determined in the H.261 standard, while its constraint is that the even number of 2 to 62 (the quantization scale value is 1 to 31) is taken for the quantization step and its expression is covered with five bits. Accordingly, in this embodiment the quantization step is controlled as follows for accomplishing the quantization control.

(a) Area-Separated Quantization Control

1) Object Area Preference Mode

In this mode, a small quantization step is assigned to the extracted object area. Further, in the background area the quantization step is fixedly set to 62. In the case that the subject is in the person mode, the number below 62 is given in only the head area, while 63 is given in principle to others (see FIG. 42A).

2) Scene Center Preference Mode

In this mode, a finer quantization step is taken in accordance with approaching the center of the scene. However, for a single quantization step control method, there is employed a method of correcting the current buffer capacity for the step calculation using the distance to the current MBK. Thus, the calculation is made in accordance with the following equations (7) and (8).

$$R\_IR = IR\_MBK/IRMBK\_MEAN \quad (7)$$

$$BUF\_R = BUFF\_MB \times (5.00 + \text{real}(IR\_MBK)/\text{real}(IRMBK\_MEAN)) \quad (8)$$

where

BUFF_MB: the buffer quantity observed in units of MBK

BUFF_R : virtual buffer quantity based on the distance calculation

IR_MBK : the distance from the center of gravity of the object to MBK being currently in an encoded condition IRMBK_MEAN: the average distance from the center of gravity of the object to all MBKs This virtual corrected buffer quantity BUFF_MB value is used for a control equation based on the encoding rate which will be described later.

(b) Control Based on Buffer Quantity

In the aforesaid case, in general the quantization control is performed, while the forced INTRA frame transmission does not depend on the quantization control according to the buffer quantity. In general the forced INTRA frame is transmitted in the following cases. That is, 1) the first picture at the time of the start of the motion picture or the retransmission;

2) the Quasi-motion mode;

3) the still picture mode (picture freeze); and 4) the texture source picture in the model-based mode.

The quantization step depends upon a control equation according to the encoding rate which will be described later.

(c) Control According to Encoding Rate

An equation for determining the quantization step (STEP FPIC) according to the encoding rate (RATE) is set as follows.

1) Quantization Step in Forced INTRA Frame when 1152<RATE→STEP_FPIC=12.0 when 384 kbps<RATE<1152 kbps→STEP_FPIC=14.0 when 64 kbps<RATE<384 kbps→STEP_FPIC=16.0 when RATE<64 kbps→STEP_FPIC=32.0

2) Ordinary Quantization Ste $$ISTEP = 2 \times INT(BUFF\_MB/(200.0 \times QX64) + 2 \quad (9)$$

where

BUFF_MB: the current data quantity in the buffer

QX64: a value satisfying encoding rate=QX64×64.00 [kbps]

In the case that the encoding rate is below 16 kbps, frequently changing the quantization causes the increase in the necessary number of bits. For this reason, in the case of below 10 kbps, the quantization step is fixedly set to 62.

(d) Adaptive Control According to Information Occurrence Quantity

The quantization and frame rate control are executed on the basis of the degree of motion and the degree of color variation.

1) Decision of Intensity of Motion

For the degree of the motion of the current frame with respect to the past frame, a calculation is made in accordance with the following equation (10) to obtain an index AM so that the quantization and the frame control are implemented on the basis of the decision resulting from this index AM value.

$$AM = \sum_{i=1}^{Nmb} L(Vi) \quad (10)$$

where

Nmb: the number of blocks where motion takes place

L(X): the norm function of the vector X, the absolute distance, the Euclid's distance and so on Vi: the motion vector Using the AM value calculated through the equation (10), a scale AMT is newly calculated. In this case, the scale AMT is calculated as follows. That is, i) when AM≦THV(Rd), AMT=0; and ii) when AM>THV(Rd), AMT=AM where Rd: the transmission data rate THV(Rd): the threshold constant depending upon the data rate The object range of Nmb and THV corresponding to this range are altered as follows in accordance with the calculation ability of the encoding processor. That is, i) from the first MBK of the current frame to the MBK being currently under decoding;

ii) from the first MBK of the current GOB to the MBK being currently under decoding;

iii) all the MBKs of the current GOB; and iv) all the MBKs of the current frame.

In the case of i) and ii), since the global operation is unnecessary, the calculation quantity is little and no delay of processing occurs, whereas the reliability of the decision is low. On the other hand, in the case of iii) and iv), since the global calculation is necessary, the calculation quantity increases, while the processing delay is a maximum of one-frame time. However, the reliability of the decision is high.

2) Decision of Intensity of Color Variation

For the degree of the intensity of the color variation of the current frame with respect to the past frame, a calculation is made in accordance with the following equation (11) to obtain an index AC, and the quantization and the frame control are implemented according to the decision result based on the AC value.

$$AC = \sum_{i=1}^{Ncb} C(i) > THC(Rd) \quad (11)$$

where

Ncb: the number of blocks in which the CBP block attribute is 1;

C(i): the function for calculating the color variation by the YUV vector on the basis of the variation of the DC component of the DCT coefficient and the CBP with regard to the $i^{th}$ macroblock; and THC(Rd): the threshold constant depending on the data rate.

Using the AC value calculated through the equation (11), the scale ACT is newly calculated as follows. That is, i) when AC≦THC(Rd), ACT=0; and ii) when AC>THC(Rd), ACT=AC.

The object of Ncb and the corresponding THC are altered as follows in accordance with the calculation ability of the encoding processor. That is, i) from the first MBK of the current frame to the MBK being currently under decoding;

ii) from the first MBK of the current GOB to the MBK being currently under decoding;

iii) all the MBKs of the current GOB; and iv) all the MBKs of the current frame.

In the case of i) and ii), since the global operation is unnecessary, the calculation quantity is little and no delay of processing occurs, whereas the reliability of the decision is low. On the other hand, in the case of iii) and iv), since the global calculation is necessary, the calculation quantity increases, while the processing delay is a maximum of one-frame time. However, the reliability of the decision is high.

3) Calculation of Virtual Buffer i) Increment of Virtual Buffer based on Motion Quantity MBK in the object area where no motion occurs: BUF_M=16×(AMT/aM)

MBK in the object area where motion occurs: BUF_M=0

MBK in the background area: BUF_M=32×(AMT/aM)

where aM represents the number corresponding to the average motion quantity per 1 MBK, and for example, it is set as aM=16.

ii) Increment of Virtual Buffer Based on Color Variation Quantity

MBK in the object area where no color variation takes place: BUF_c=BMBK×(ACT/aC)

MBK in the object area where the color variation takes place: BUF_c=0

MBK in the background: BUF_c=2×BMBK×(ACT/aC)

where aC signifies the number corresponding to the average color variation per 1 MBK, for example, aC=128, and BMBK designates an estimated value of the average code quantity per 1 MBK, which is given in accordance with the following equation.

BMBK=QX64×64000/(Frate×NMBK) where Frate denotes the current frame rate and NMBK depicts the number of MBKs in one frame.

(6) Control of the Number of Significant Coefficients

Under the H.261 the quantized DCT transform coefficients are scanned in a zigzag pattern in units of a block and the obtained one-dimensional sequence of quantized coefficients is expressed with a binominal set (called event) of a non-zero level and the length of the subsequent zero-run. In this case, the high-frequency component coefficient is considered to hardly visually contribute to the extremely low rate, and with the restriction of the number of events per block, the number of corresponding VLCs can be reduced to achieve the reduction of the number of bits as a whole. More specifically, when the number of the DCT significant coefficients (non-zero) successively obtainable in the order from the low-frequency component by means of the zigzag scanning exceeds a given value, the remaining DCT coefficients are compulsorily regarded as being zero. At this time, the upper limit number Ncf ($\leq 64$) being treated as the threshold is switched in accordance with the encoding rate, the area, the motion occurrence quantity and the encoding mode. Since the information on the upper limit number is not required to send to the decoder 2 side, the encoding is unnecessary. The aforesaid DCT significant coefficient number control is actually executed as follows. For example, the following states are assumed:

encoding mode: the person mode
encoding rate: 8 kbps
RB=V_BUFF/BUFF_MAX
V_BUFF=BUF_R+BUF_M+BUF_C
BUFF: the current buffer quantity
BUFF_MAX: the maximum capacity of the buffer
(RB1, RB2, RB3, RB4, RB5)=(0.2, 0.3, 0.5, 0.8, 1.0)
(Ncf0, Ncf1)=(16, 8)

For the decision, the control is implemented in the following six cases according to the buffer charging rate BF. The values designated at RB1 to RB5 are the threshold values for the decision which are previously set according to the contents of the control.

(Case 1) $0 \leq RB < RB1$

A maximum of 64 significant coefficients are set in all the areas.

(Case 2) $RB1 \leq RB < RB2$

A maximum of 64 significant coefficients are set in the object area while a maximum of Ncf0 significant coefficients are set in the background area.

(Case 3) $RB2 \leq RB < RB3$

A maximum of Ncf0 significant coefficients are set in all the areas.

(Case 4) $RB3 \leq RB < RB4$

A maximum of Ncf1 significant coefficients are set in all the areas.

(Case 5) $RB4 \leq RB < RB5$

The background is used for the background, while the portions that exist in the memory is expressed with only the DC component. A maximum of Ncf1 significant coefficients are set in the object area.

(Case 6) $RB5 < RB$

One of the following conditions i) to iii) is chosen in accordance with the other conditions and so on. That is, i) the control goes to the quasi-motion picture mode;
ii) the control goes to the model-based mode; and
iii) the control performs the picture freeze.

(7) Adaptive Switching of Frame Rate (a) Statement of Change Instructions of Frame Rate In the bit stream syntax (see FIG. 30) under the H.261 standard, the setting of the TREF (Temporal Reference) value of the PIC layer allows the statement of the instruction to the decoder 2 in the frame rate change. However, in this embodiment the frame rate change is treated as a dependent means for accomplishing the extremely low rate. The method therefor and the factor to the execution will be described hereinbelow.

(b) Method of Changing Frame Rate

After the A/D conversion of the motion picture in the encoder 1 side, the change of the frame rate is achievable by determining whether or not to supply the raw picture data to the encoding loop in units of a frame. Accordingly, this frame-dropping (thinning-out) information can reflect the aforesaid TREF.

(c) Factor to Change of Frame Rate

The factors to the change of the frame rate can be summarized as follows. That is, 1) the switching according to the buffer capacity; and
2) the switching according to the transmission rate (for example, 8 kbps→5 frame/sec).

In the motion picture mode, the initial frame rate is set in accordance with the transmission rate. For instance, the following frame rates are set in relation to the encoding rate QX64.

| | | |
|---|---|---|
| $QX64 \geq 18$ | → | 30 frame/sec |
| $18 \geq QX64 \geq 10$ | → | 30 frame/sec or 15 frame/sec |
| $10 > QX64 \geq 6$ | → | 15 frame/sec |
| $6 > QX64 \geq 1$ | → | 15 frame/sec or 10 frame/sec |
| $64 > QX64 \times 64 \geq 32$ | → | 10 to 7 frame/sec |
| $32 > QX64 \times 64$ | → | below 10 frame/sec |

3) the switching according to the motion occurrence quantity
4) the change of the mode

[A-5] Description of Operation According to Encoding Processing Program

Figure 6:
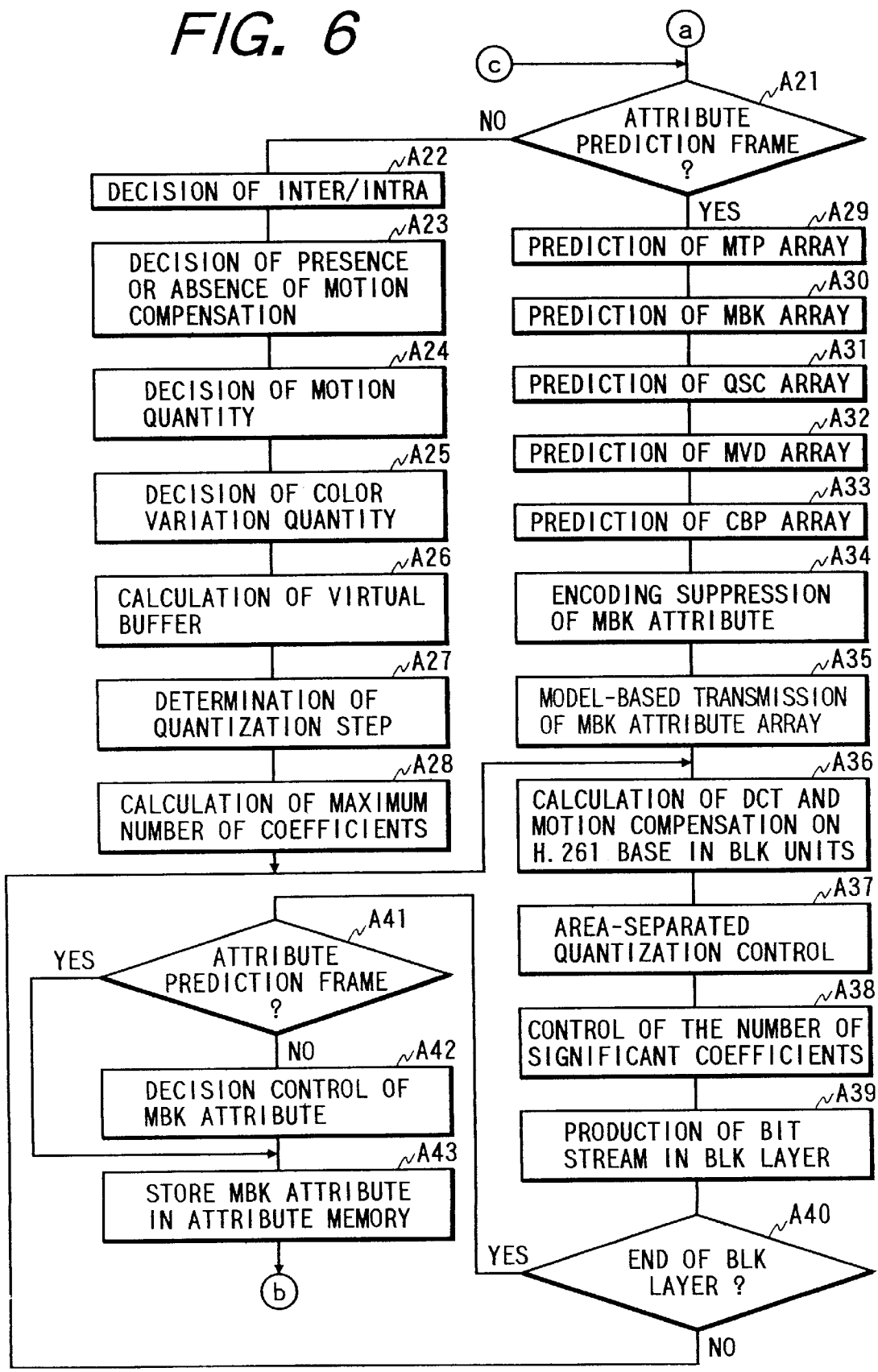
FIG. 6 is a flow chart showing another portion of the same encoding processing program.
Figure 7:
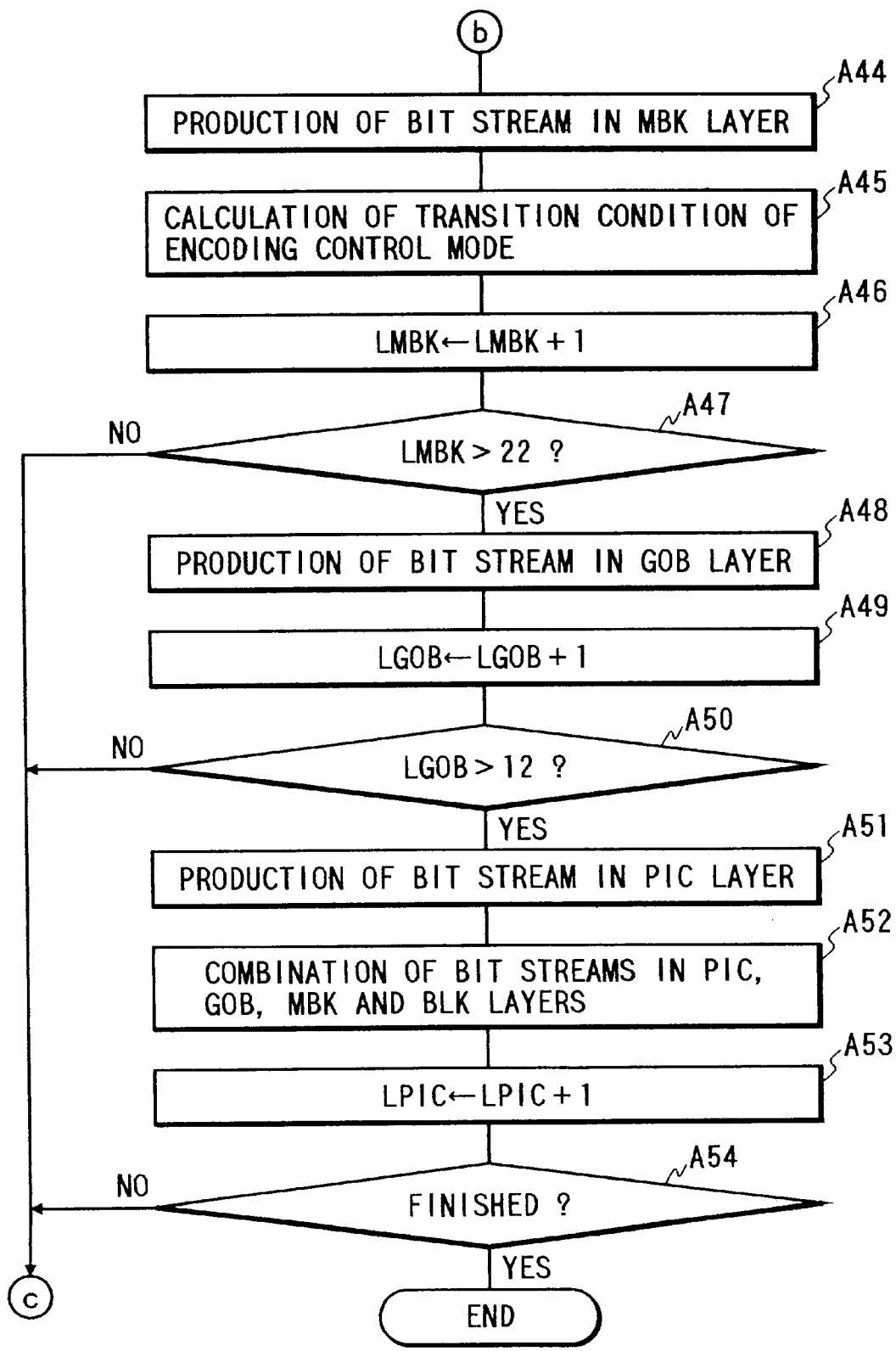
FIG. 7 is a flow chart showing a further portion of the same encoding processing program.
Figure 8:
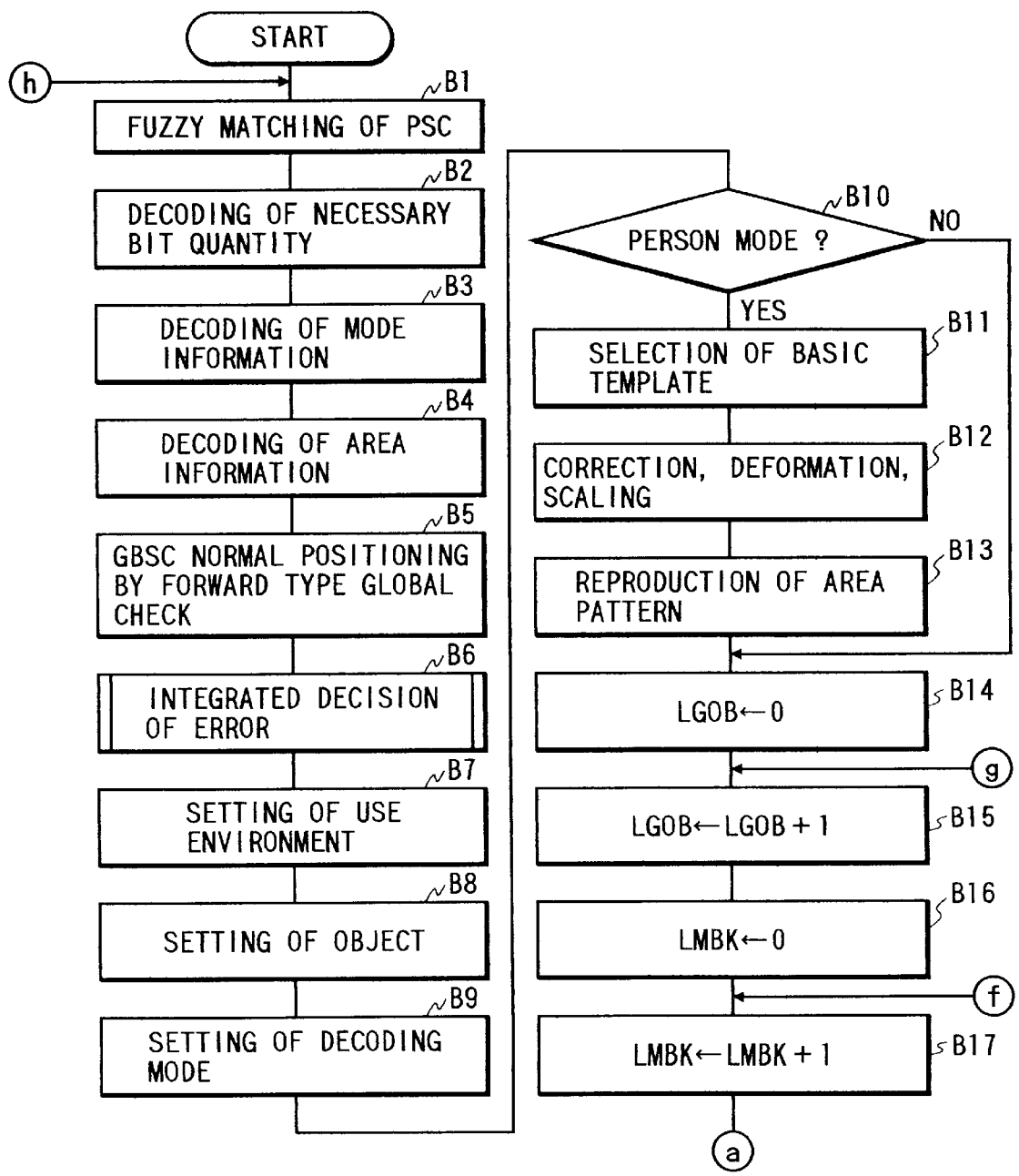
FIG. 8 is a flow chart showing a portion of a decoding processing program.
Figure 9:
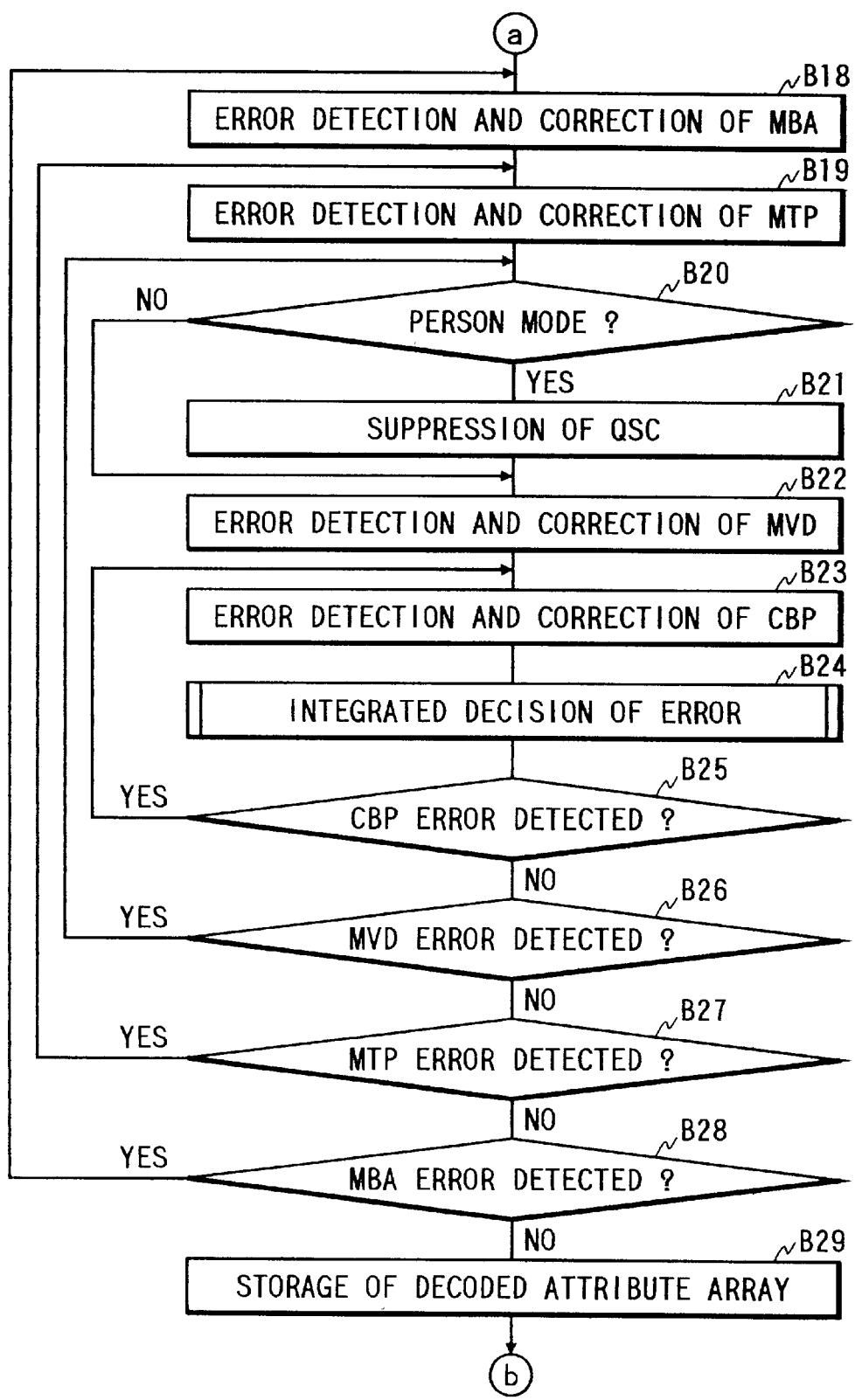
FIG. 9 is a flow chart showing another portion of the same decoding processing program.
Figure 10:
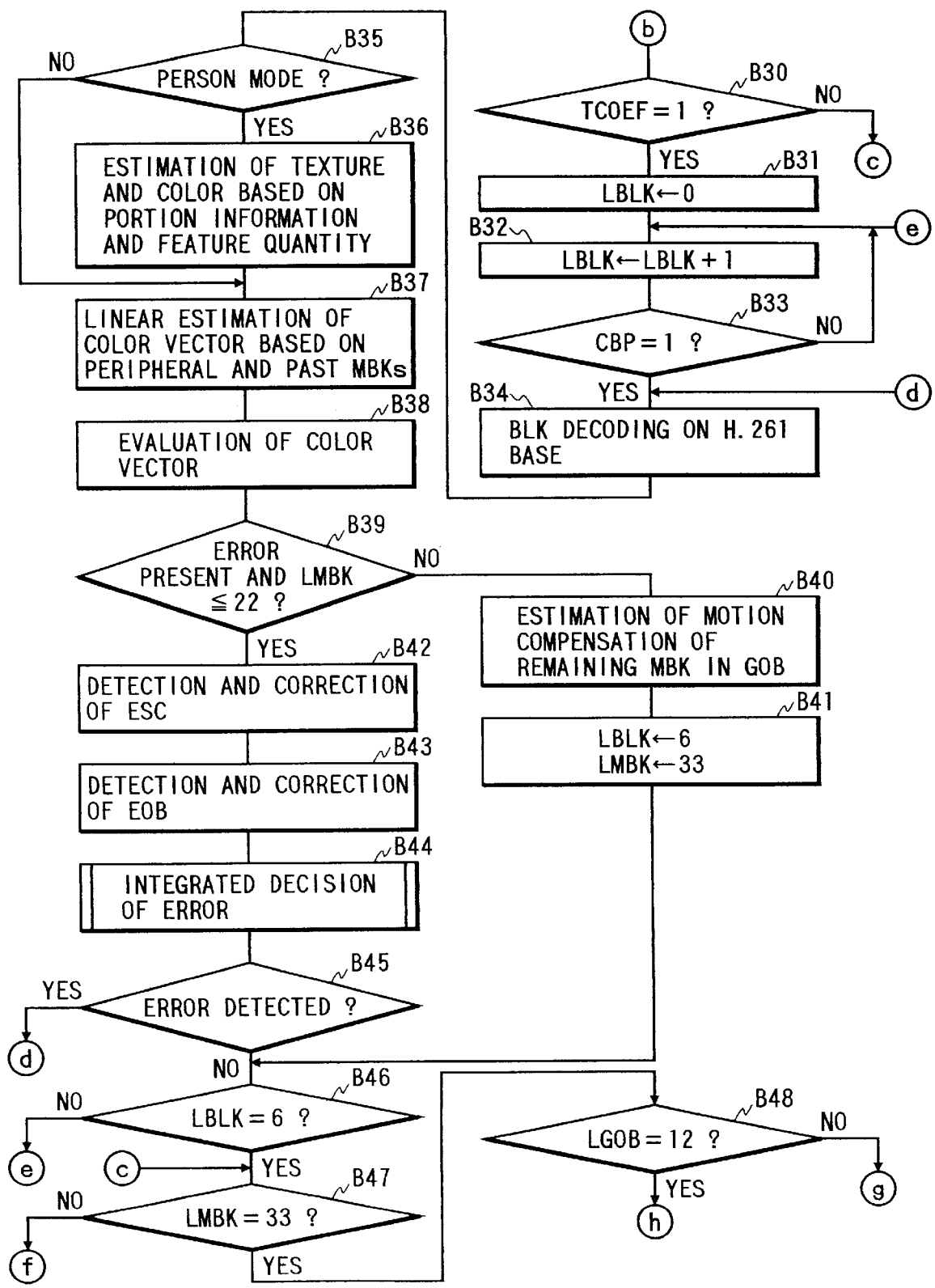
FIG. 10 is a flow chart showing a further portion of the same decoding processing program.

Actually, the functions to accomplishing the extremely low rate in the encoding processing are executed in accordance with the program flow charts of FIGS. 5 to 7. The outline of the whole flow will be described hereinbelow.

That is, the control first enter a step A1 to set the forced mode, then followed by steps A2 and A3 in which under the set state the analysis of the motion area and the extraction of the motion area are carried out by means of the object area extraction section 26, the template data base 27, the 2D template matching section 28, the model-based prediction section 29, the three-dimensional shape data base 30 and others. Subsequently, in steps A4 to A8, the mode control section 33 performs the search and the decision on the basis of the state transition diagram, and further successively executes the setting of the use environment mode, the setting of the subject mode, the updating processing of the state transition probability and the encoding control mode. Thereafter, a step A9 is executed to decide whether or not the current frame is the forced INTRA frame. If the answer of the step A9 is "YES", in steps A10 and A11, the encoding control section 21 performs the determination of the quantization step, besides the orthogonal transform section 7, the quantization section 8, the channel encoding section 10 and others implement the INTRA encoding processing under the H.261 standard. On the other hand, if the decision is "NO", in a step A12, the control directly advances to the next virtual buffer calculation so that the encoding control section 21 makes the virtual buffer calculation.

Secondly, if in a step A13 the current frame assumes the motion picture mode, a step A14 follows to decide the frame rate. Further, if in a step A15 a decision is made as being the model-based mode, then a step A16 follows so that the area extraction and recognition processing section 25 produces the 2D template on the basis of the 3D model. Subsequently, the control proceeds to steps A17 and A18 to perform the check of the 2D template and the extraction processing of the object area. The next step A19 is for checking whether or not the background memory mode is in the set condition. If so, the control goes to a step A20 to use the background memory 32. Further, a step A21 is executed to check whether or not it is the attribute prediction frame. If the answer is "NO", the control advances to a series of processes A22 to A28. On the other hand, if the decision is "YES", the control proceeds to a series of processes A29 to A35. In the steps A22 to A28, the encoding control section 21 and the object area extraction section 26 implement the decision of the INTRA frame, the decision of the presence or absence of the motion compensation, the decision of the motion quantity, the decision of the color variation quantity, the calculation of the virtual buffer, the decision of the quantization step, and the calculation of the maximum number of coefficients. On the other hand, in the steps A29 to A35, the encoding control section 21, the attribute memory 22 and others perform the operations for the prediction of the arrays of MTP, MBA, QSC, MVD AND CBP concurrently with carrying out the encoding suppressing processing of the MBK attribute and the model-based transmission of the MBK attribute array.

Thereafter, the control reaches a step A36 to implement the motion compensation based on H.261 in units of BLK, then followed by steps A37, A38 and A39 to produce the bit stream of the BLK layer after performing the area-separated quantization control and the control of the number of significant coefficients by means of the orthogonal transform section 7, the quantization section 9, the inverse quantization section 13, the inverse transform section 14, the channel encoding section 10, and so on. If in a step A40 the BLK layer ends and if in a step A41 it is the attribute prediction frame, then the control goes to a step A42 to execute the MBK attribute decision control and subsequently to a step A43 so that the attribute 22 stores the MBK data. After the completion of the step A43, the control further advances to steps A44 to A54 to come into the encoded bit stream data producing operation.

[B] DECODER

Figure 4:
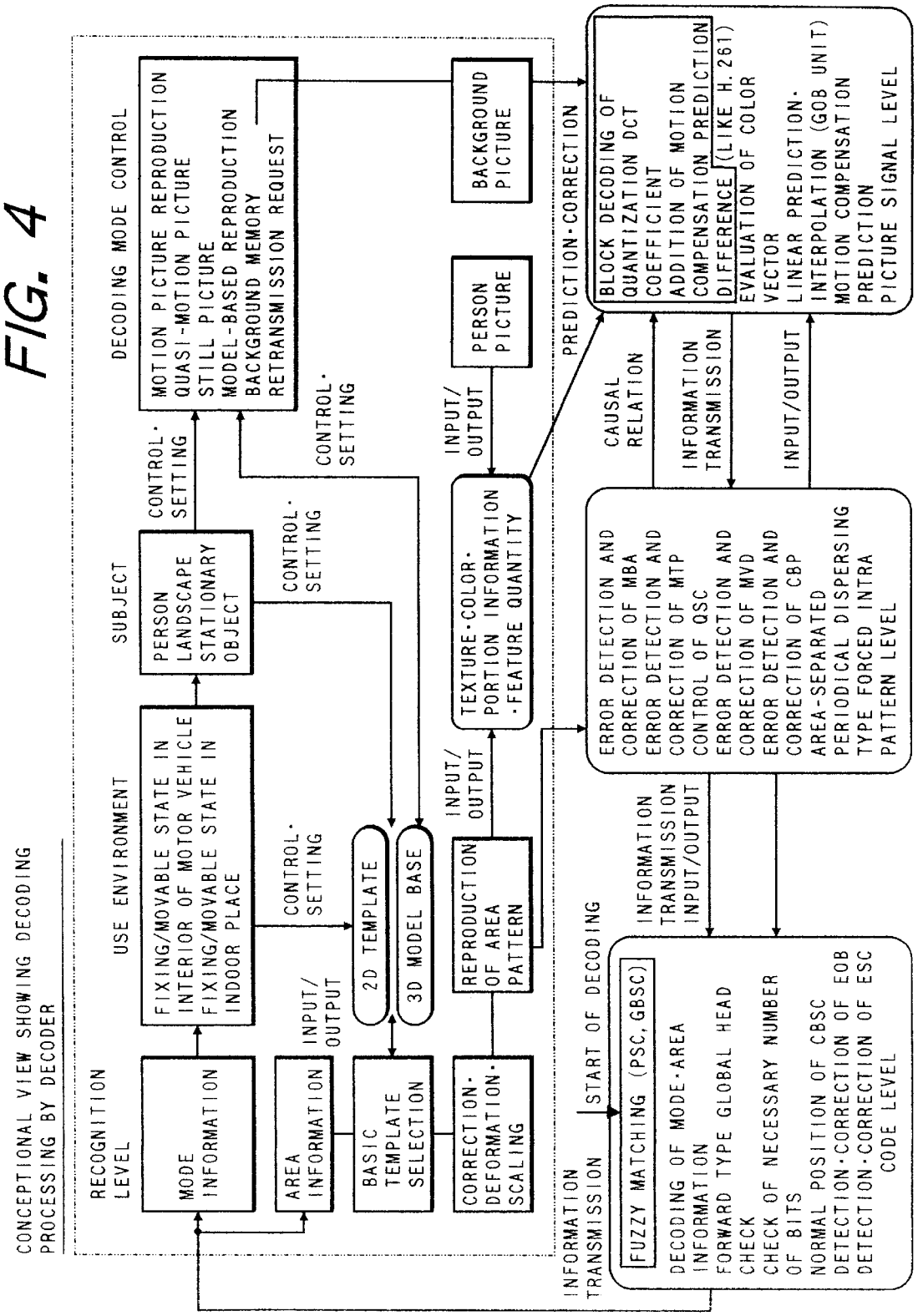
FIG. 4 is a conceptual block diagram showing a decoding processing.

Secondly, a description will be made hereinbelow of the decoding processing of the encoded bit stream the decoder 2 receives. FIG. 4 is a conceptual view showing the decoding processing contents. The decoding processing is implemented in three roughly classified stages: the code level, the pattern level and the picture signal level, where the various mode control and the error correction are executed to realize the decoding processing on the extremely low rate and the error correction function conforming with the error rate in the wireless communication level. Referring to the conceptual arrangement of FIG. 4, a detailed description will be made of the respective functions in items.

First of all, a description will briefly be made of the autonomous error correction function which is a feature of the encoder 2. In general, in the wire transmission systems the average bit error rate is approximately $10^{-6}$ to $10^{-8}$, while in the wireless systems it is considered to be approximately $10^{-2}$ to $10^{-3}$. On the other hand, in the case of the bit stream produced with the syntax (see FIG. 30) based on the variable-length code under the MPEG or H.261 standard, even if the error arises in relation to only one bit, in the worst case the decoding error can propagate to cause the subsequent data to be impossible to decode. However, in the prior wire TV conference systems, the error correction is achieved by a combination of the demand refresh (a combination of the freeze and the retransmission request) and the error correction code (such as the BHC code), which manages to be put to practical use. Further, although in the storage systems such as a video CD the error correction code exhibits a satisfactory function, in the wireless systems there is a possibility that the error rate increases and depending on the electromagnetic wave situation the transmission errors such as drop-out, inversion and drop-in break out in units of several bits, and hence difficulty is encountered to accomplish the complete error correction with only the common code-logical approaches. Thus, the decoder 2 according to this embodiment has the autonomous error correction means to restore the signal as close to the original signal as possible without interrupting the decoding processing.

The contents of the autonomous error correction function will be described hereinbelow in the following items: [B-1] (global check of encoded bit stream, [B-2] (level error correction of code and syntax), [B-3] (error correction of pattern level), [B-4] (error correction of signal level), [B-5] (strategic control of error correction), [B-7] (error correction of recognition level), [B-7] (person memory and 3D model-based method), [B-8] (error correction strategy), and [B-9] (description of operation according to decoding processing program, which are further classified into more concrete items.

[B-1] Global Check of Encoded Bit Stream (1) Bit Error Occurrence Condition

Prior to describing the bit error correction in the decoding processing a brief description will first be made hereinbelow of the conditions that the bit error of the picture signal coming through the communication path breaks out.

(a) single inversion error of "0/1": the bit value inverses at random in some probability.

(b) burst error: the data in an interval is masked, and its occurrence states are that the fixed value 0 or 1 is outputted continuously or completely random values are outputted.

(c) drop-in and drop-out of bit: the time expansion and contraction occur.

(2) Basic Principle of Error Correction

In this embodiment, the basic principle of the error correction is not particularly limited by the error occurrence conditions. However, although in the aforesaid (a) case, the operation for coping with that error can relatively stable, in the (b) and (c) cases the complete correction is extremely difficult and, therefore, the result of the decoding processing is corrected with a visually acceptable estimated value and a means is provided for suppressing the accumulation of the errors due to the subsequent error propagation. Further, in this case, in the worst case the picture freeze and the retransmission request (ARQ: Automatic Repeat Request) are put into practice. In terms of the information (data such as the necessary number of bits) having a great influence on the encoding processing, prior to using the active correction means in the decoder 2 side, as described before the redundant code is added in the encoder 1 side to improve the correction ability.

(3) Transmission of the Necessary Number of Bits

Figure 50:
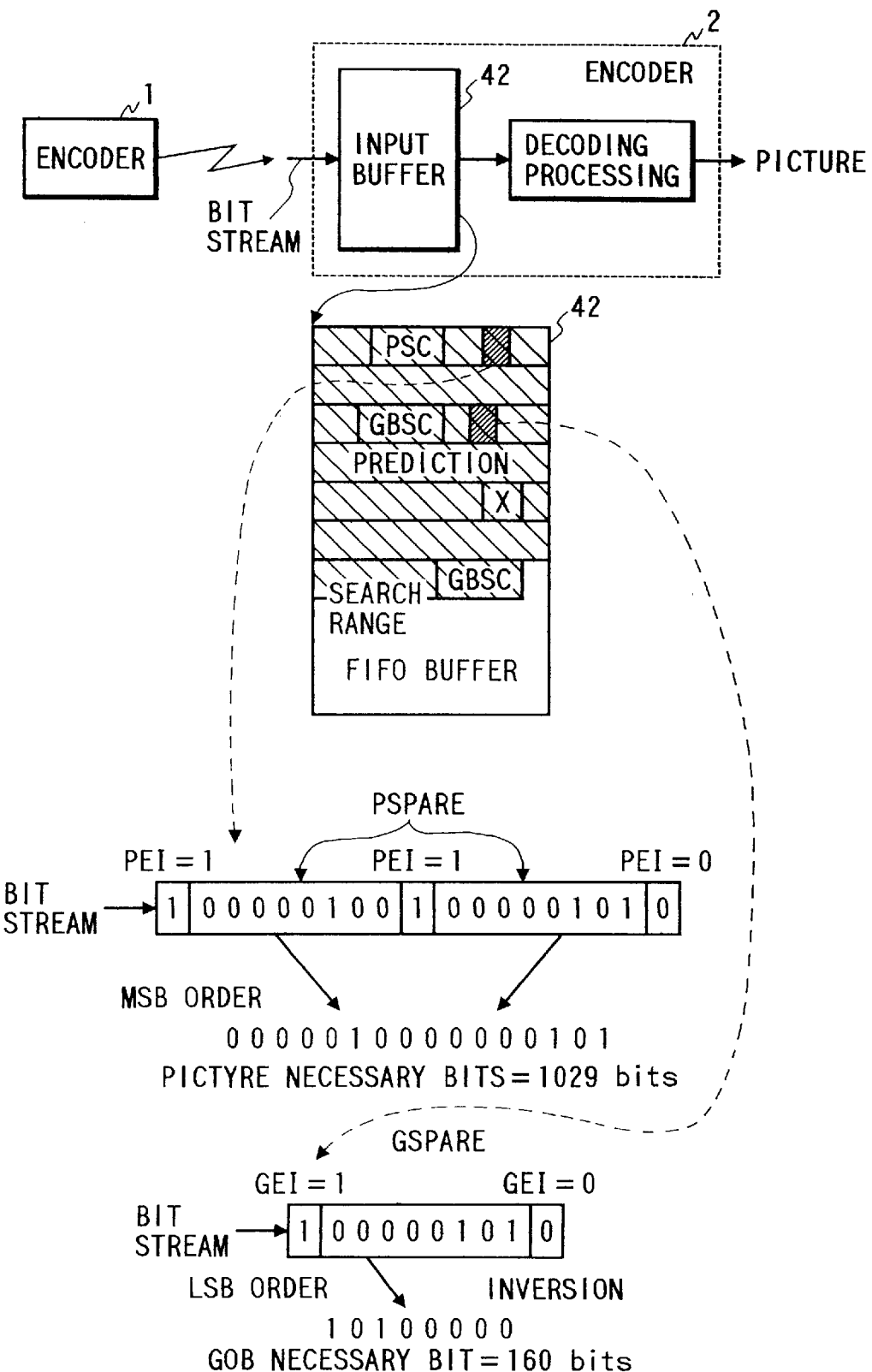
FIG. 50 is an illustration for explaining a transmission form of the necessary number of bits and a global check.

As described before, the data having a great influence on the picture reproduction at the data drop-out occurrence is redundantly transmitted from the encoder 1 side through the use of the user data area of the protocol syntax. In this embodiment, as shown in FIG. 50 the information on a necessary number of bits in PIC (picture) unit is written in the user data area of the PIC layer and the information on a necessary number of bits in GOB unit is written in the user data area of the GOB layer, using approximately 16 bits (the maximum bit number is 64 kbits), with the result that it is possible to check whether or not the drop-out or drop-in of the bits break out. The occurrence of the error of the data with the necessary number of bits is decided as follows.

(a) As will be described in the next item [B-2] (level error correction of code and syntax level), the positional search for PSC (Picture Start Code) and GBSC (GOB Start Code) are done with the global header check within the buffer. Further, the code quantity described in PSPARE or GSPARE is checked on the basis of this result.

(b) When the sum of the described code quantity of the GOB layer does not coincide with the code quantity of the PIC layer, a decision is made that either of the statements is mistaken. On the other hand, if coinciding with each other, because of no error, the operation terminates.

(c) The average code quantity a frame and the average code quantity a GOB are calculated on the basis of the transmission rate and the frame rate. In the cases of other than the forced INTRA frame, the code quantity deviating by a threshold or more from these values is treated as a candidate for the statement-mistaken portion.

(d) The candidate extracted in (c) is compared with the result of a linear prediction based on the code quantities over the past several frames, and when the difference therebetween is out of a given range, a decision is given as an error.

(4) Forward Type Data Check

Since the data on the necessary number of bits in one frame described in the encoder 1 side are all detected before the start of the decoding processing of one frame like (a) of (3), the bit stream data accumulated in an input buffer (FIFO buffer 42) in the decoder 2 side is globally checked on the order of several kbits. Accordingly, as will also described in the next item [B-2], the positional search for PSC and GBSC becomes necessary. The positional search processing is implemented as follows.

Figure 51:
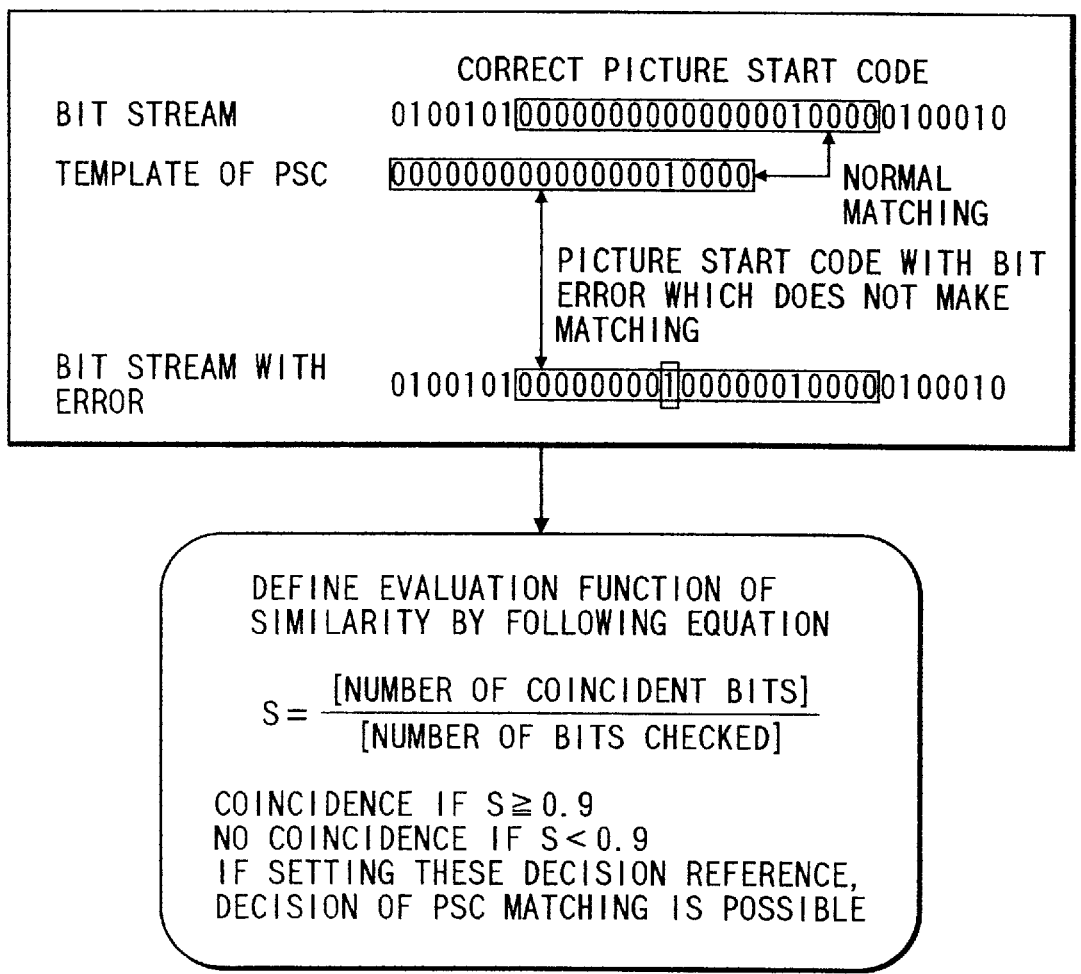
FIG. 51 is an illustration for describing a PSC fuzzy matching processing.

(a) Some buffer area is completely scanned by the fuzzy matching processing as shown in FIG. 51. In cases where the transmission rate is high, much matching calculation is needed in order to complete the positional search according to this method. On the other hand, since at an extremely low rate the data quantity per frame is below several kbits, such a globally scanning processing scarcely create a problem in practical use. In this instance, in the fuzzy matching processing, there is provided a reference whereby, if the degree S of the similarity (see the equation in FIG. 51) given with the bit coincidence rate between the bit pattern of the code to be retrieved and the bit pattern of the encoded bit stream is, for example, above 0.9 (90%), a decision is made that both almost completely match each other. Thus, for example, a decision can be made such that the matching takes place in a state with accepting the error arising with respect to 2 bits (for example, when PSC assumes 20 bits). The similarity S is preferably 0.9, while a minimum of approximately 0.8 is acceptable in practical use.

(b) After the retrieval of the PSC and the initial GBSC, the position of the next PSC is roughly found on the basis of the estimated code quantity derived from the average code quantity and the code quantity in the past frame, and the scanning is made within a given range centering around that position. If the number of GBSCs existing until reaching the PSC of the next frame is correct, the checking processing terminates. Further, if not correct, the value of GN (Group Number) is checked to find the dropped-out GBSC and the scanning is started from the GBSC previous by one to the dropped-out GBSC. If the detection is accomplished, the processing comes to an end.

[B-2] Level Error Correction of Code and Syntax
(1) Positional Search for PIC and GBSC In the case that the bit stream is merely decoded in a sequential way, there is a possibility that difficulty is encountered to find the ranges of the PIC data and the GOB data owing to the bit error described in the next item (2). For this reason, a relatively stable detection is made through the above-mentioned fuzzy matching processing, and a hierarchical processing is provided to fulfill the error correction using the pattern level (MBK attribute) and the picture signal level (BLK) from PSC and GOB headers whose positions can be known (positional search). Thereafter, the operation advances to the following error correction depending upon the code and grammar.

(2) Occurrence Condition of Grammatical Decoding Stopping Due to Bit Error

If the bit stream containing a bit error is decoded in a sequential way, owing to the grammatical error the parser 43 stops the decoding processing. However, the stopping position at that time does not always coincide with the occurrence position of the bit error, and under certain circumstances the bit error position can go back several tens bits short of the stopping position. Thus, a description will be taken hereinbelow of the error occurrence conditions.

(a) the Case of Immediately Stopping at Bit Error Position

When the bit error is introduced into the fixed-length header to cause the matching impossible, the decoding immediately stops as long as the branch condition to others does not lie on the syntax.

(b) the Case of Stopping After Decoding Continues from Bit Error Position in the meantime 1) Occurrence of Bit Error in Variable-Length Code (VLC)

Figure 52:
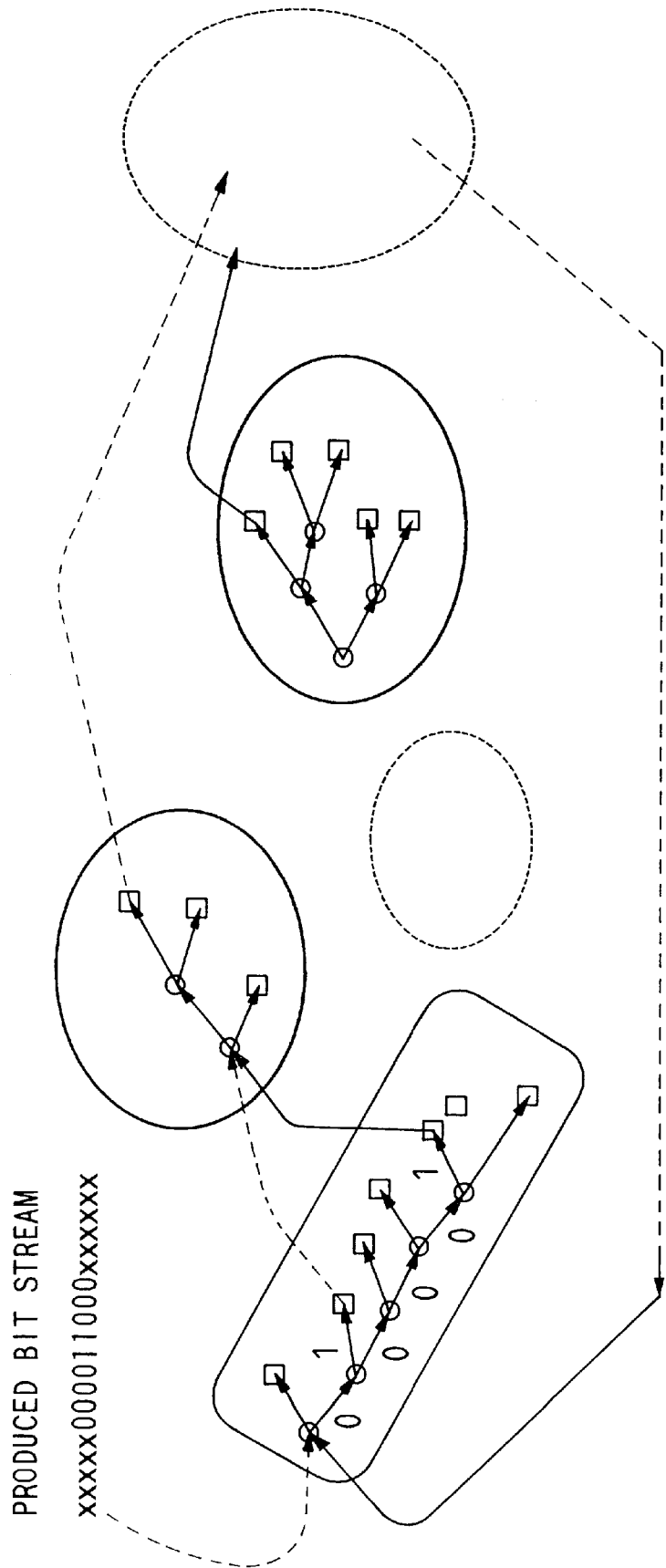
FIG. 52 is an illustration for describing the coupling of a binary trees by a syntax and the production of a bit stream.

The bit stream, as shown in FIG. 52, signifies a time-series output symbol obtainable owing to the transition based on the logical conditions and numerical conditions between joints in a graph comprising code trees with different binary tree structures. Accordingly, even if one bit within VLC inverts, the reproduction of the time series of the events (corresponding to the encoding attribute and the picture signal) arising in the encoder 1 side becomes impossible in the decoder 2 side, with the result that there is a possibility that a completely different event series is outputted as the decoded result. However, it is difficult to detect such an error by only the grammatical constraint which is purely for deciding only the codes. That is, it is detectable only with the grammatical constraint through the numerical condition based on the picture data form or the error detection condition in the signal level or the pattern level which will be described later. In other words, since the decoding of the mistaken bit stream continues until such an error detection processing works, the decoding stopping position comes after the bit error position.

In addition, even if such an error exists, the decoding does not necessarily stop. For example, in cases where it is replaced with the other code word with the same code length even if the bit inversion is done, a different value is merely fed as the state output, and if that value does not have an adverse influence on the subsequent condition branch, the synchronous deviation does not break out in the subsequent VLC decoding processing. For this reason, in this case, even if there is a possibility that, for example, only the color of some pixel block or the texture data is altered for reproduction, the decoding does not stop.

2) the Case that Bit Error Arises in Fixed-Length Code

In this case, like the case that the bit inversion occurs without the change in code length, the decoding stopping does not take place if not having an adverse influence on the subsequent branch condition, although the value or attribute of the encoding output differs from that in the encoding.

(3) Detection of Grammatical Decoding Error

Furthermore, on the basis of the protocol syntax (see FIG. 30) under H.261, a description will be made hereinbelow of the position at which the bit error occurs and which is classified as follows.

(a) Fixed-Length Header that always appears

1) PSC (Picture Start Code: 20 bits)

Even if the error of approximately 2 bits occurs in PSC as long as the fuzzy matching processing is carried into effect, the detection of PSC is possible without depending upon the syntax or the decoding results up to now. Accordingly, the detection and positional search for PSC are the initial processes necessary for the detection of the bit error at the other position.

2) GBSC (Group of Blocks Start Code: 16 bits)

As well as PSC, GBSC is stably detectable through the fuzzy matching processing, while the positional search can be mistaken if the positional search for PSC is not done.

(a) Fixed-Length Data that always appears

1) TR (Temporal Reference: 5 bits)

If the positional search for PSC is done, since TR is a continuous 5-bit data, checking its value is easy. The error decision varies as follows in accordance with the mode setting states in the decoder 2 side.

i) In the case of the normal motion picture mode (fixed frame rate), the current TR should increase by a value corresponding to the frame rate according to the transmission rate as compared with the last TR. In the case of an extremely low rate motion picture below 32 kbps, the increment should reach approximately 3 to 5, and hence, when a different increment takes place, a decision can be made as being erroneous.

ii) If a quasi-motion picture, the increment should reach approximately 10 to 31, and hence, when the increment assumes values other than 10 to 31, a decision can be made as being erronous.

2) PEI (Picture Extra Insertion Information: 1 bit)

If the data is "1", the subsequent user data PSPARE (8 bits) exists. On the other hand, if the data is "0", GBSC follows.

3) GN (Group Number: 4 bits)

The error decision is made through the positional search for GBSC. The error is present if not satisfying the following conditions: $1 \leq GN \leq 12$ in the CIF structure, and GN is larger by one than the last GN.

4) GOUANT (GOB Layer Quantizer Information: 5 bits)

The quantization scales (QSCs) in the extremely low rate transmission are all fixed to 31 (quantization step 62) in the object area preference mode, and the only the main area determined through the area analysis is set to 16 (quantization step 32). Thus, in the person mode, the QSC information is not transmitted. Accordingly, since the GQUANT (GOB layer QSC information) and the MQUANT (quantization scale alteration information in units of MBK) becomes unnecessary, the error on this data does not take place. In other modes, in the case of use of MQUANT, the value is estimated in a manner similar to that of CBP in the pattern level error correction which will be described later, so that the error decision is made.

5) GEI (GOB Extra Insertion Information: 1 bit)

i) If the data is "1", the user data GSPARE (8 bits) succeeds. Accordingly, it is incorrect (synchronous deviation or error) judging from the positional search for GBSC and the definition and value of GSPARE.

ii) If the data is "0", MBA follows. Accordingly, the error decision waits till the MBK layer.

(c) Fixed-Length Data/Header that develops under Condition

1) PSPARE (Picture Layer Space Information: 8 bits)

In this embodiment, in the area in which the user data can be written in units of a picture layer, it is used for the mode information and the information on a necessary number of bits (8 bits×2). With this, the error decision is possible on the necessary bit quantity.

2) GSPARE (GOB Layer Space Information: 8 bits)

In this embodiment, in the area where the user data can be written in units of a GOB layer, the necessary number of bits is described within GOB. The probability that the necessary number of bits for expressing data amounts in the GOB layer is 8 bits at a maximum is high, and hence the bit pattern of the data with the necessary number of bits is written as an inversion pattern where the orders of the higher rank (MSB) side and the lower rank (LSB) are replaced with each other. Accordingly, only in the case that the necessary number of bits for expressing the GOB layer exceeds 8 bits, the next GSPARE becomes necessary.

3) MBSTUFF (Macroblock Address Stuffing: 11 bits)

Figure 53:
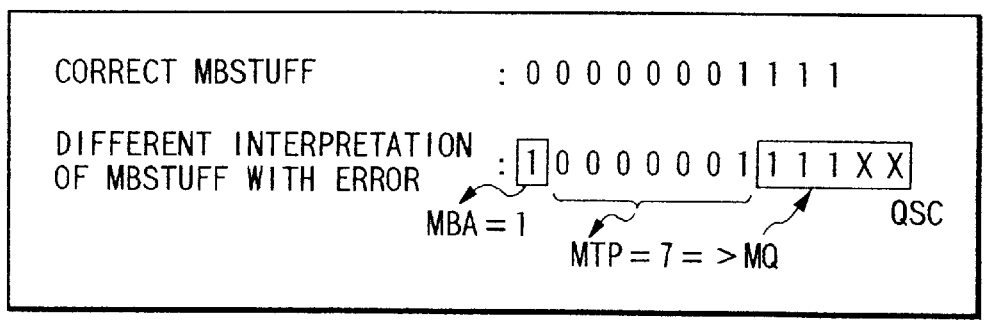
FIG. 53 shows an example of an error interpretation arising with a bit error in the case of using MBSTUFF.

This is not for the extremely low rate transmission. Although it can be used under the H.261 standard above 64 kbps, as also shown in FIG. 53, even the occurrence the error of 1 bit can cause an parsing result grammatically different, and therefore the fuzzy matching processing is undesirable. For this reason, this embodiment does not employ the MBSTUFF code.

4) MQUANT (MBK Layer Quantizer Information: 5 bits)

As described in GQUANT, in the person mode on the extremely low rate transmission in this embodiment, MQUANT is not put to use. When MQUANT is used in other modes, the value is estimated in a manner similar to that of CBP in the pattern level error correction which will be described later, thus performing the error decision.

5) INTRA-DC (8 bits)

This develops as the initial DCT coefficient data in grammar only when MTP is indicative of INTRA. This decision relies upon the signal level error correction which will be described later.

6) ESC(6)+RUN(6)+LEVEL (8 bits)

On the introduction of the error into ESC, a different parsing breaks out in the subsequent BLK later decoding processing, which difficulty is encountered to specify the grammatical error position for correction. For this reason, the following measures are taken.

i) The degree Sesc of similarity is always calculated in the DCT coefficient decoding processing, and its positions Pesc at Sesc=5/6 (5 bits of 6 bits are coincident with those of ESC) are all stored, proceeding the decoding processing afterwards.

ii) In the case of not satisfying the conditions: the constraint of the number of significant coefficients $\leq$ Ncoef and the accumulated number of quantization DCT coefficients within BLK $\leq$ 64 prior to the discovery of EOB, the error decision is made and the operation returns to the aforesaid Pesc to re-parse it as ESC so that the decoding processing again begins.

iii) If the error is detected in the picture signal level error correction processing (BLK layer), similarly the operation goes back to Pesc to re-parse it as ESC, so that the decoding processing resumes.

iv) If the error is found in the pattern level error correction processing (MBK layer), the operation returns to Pesc to re-parse it as ESC, so that the decoding processing resumes.

7) EOB (End Of Block: 2 bits)

Because of a short word length, the candidate is difficult to decide with the similarity. However, since the number of occurrences is large, the probability that the error arises within EOB at random is not low. Thus, a decision is made that the error occurs within EOB when not meeting the following conditions:

the number of significant coefficients≦the constraint of Ncoef the accumulated number of the quantization DCT coefficients within BLK≦64

(the number of BLKs within MBK)≦(the number of BLKs written in CBP)

In this case, the correction can be accomplished by the following two ways.

i) The bits are successively inverted immediately after the last EOB to detect the EOB pattern "10". Further, the decoding processing is carried out in a state that the detected EOB pattern is regarded as EOB. If satisfying all the aforesaid three error decision conditions just above, the EOB is decided as being correct.

ii) The pattern level error correction is applied to all the remaining MBKs within GOB. If not meeting the aforesaid three error decision conditions just above, the signal level or pattern level error correction is carried into effect.

(d) Variable-Length Code (VLC) that Always Develops

1) MBA (Macroblock Address: 1 to 11 bits)

Since MBA develops on the following conditions, the check of the VLC table is made on these conditions and the remainder depends upon the pattern level error correction. The conditions are as follows. That is, when the number of the decoding-completed MBKs≦32, immediately after EOB; and immediately after GEI=0.

2) MTP (Macroblock Type: 1 to 10 bits)

Since MTP develops on the condition of "immediately after MBA", the check of the VLC table is done under this condition, and remainder relies upon the pattern level error correction.

(e) Variable-Length Code (VLC) that Develops on Condition

1) MVD (Motion Vector Data: 1 to 11 bits)

Since MVD develops under the following conditions, the check of the VLC table is done on these conditions, while the remainder relies upon the pattern level error correction. The conditions are as follows:

when MTP=2, 3, 6, 8, 9, 10, immediately after MTP; and in MVD, two VLCs continuously develop in the order of the x component and the y component.

2) CBP (Coded Block Pattern: 3 to 9 bits)

Since CBP develops when MTP=1, 2, 5, 6, 8 and 10 under H. 261 (see FIG. 30), the check of the VLC table is made on these conditions, while the remainder depends upon the pattern level error correction.

3) TCOEF (INTER) (Transform Coefficients: 2 to 17)

The VLC of the DCT coefficient relative to the INTER block of the BLK layer appears on the following conditions. This error correction relies on the signal level error correction. The conditions are as follows:

when MTP is 4 or 7 (INTRA block), the second and following coefficients within the BLK layer; and when MTP assumes values other than 4 and 7, the next code within the BLK layer is not ESC.

[B-3] Pattern Level Error Correction

This uses the continuity between frames in the hierarchical encoding attribute.

(1) Use of Past MBK Decoding Attribute

Figure 54:
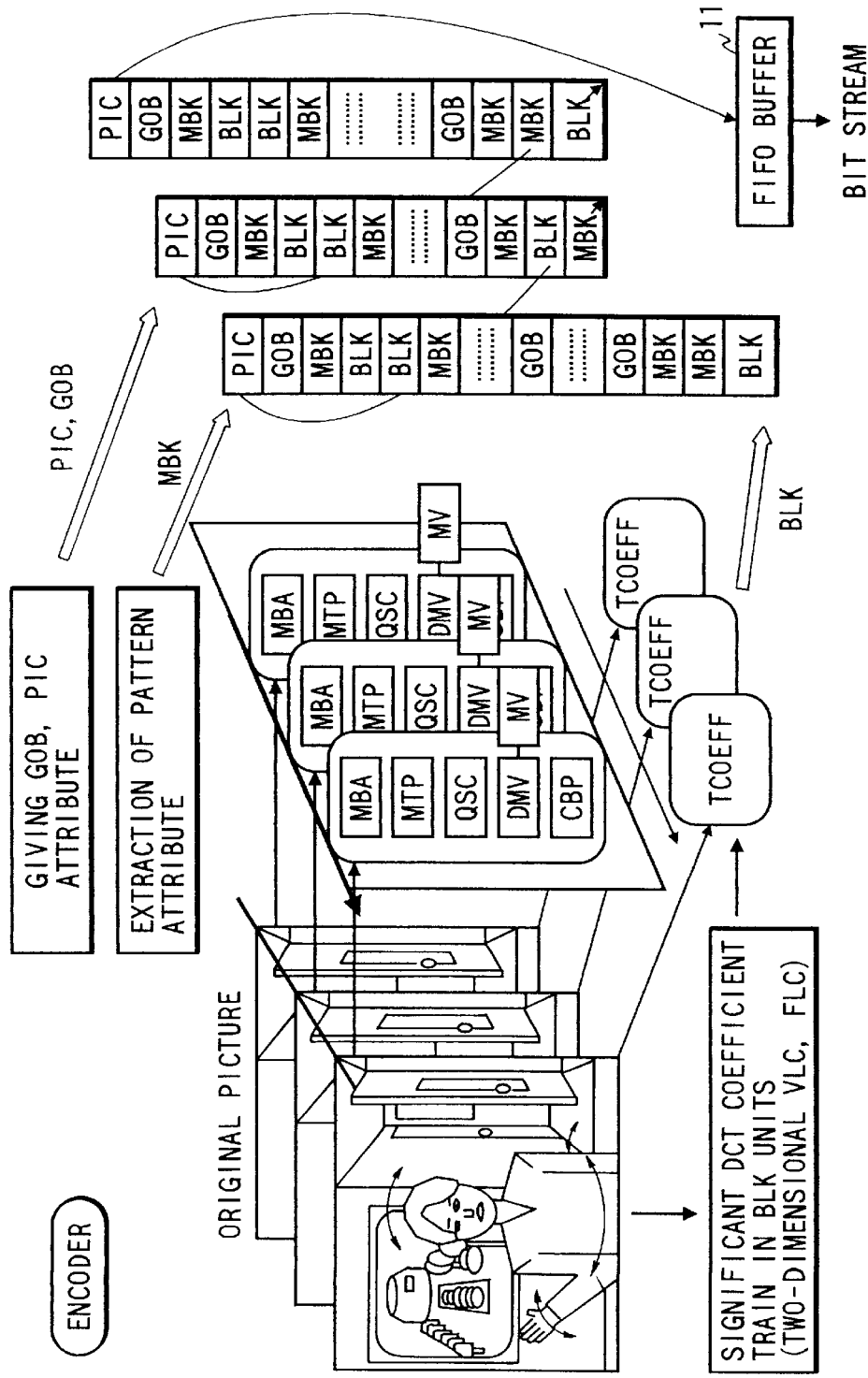
FIG. 54 is an illustration for describing the continuity between frames in a hierarchical encoding attribute (encoder side)
Figure 55:
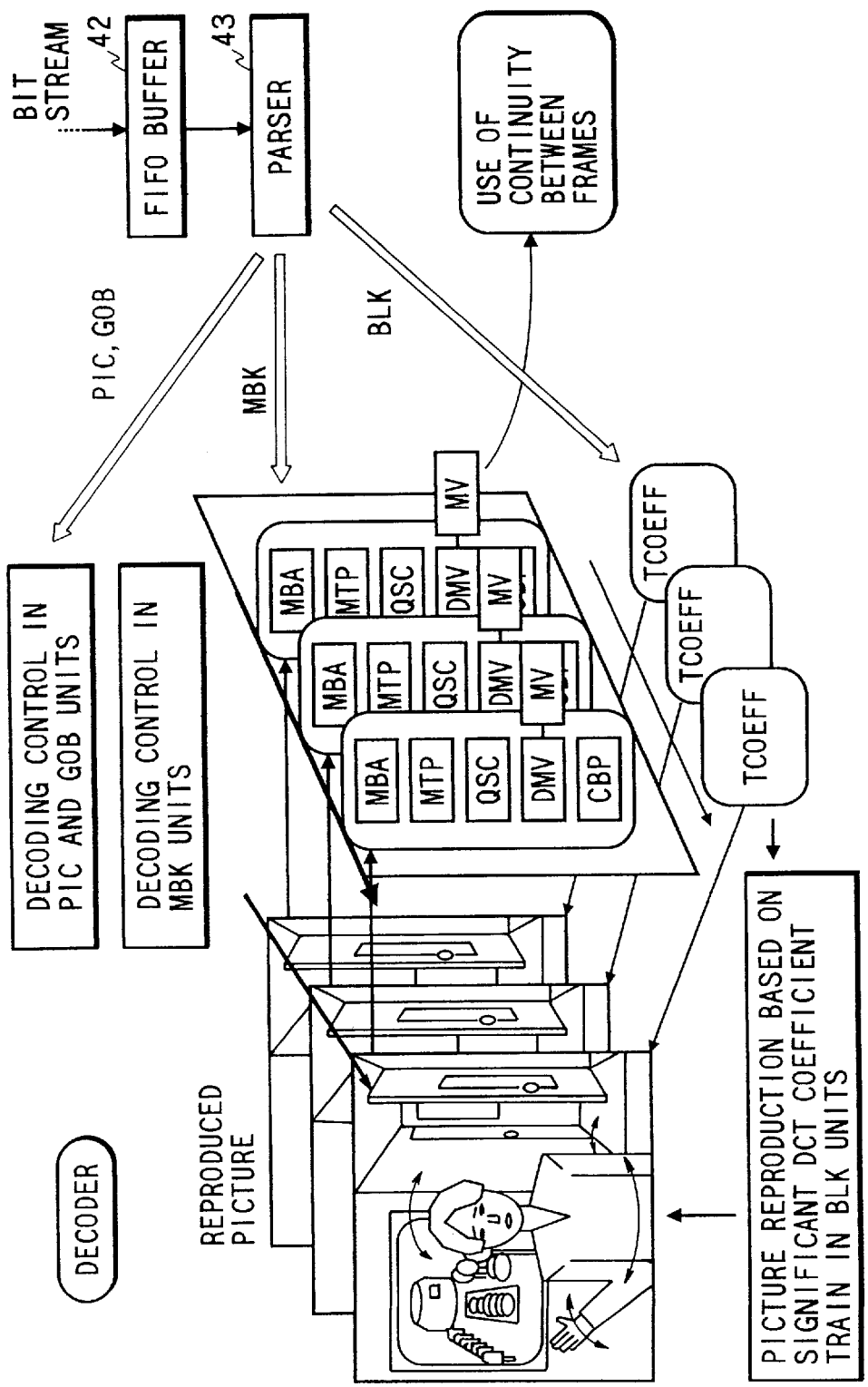
FIG. 55 is an illustration for describing the continuity between frames in a hierarchical encoding attribute (decoder side)
Figure 56:
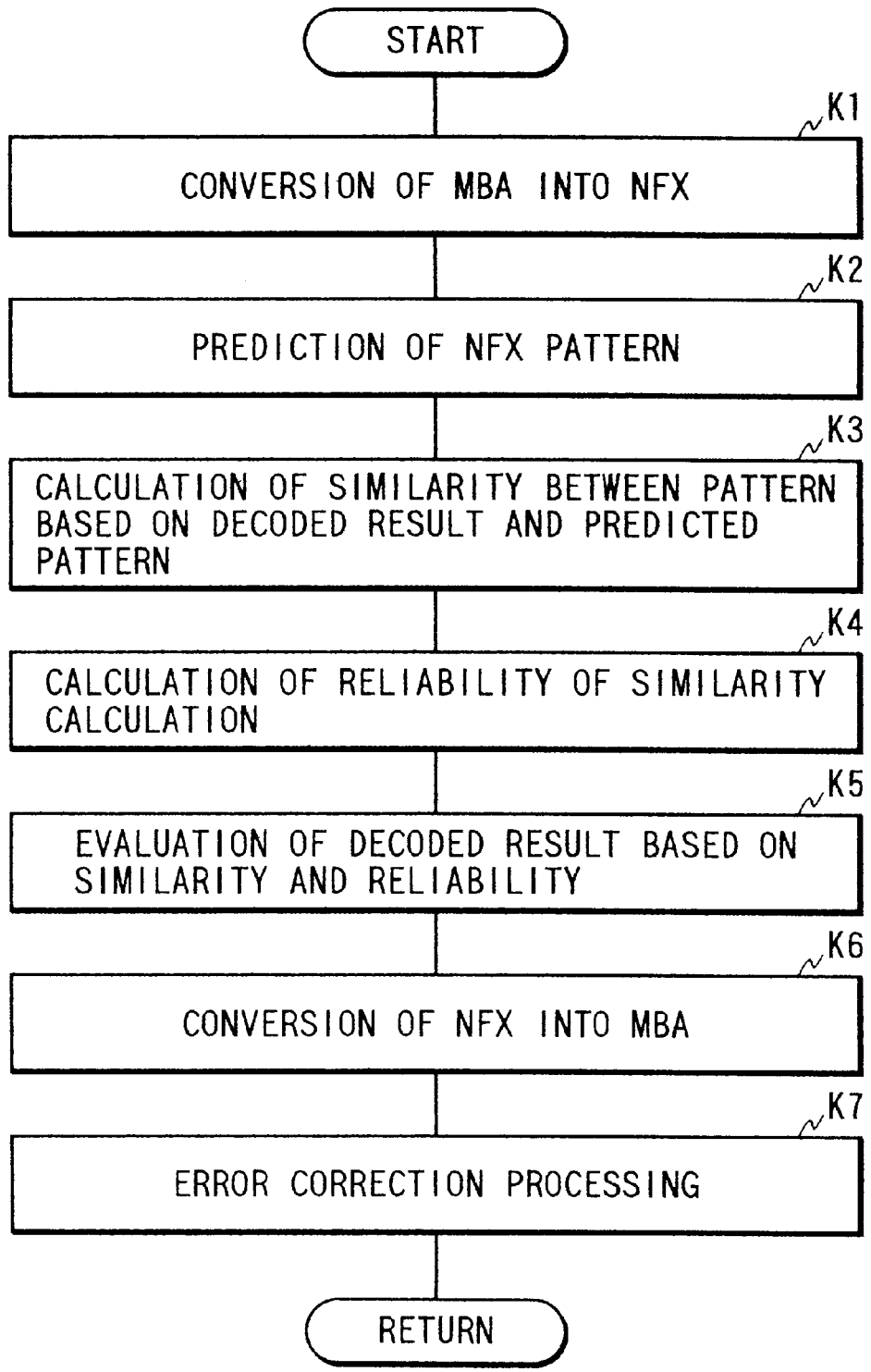
FIG. 56 is a flow chart showing a routine for error detection and correction of MBA.
Figure 57A:
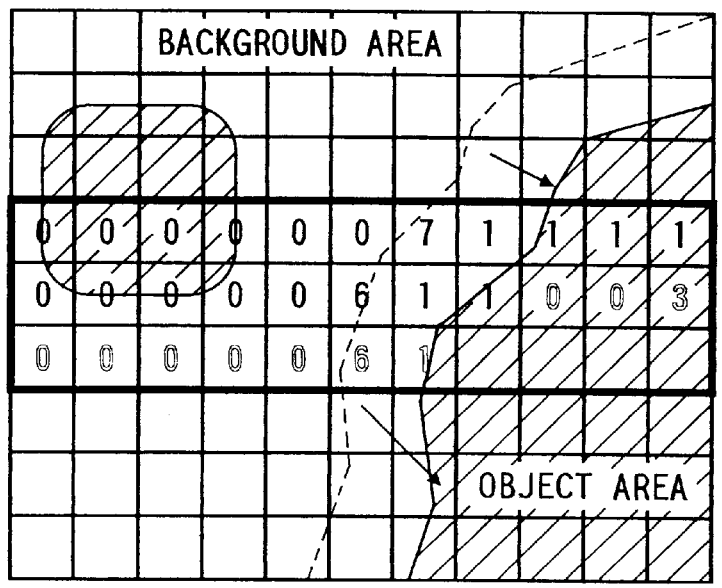
FIGS. 57A and 57B are illustrations of the corresponding relationship between MBA and NFX.
Figure 57B:
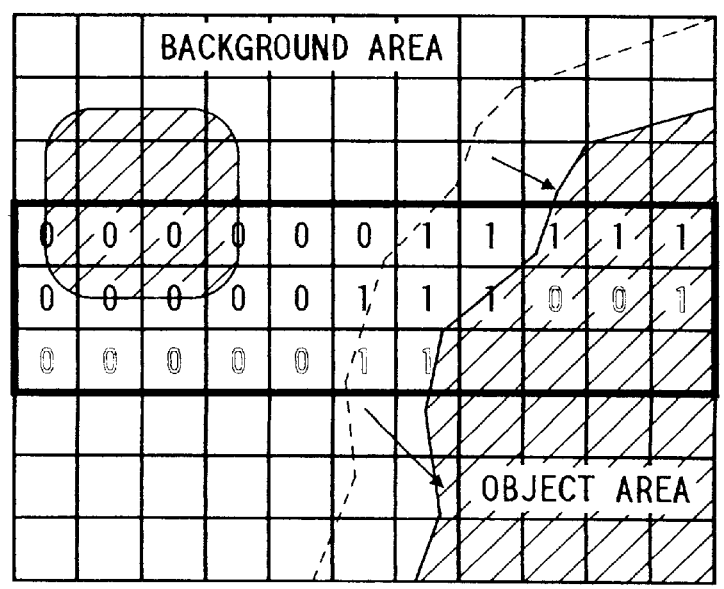
Figure 58:
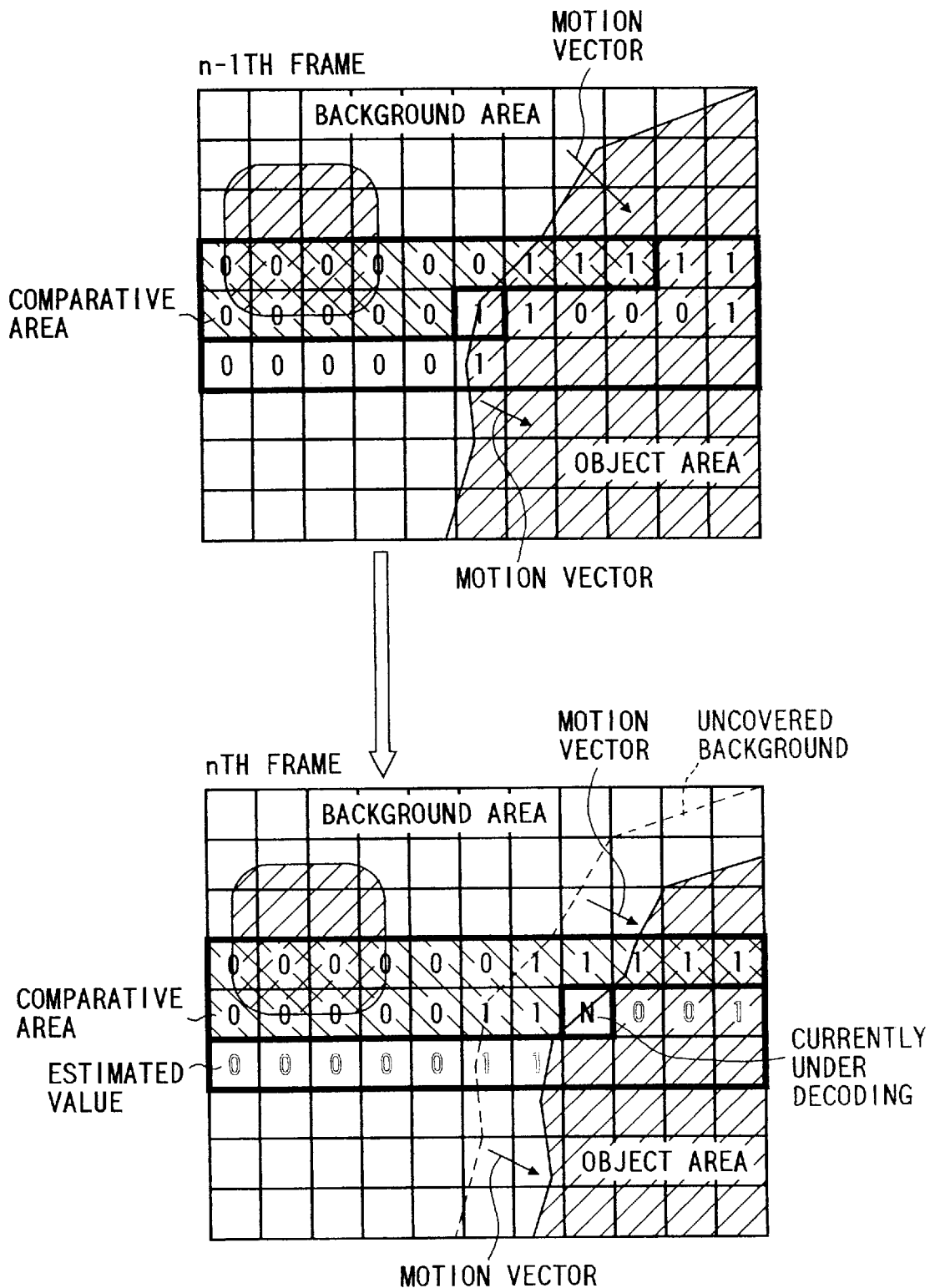
FIG. 58 is an illustration for describing an MBA pattern prediction from the previous frame.

In terms of the past MBK layers already decoded, five attribute data: MBA, MTP, QSC, MVD and CBP are stored as array data in frame unit in the attribute memory 39c. These attribute data considerably has the continuity between frames, and hence, it does not too intensively vary as long as the scene change or forced INTRA frame is not taken. Particularly, when there is a time continuity in relation to the continuation of the object area such as the person area, this is sufficiently satisfied (see FIGS. 54 and 55).

In cases where the error of the signal level is detected in units of a block pixel, when the error is not the VLC transmission error with respect to the DCT coefficient, the cause of the error can highly come from the error of the MBK attribute. At this time, MTP, QSC and CBP are compared within the area comprising k MBKs adjacent to the motion compensation position in units of MBK of the attribute of the past frame (the last attribute), and if they are significantly different, the error correction is achieved by applying the past attribute value to that attribute. In this case, the comparative evaluation function is as follows.

(a) Detection and Correction of Error of MBA

Although MBA exhibits the time continuity in the outline portion of the left side of the object area, it is considered to greatly vary within the object area. However, on the contrary, the FIXED/NOT_FIXED pattern can almost be estimated from the motion of the area. Thus, as shown in the flow chart of FIG. 56 and FIGS. 57A, 57B and 58, in the following cases, the area is shifted through the use of the average motion vector in the area to perform the prediction calculation of the NOT-FIXED (which will be referred hereinafter to as NFX) pattern singly corresponding to the MBA pattern, so that the degree SNFX of similarity between the NFX pattern due to the current decoding result and the NFX pattern based on the prediction result is calculated in units of GOB in accordance with the following equations (12) and (13).

$$SNFX = \sum_{k=Ls}^{L} s(NFXM(k), NFXM\_(k)) \tag{12}$$

$$Ls = MAX(L-NFXM(L)+1, 1) \tag{13}$$

where

L: MBK address of the value a of MBA being currently under decoding (a value obtained by adding a to the MBK address L0 of the last MBA value which has already been subjected to the decoding processing);

Ls: the starting position of the NFX pattern comparison;

NFXM(k): "1" when the MBA value of the first MBK of GOB assumes "1" or more, while "0" when it is "0"; and NFXM_(k): the NFX pattern estimated from the NFX pattern of the past frame (the last frame).

The degree RNFX of reliability on the above-mentioned calculation result is given in accordance with the following equations (14) and (15).

$$SNFX0 = \sum_{k=1}^{L0} s(NFXM(k), NFXM\_(k)) \tag{15}$$

On the basis of the above results, for example, the detection and error correction of MBA are made on the following four conditions.

1) RNFX0<0.5

In this case, the reliability of the NFX prediction is decided as being low so that it is reserved. That is, a decision is temporarily made such that the current NFX pattern is correct, and the operation advances to the next attribute decision.

2) RNFX0≧0.5 and SNFX<TNFX1

In this instance, a decision is made such that the current NFX pattern involves the decoding error. The NFX value is copied from the predicted pattern and transformed into an MBA pattern. For example, TNFX1 is set to approximately 0.3.

3) RNFX0≧0.5 and TNFX1≦SNFX<TNFX2

The current MBA value is suspended because of being difficult to decide as the decoding error. That is, a decision is temporarily made such that the NFX value is correct, and the operation goes to the next attribute decision. For example, TNFX2 is set to approximately 0.7.

4) RNFX0≧0.5 and TNFX2≦SNFX

A decision is made that the current NFX value shows the correct decoding result.

(b) Error Detection and Correction of MTP

Figure 59:
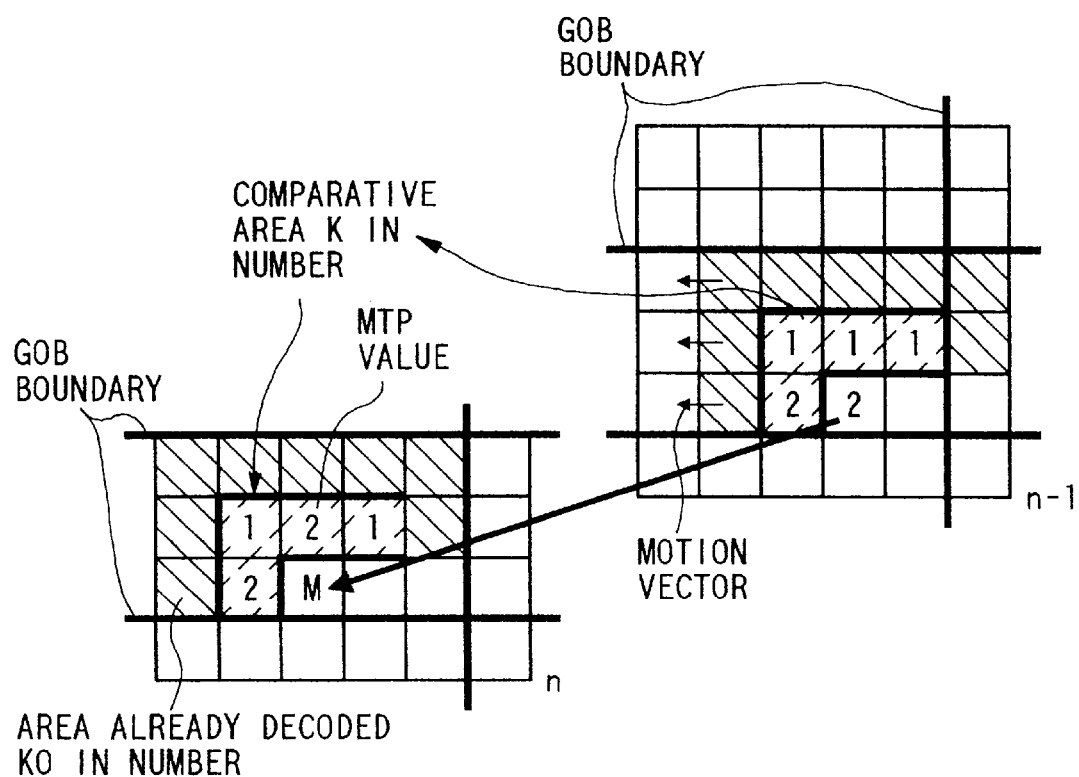
FIG. 59 is an illustration for describing the evaluation of a decoded result based on an MTP similarity calculation.
Figure 60:
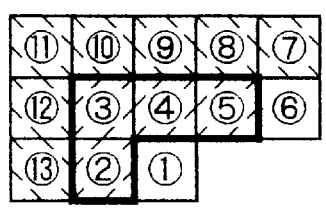
FIG. 60 is an illustration of an example of a scanning order in an evaluation calculation.
Figure 61:
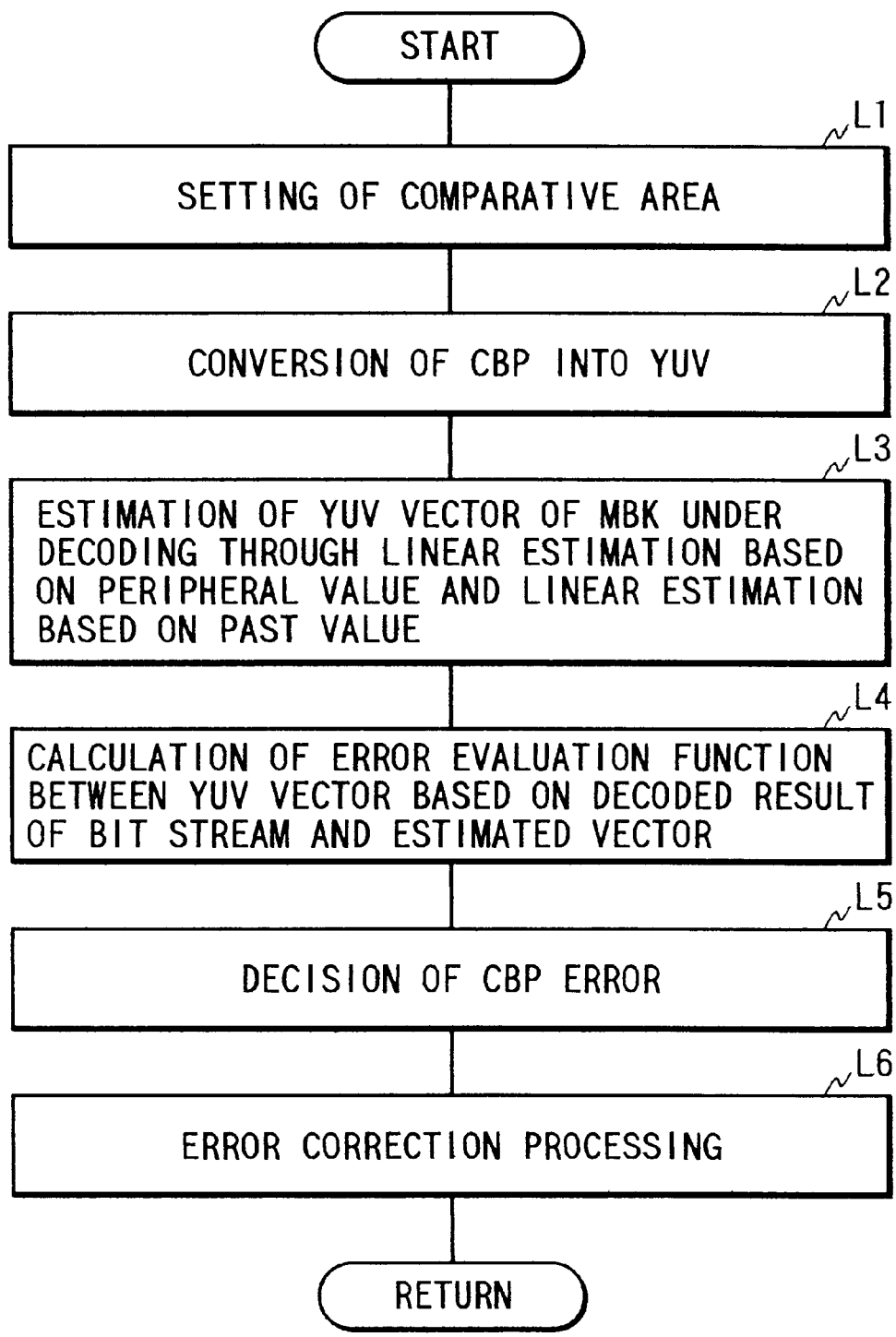
FIG. 61 is a flow chart showing a routine for an error detection and correction of CBP.
Figure 64:
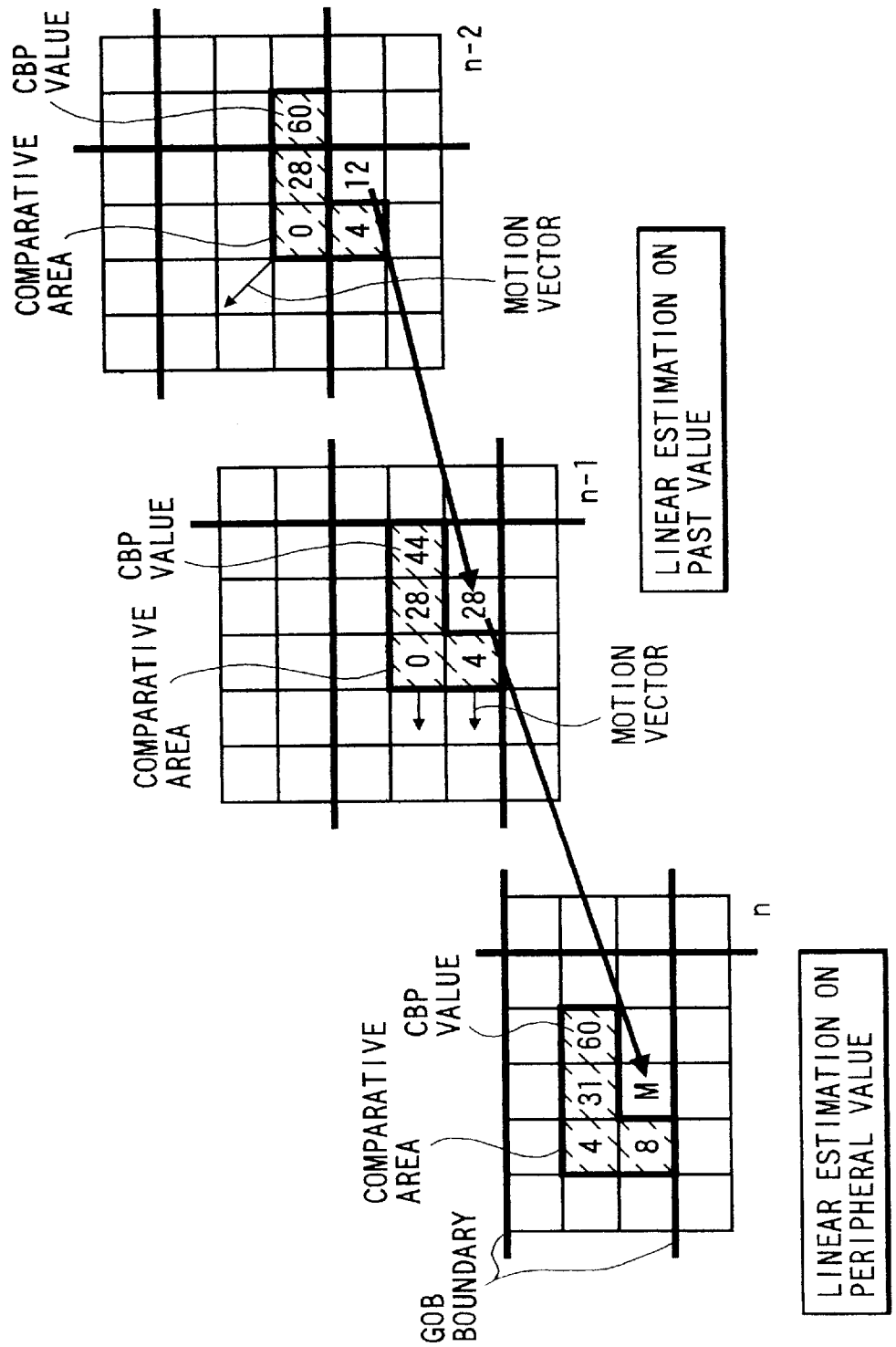
FIG. 64 is an illustration for explaining a YUV vector prediction.

At 10 frame/sec, the motion vector between frames is 3 frame vector at the video rate, and the maximum reaches approximately 45 pixels, which is equivalent to the displacement of a maximum of 3 MBKs. Thus, with respect to the MTP pattern of the past frame, the motion compensation is made with the motion quantity (mx, my) taken when the motion vector in the object area is transformed into the MBK unit, and the comparative area comprising MBKs already decoded with reference to the MBK position is set as shown in FIGS. 59 and 60, so that the corresponding area is compared with each MTP value by means of the motion compensation. The similarity SMTP is calculated in accordance with the following equation (16), and further the reliability evaluation value RMTP0 is calculated using the following equations (17) and (18) in order to evaluate the degree of reliability of the MTP prediction up to now.

$$SMTP = \sum_{i=1}^{K} smtp(MTP(i), MTP\_(i)) \quad (16)$$

$$RMTPO = SMTPO/[LMTP*(KO-1)] \quad (17)$$

$$SMTP0 = \sum_{i=2}^{KO} smtp(MTP(i), MTP\_(i)) \quad (18)$$

where smtp(A, B) represents a function for calculating the similarity between two MTPs, and the score values are set as follows and added up in relation to the coincidence of 6 kinds of information including MTP. That is,

| | | |
|---|---|---|
| the coincidence of INTRA attribute | → | 3 points |
| the coincidence of MQUANT attribute | → | 1 point |
| the coincidence of MVD attribute | → | 2 points |
| the coincidence of CBP attribute | → | 2 points |
| the coincidence of TCOEFF attribute | → | 1 point |
| the coincidence of FIL attribute | → | 1 point | where
  LMTP: the sum of the set scores (in this case, "10");
  K: the number of MBKs included in the comparative area, with the first MBK being currently under decoding;
  K0: the number of MBKs included in the area being a candidate for the calculation of the reliability of the MTP prediction but the value above K;
  MTP(i): the MTP value of the first MBK of GOP, which is "0" in FIXED; and
  MTP_(i): the MTP pattern estimated on the basis of the MTP previous thereto by one, with usually the MTP pattern of the comparative area owing to the motion compensation being directly treated as the predicted pattern.

With the above-mentioned setting, for example, all the attributes for the MTP=1 and MTP=2 are coincident except MVD and FIL, and hence the similarity smtp (1, 2) will become 3+1+0+2+1+0=7 (points)

Accordingly, in that case,
  smtp(1, 2)=smtp(2, 1)=7

The other combinations can be calculated in a similar way.

Secondly, on the basis of the above-mentioned result, the detection and error correction of MTP are done, for example, on the following four conditions.

1) RMTP0<0.5

Because of a low reliability of the MTP prediction, the detection and error correction are reserved. That is, a decision is temporarily made that the current MTP value is correct, and the operation proceeds to the next attribute decision.

2) RMTP0≧0.5 and SMTP<TMTP1

In this case, a decision is made that the current MTP pattern MTP(L) involves the decoding error. Then, the MTP value is copied from the predicted pattern. TNFX1 is set, for example, to approximately 0.3.

On the other hand, all MTPs that the similarity is above 8 (the difference degree is below 2) are taken as references, and the corresponding VLC is seen.

The VLC to be seen and the bit stream sequence are compared through the fuzzy matching processing to select the VLC that the check degree is the highest.

If the check degree satisfies a given standard (above 0.8), the VLC and MTP are adopted. If not satisfying it, the initial estimated MTP value is employed.

3) RMTP0≧0.5 and TMTP1≦SMTP<TMTP2

The detection and error correction are suspended because it is impossible to decide that the current MTP value comes from the decoding error. That is, a decision is temporarily made that the current MTP value is correct, and the operation advances to the next attribute decision. TMBA2 is set, for example, to approximately 0.7.

4) RMTP0≧0.5 and TMTP2≦SMTP

A decision is made that the current MTP value shows the correct decoding result.

(c) Error correction and detection of QSC

At the transmission rate below 32 kbps, QSCs are all fixed to 31 (quantization step 62), while only the main area determined through the area analysis in the object area preference mode is set to 16 (quantization step 32). Accordingly, in the person mode, the QSC information is not transmitted. Thus, since the QSC information of the GOB layer and the quantization scale alteration information in MBK unit become unnecessary, the error of QSC does not occur.

(d) Error detection and correction of MVD

Since MVD is expressed by a difference motion vector between MBKs adjacent to each other within a frame, the error decision is difficult when taking the current form of the data. For this reason, the MVD data is returned to the original motion vector MV before evaluation. Since the MVD attribute data can be regarded as being a signal value having a continuous statistic property in time and in space, the linear prediction from the past frame and the linear interpolation from the peripheral or surrounding MBKs become possible. With no area information, the motion vector MV is given in accordance with the following equation (19).

$$vA\_(L, M) = u \sum_{i=1}^{K-1} a(i) \times vA(i, M) + (1-u) \sum_{m=1}^{P} b(m) \times vA(L, M-m) \quad (19)$$

where $$\sum_{i=1}^{K-1} a(i) = 1, \quad \sum_{m=1}^{P} b(m) = 1$$

Vx(L, M): the horizontal motion vector relating to the Lth MBK at the M frame time;

Vy(L, M): the vertical motion vector for the Lth MBK at the M frame time;

A: the subscript indicative of x or y;

vA\_(L, M): the estimated value of the motion vector for the Lth MBK at the M frame time;

a(i): the linear interpolation coefficient within a frame;

b(m): the linear prediction coefficient between frames;

u: the ratio ($0 \leq u \leq 1$) of the in-frame interpolation to the inter-frame prediction;

K: the number of MBKs in the peripheral MBK area, including the MBK under decoding; and p: the number of the past frames for making the linear prediction.

The method of setting the peripheral MBK is taken according to that for the MTP comparative area. The estimated vector value thus obtained undergoes the evaluation through the following error evaluation equation (20).

$$E = \sum_{A=x,y} |vA(L, M) - vA\_(L, M)| \quad (20)$$

A decision is made as follows from the error evaluation value E obtained through the equation (20).

1) $E \geq 20$

A decision is made that the decoded MVD is in error, and vA is replaced with vA\_.

The corresponding MVD is calculated to refer to the applicable VLC within a range of ±5 centering on the corresponding MVD.

The VLCs referred to and the bit stream sequence are compared with each other through the fuzzy matching processing to choose the VLC with the highest identification.

If the identification exceeds a given reference (above 0.8), those VLC and MVD are taken. If not exceeding the given reference, the MVD of the initial center value (MVD calculated in such a manner vA is replaced with vA\_) is put to use.

2) $20 > E \geq 10$

In this case, the decision is suspended, and the decoded MVD is temporarily retained.

3) $10 > E \geq 0$

A decision is made that the decoded MVD is correct.

Secondly, in the case of the presence of the area information, for the calculation of the motion vector, the following equation (21) is used in place of the aforesaid equation (19). The evaluation is made in the same way.

$$vA\_(L, M) = u \sum_{i=1}^{K-1} a(i) \times vA(i, M) + (1-u) \sum_{m=1}^{P} b(m) \times vRA(L, M-m) \quad (21)$$

where vRA(L, M-m): the average motion vector in the area at time before m frames.

(e) Error Detection and Correction of CBP

1) No Area Information

In the motion compensation prediction encoding processing, the CBP data can be considered as being a value representative of the texture or the variation of color with time. However, this CBP data does not take the algebraic structure permitting the linear interpolation calculation unlike MVD, and hence as shown in FIGS. 61 to 64 the CBP value is once transformed into the YUV vector and then the evaluation calculation is made in a similar way to that for MVD. Thus, the transform into the YUV vector is made in accordance with the following equation (22).

$$c\_(L, M) = \quad (22)$$
$$uc \sum_{i=1}^{K_c-1} ac(i) \times c(LN(i, M), M) + (1-uc) \sum_{m=1}^{pc} bc(m) \times c(L, M-m)$$

where $$\sum_{i=1}^{K_c-1} ac(i) = 1, \quad \sum_{m=1}^{pc} bc(m) = 1$$

c(L, M): the YUV vector for the Lth MBK at the M frame time;

c\_(L, M): the estimated value of the YUV vector for the Lth MBK at the M frame time;

ac(i): the linear interpolation coefficient within a frame;

bc(m): the linear prediction coefficient between frames;

uc: the ratio ($0 \leq uc \leq 1$) of the in-frame interpolation to the inter-frame prediction;

Kc: the number of MBKs in the peripheral area, including MBK under decoding;

pc: the number of the past frames for the linear prediction; and

LN(i, m): the number coordinate function indicative of the position of the address in GOB corresponding to the ith MBK in the comparative area at the M frame time, with it being singly determinable if the comparative area is set.

The method of setting the peripheral MBK is taken according to that for the MTP comparative area. The estimated vector value thus obtained is evaluated in accordance with the following error evaluation equation (23).

$$Ec = dl(c(L, M), c\_(L, M)) \quad (23)$$

where dl(A, B) represents the absolute distance between the vector A and the vector B.

A decision is made as follows in accordance with the error evaluation value E attained by the equation (23). In this case, since $12 \geq Ec \geq 0$ from the definition of the YUV vector, the following decisions are practicable.

i) $EC \geq 7$

A decision is made that the decoded CBP is in error, and c\_ is replaced with c.

CBP is calculated within a range of ±1 centering around the c (a plurality of CBPs can exist for one c), so that the decision is made referring to the applicable VLC.

The VLC referred to and the bit stream sequence are compared with each other through the fuzzy matching processing to choose the VLC with the highest identification.

If the identification exceeds a give reference (above 0.8), those VLC and CBP are adopted. Otherwise, the CBP being the initial center value is put to use.

ii) $7 > Ec \geq 4$

In this instance, the decision is reserved and the decoded CBP is retained.

iii) $4 > Ec \geq 0$

In this case, a decision is made that the decoded CBP is correct.

2) the Presence of Area Information

With the presence of the area information, for the calculation of the YUV vector, the following equation (24) is employed in place of the aforesaid equation (22), while the evaluation is made in a similar way.

$$c_{-}(L, M) = uc \sum_{i=1}^{Kc-1} ac(i) \times c(i, M) + (1 - uc) \sum_{m=1}^{pc} bc(m) \times cR(L, M - m) \quad (24)$$

where cR(L, M-m) designates the YUV vector in the motion compensation area at the time previous by m frame. The uc value is desirable to be set to a value slightly smaller than the value taken for absence of the area information. On the contrary, pc is set to be slightly larger than that value.

(f) Processing of Reserved Items

As a result of the detection of the five attributes and the error evaluations, in the case that, for example, the reserved attributes are 3 or more, only the reserved attributes are replaced with the error-corrected attribute values, and the evaluation is again made referring to VLC.

[B-4] Error Correction of Signal Level

The pattern level error correction described above depends upon the encoding attribute in units of MBK, and does not constitute a means to evaluate the picture signal value itself. Further, the evaluation of the picture signal becomes impossible until the bit stream data of the BLK layer is decoded in code level and is restored as the quantized DCT coefficient block. A description will be made hereinbelow of the error correction in the level of the picture signal thus restored.

(1) Error Correction Based on Property of Block Pixel (a) Error Detection

Figure 65A:
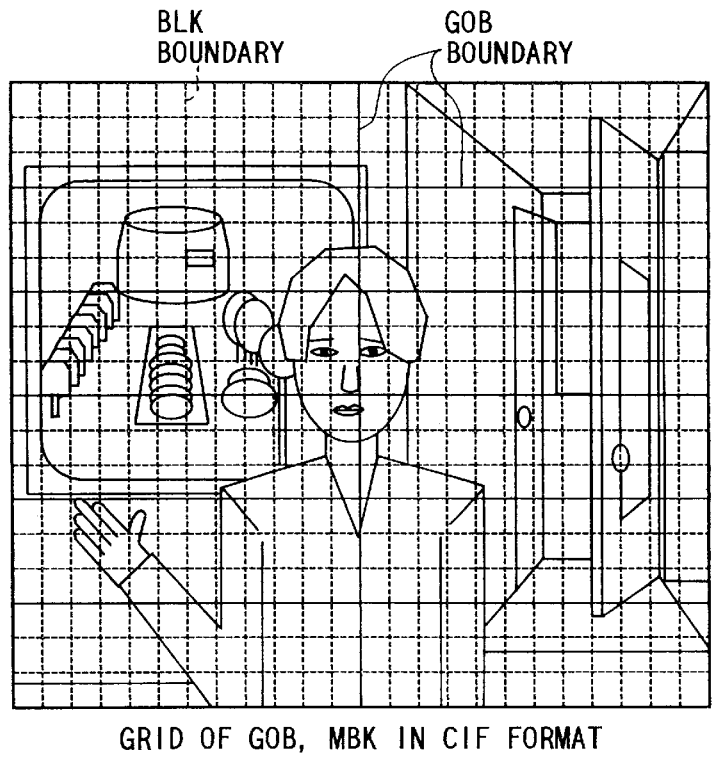
FIG. 65A is an illustration of GOB and MBK grids in CIF.
Figure 65B:
FIG. 65B is an illustration of an example of a block-like error pattern.
Figure 67A:
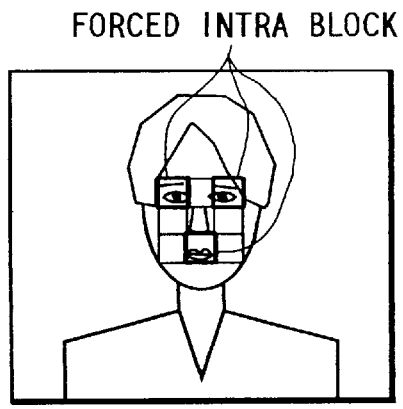
FIG. 67 is an illustration for describing an example of an area-separated period dispersion type forced INTRA.
Figure 67B:
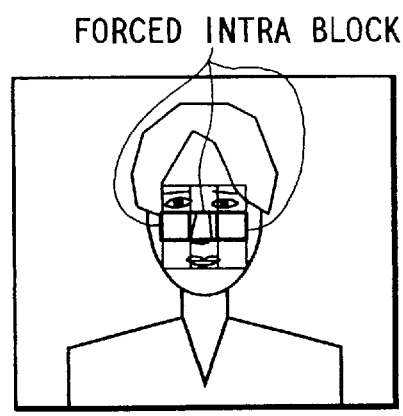
Figure 67C:
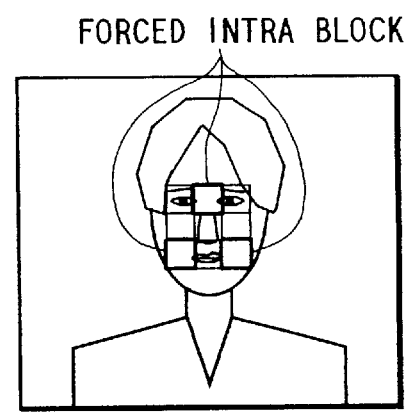
Figure 67D:
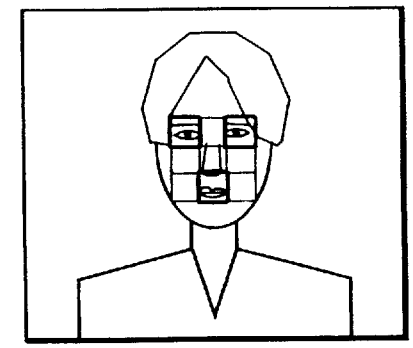

In general, the decoding error in the BLK layer comes under the decoding error of the DC component of the quantization DCT coefficient block in accordance with the grammatical constraint and the tree code of VLC. Thus, even if the decoding grammatically comes to completion, there is a possibility that its color (greatly affected by the DC component of the UV block) or the texture is exceedingly different from that of the peripheral portions (see FIG. 66). On the other hand, as shown as a normal picture signal in FIG. 65B, the probability that only the tile-like pixels on the grids of the pixel block (also see FIG. 65A) accidentally differ in color from the surrounding blocks is considered to be extremely low. This consideration further heightens the reliability when MTP of MBK being the object indicates INTER, for that in the case of MBK where the variation of the pixel value is intensive, the possibility that the decision is made as INTRA is usually high. Thus, the error detection is made as follows noting the color signal.

1) As the most direct ways, the evaluation of the color is fulfilled after the inverse quantization and the inverse DCT for the restoration to the picture signal block. This evaluation is based on the comparison between the MBK estimated through the linear interpolation from the peripheral MBK and the motion compensated linear prediction from the MBK of the past frame and the MBK restored from the bit stream at present. Concretely, the error evaluation calculation is made in the following equations (25) to (29).

$$Ec = dl(Cb, Ce) \quad (25)$$

$$S\$ = (Y\$, U\$, V\$) \quad (26)$$

$$Y\$ = \frac{1}{4 \times 64} \sum_{n=1}^{4} \sum_{k=1}^{64} YBLK\$(n, k) \quad (27)$$

$$U\$ = \frac{1}{64} \sum_{k=1}^{64} UBLK\$(k) \quad (28)$$

$$V\$ = \frac{1}{64} \sum_{k=1}^{64} VBLK\$(k) \quad (29)$$

where dl (A, B): the absolute distance between the vector A and the vector B;

Cb: the color vector of the restored MBK based on the bit stream;

Ce: the estimated color vector of MBK;

Y$: the average pixel value of the Y block;

U$: the average pixel value of the U block;

V$: the average pixel value of the V block;

YBLK$(n, k): the kth pixel value of the nth Y block in MBK (n=1 to 4, k=1 to 64)

UBLK$(k): the kth pixel value of the U block in MBK; and

VBLK$(k): the kth pixel value of the V block in MBK.

Since the error evaluation value Ec obtainable from the above-mentioned calculation results is under the condition of 765 ($=255 \times 3) \geq Ec \geq 0$, when being within this range, for example, when EC>400, the error decision is made. The MBK prediction estimation calculation is made in a similar way to that for the next item 2).

2) A YUV vector is constructed using only the DC component of the quantization DCT coefficient block so that the error with respect to the YUV vector estimated on the basis of the linear prediction using the peripheral MBK and the motion compensation prediction using the past frame is calculated and evaluated in accordance with the following equation (30).

$$c_{-}(L, M) = \quad (30)$$
$$uc \sum_{i=1}^{Kc-1} ac(i) \times c(i, M) + (1 - uc) \sum_{m=1}^{pc} bc(m) \times cR(L, M - m)$$

where $$\sum_{i=1}^{Kc-1} ac(i) = 1, \quad \sum_{m=1}^{pc} bc(m) = 1$$

c(L, M0): the YUV vector for the Lth MBK at the M frame time, with c(L, M)=(Y, U, V) in which Y represents the average of the DC components of four BLKs, and U and V designate the DC components of UBLK and VBLK, respectively;

cR(L, M-m): the YUV vector in the motion compensation area at the time previous by m frames in the case of the presence of the area information, while being equal to c(L, M) in the case of the absence of the area information;

c_(L, M): the estimated value of the YUV vector for the Lth MBK at the M frame time;

ac(i): the linear interpolation coefficient within a frame;

bc(m): the linear prediction coefficient between frames;

uc: the ratio of the in-frame interpolation to the inter-frame prediction ($0 \leq uc \leq 1$);

Kc: the number of MBKs in the peripheral MBK area, including the MBK under decoding; and pc: the number of the past frames for the linear prediction.

The method of setting the peripheral MBK is taken according to that for the MBK attribute comparative area in the next item. The estimated vector value thus obtained is evaluated in accordance with the following error evaluation equation (31). The error decision condition is the same as the above-mentioned 1).

$$Ec = dl(c(L, M), c\_(L, M)) \tag{31}$$

(b) Error Correction

In the case that a decision is made that the decoded BLK involves an error, it is replaced with the estimated value. On the other hand, for decoding the next BLK, it is necessary that resuming position of the bit stream decoding is determined in the code level. For this reason, the EOB detection processing in the code level error correction starts. At this time, if the number of the MBKs reproduced (or corrected) is 22 or more in GOB (the number of the blocks in two rows of the three rows organizing the GOB assumes 22), the remaining MBKs are all replaced with the values from the motion compensated prediction based on the area information.

(2) Prevention of Error Propagation Owing to Periodical Forced INTRA

Even after the execution of the error correction described in the previous item, if the decoding processing by the direct frame addition continues, the error propagation accumulation makes difficult the normal picture reproduction. Accordingly, the measures for the error propagation prevention are taken as follows.

(a) The prevention of the picture damage of important parts is possible in such a manner that the insertion of the forced INTRA MBK is periodically done on the basis of the area information. Particularly, as also shown in FIG. 67, in the face portion, the forced INTRA blocks are intensively assigned to the mouth and the ears and are periodically cycled, so that the prevention of the picture damage becomes possible while controlling the increase in data quantity.

(b) After the error correction, the decoder 2 side requests the encoder 1 side to send the forced INTRA on the area base in a state with being dispersed within a given length of time afterwards. In this case, the significant increase of the information quantity is avoidable as compared with ARQ (request signal) in units of a frame, which can eliminate the need for the picture freeze.

[B-5] Strategy Control for Error Correction Based on Mode Information

As described before, in the encoder 1 the mode information is made to be set to cover the three categories: the use environment, the subject and the encoding control, and using the mode information the error correction route is specified in the decoder 2 side.

(1) Use Environment (a) Motor Vehicle Interior Fixing Mode

By setting the background memory 66 and the person mode, the error correction functions start with respect to the levels of the recognition, the pattern and the signal.

(b) Motor Vehicle Interior Movable Mode

Although both the person mode and landscape mode can be taken, in the case of the person mode, the error correction is made in the same way as the aforesaid fixing in the interior of a motor vehicle except that the data of the background memory 66 is always updated and stored.

(c) Indoor Fixing Mode

The background memory 66 is usable. Even if the subject is not a person, the template or the 3D model can particularly be set depending on the purposes, and hence the error correction function using the area information works as well as the person mode.

(d) Indoor Movable Mode

Only in the case of the person mode, the error correction can function.

(2) Subject Mode

As described in the above use environment, in this case, the person mode and the landscape mode are taken. Since the landscape mode makes it difficult to specify the shape and the color, the start of the error correction function is difficult except for depending upon the background memory 66. Since the person mode allows using the template, the 3D model, the person picture texture, and the feature quantity such as the colors of eyes, nose, ears, hair and skin, the correction function for all the levels can start.

(3) Encoding Control Mode

In a mode different from the ordinary real-time motion picture reproduction request, for example, in the still picture mode or the video mail mode, it is not necessary to carry out the error correction at the real time. Accordingly, the error correction is achievable by only the start of ARQ.

(4) Decision of Error Occurrence State in Communication Path

In cases where the correction of the picture is difficult even by other error correction means and the decoding operation stops, any one of the following request signals is compulsorily fed from the decoder 2 side to the encoder 1 side. Incidentally, for the transmission of such request signals, the level selection and setting can automatically be made in accordance with the situation of the communication path, or setting the level according to the preference of the user is possible. The level setting is made through the human interface 34.

(a) Retransmission Request of Motion Picture Which begins with Forced INTRA Picture This is the same as the retransmission (ARQ) according to the existing method. However, since in the extremely low rate transmission the significant increase in delay time and the frequent picture freeze arise, this request seldom takes place particularly for the real-time transmission below 32 kbps. On the other hand, for example, in the case of the non-real time transmission in the video mail mode, this request is put to use.

(b) New Restart of Motion Picture Transmission Which Begins with Forced INTRA Picture At the time that the decoding processing stops, in terms of the remaining MBKs, the estimated picture is produced from the past frame and the picture freeze is made. Until the forced INTRA picture is normally sent (the starting position is confirmed by the PSC header), the data of the input buffer continues to be abandoned.

(c) Transmission Request of Quasi-Motion Picture by Only Forced INTRA Picture (d) Transmission Request of Motion Parameter in Model-Based Encoding

[B-6] Error Correction of Recognition Level (1) Specification of Object Area

The object area detection result set in the encoder 1 side and the mode control information are transmitted as picture signals in a state with being described in the user data area (PSPARE, GSPARE), and for the detection, they are subjected to the decoding processing in the decoder 2 side. Further, on the basis of these information the selection and deformation of the template (2D information) are made, thus reproducing the area information extracted in the encoder 1 side (see FIG. 68).

(a) Selection of Basic Template

Since a set of the same binary templates is provided in advance in both the encoder 1 and decoder 2, a common template can be used for both by the detection of the identification number designating the template.

(b) Deformation of Basic Template

1) Alignment

The alignment is accomplished through the use of the 2D vector (mx, my) expressing the shifting quantities of the center of the template in horizontal and vertical directions in units of a pixel.

2) Scaling

The basic template is enlarged and contracted in the ratio r in a state that the center thus obtained is treated as the origin.

3) Correction

On the basis of the inherent shape parameters, the correction is partially given to each basic template in width, height, positional angle and so on.

(c) Specification of Portions

In cases where the category of the object is known from the mode information and the template selection information, it is possible to find the corresponding relationship between a portion of the template and a portion of the object. For example, If selecting the person upper half template in the person mode, as shown in FIG. 16 for the description of the encoder 1, it is possible to specify the fine picture areas equivalent to the person head, face, mouth, eyes and nose.

(2) Start-up of Error Decision

In this embodiment the picture correction process is described in a state that the occurrence cause of the error is specified to the bit error in the code level. Accordingly, the error detection itself is not made in the recognition level, but being made in signal level, code level or pattern level. The error correction in the recognition level is for offering the various properties reflecting the area information and the picture of the object based on the area information. Thus, the start-up of the error correction process in the recognition level is done by the module in a different level.

(3) Error Correction Using Area Information (a) 2D Motion Compensation Made through the Use of Area Information If found is the area in which the MBK being currently under the decoding is included, as described in the pattern level error correction, the motion compensation is achievable by using the motion vector of the MBK within the area in which the decoding has already been finished. For instance, if a decision is made such that the MBK being under the decoding is included in the face area of the head, the motion compensation predicted MBK is producible using the average motion vector of the head portion.

(b) Correction Using Part Information

If the area is found, in addition to the motion, it is possible to correct the color, the luminance and the error of the texture. For example, if the analysis of the skin color is made from the face area information before the previous frame, as described in the item relating to the signal level and the pattern level, the error decision and correction are possible through the linearly estimated value and the error evaluation.

(c) Expression of Area Information

The expression of the area information is made according to the expressing way for the template in the description of the encoder 1 side. For example, in the person mode, the template is produced in the four hierarchies: the full length, the upper half, the head and the face of the subject in a state that the full-length picture is treated as the reference. In addition, in the face portion, the mouth, eyes, nose, cheeks and forehead are treated as the main portions, and the relative positions are set in the front face. The aforesaid skin color analysis is accomplished by calculating the average color on the basis of the portions other than the mouth and eyes.

(d) Calculation of Relative Position in Person Area

The basic template before the deformation, as explained above, is illustrated in FIG. 25. Accordingly, the positions of all the portions are expressible on the two-dimensional coordinate in the basic template.

(4) Error Correction by Background Memory

If the area information is made clear, the specification of the background area is possible. Thus, the picture information in the background area is stored in the background memory 66 of the decoder 2. Whereupon a similar error correction to that described above is practicable even if the bit error occurs during the decoding processing of the background area.

[B-7] Person Memory and 3D Model-Based Method (1) Registration of Person Picture The initial INTRA picture is labelled with a person name, and is stored as the person picture data in the person memory 67. Through the use of the human interface 34 the person name is given as a label corresponding to a certification number and registered at the encoding. In addition, the area information of the INTRA picture can be stored with the template number and the deformation information. Moreover, if the date and hour at which the contact (conversation) with that person occurs are simultaneously stored or if the speech information is stored in the same level as far as the memory capacity permits, the function further improves.

(2) Call of Person Picture

The person picture information stored by the registration into the person memory 67 can be called by the user as a card picture at an adequate timing on the basis of the person identification name. Accordingly, it is possible to remember the face of the other party the user has once made contact. For instance, when again making conversation, it can be used as a means for the certification of the other party. Further, when the transmission error becomes heavy, it can also be used as the texture picture in the model-based decoding mode.

(3) Model-Based Decoding Mode

In cases where the transmission error becomes heavy, this mode acts as an auxiliary picture reproducing means to produce a person image in such a manner that the aforesaid person picture is texture-mapped on the person 3D model to give the 3D motion information. It is also preferable that the decoder 2 gives this 3D motion information so that the motion of some person appears. In addition, its control is also possible by using the 3D motion information extracted in the encoder 1 side.

(4) Spatial Limitation Based on 3D Model

If the 3D motion information is given from the encoder 1 side, the area prediction is possible even in the cases other than the front picture which are difficult to express by only the aforesaid 2D template information. That is, as also shown in FIG. 13 the 2D area can be specified on the picture surface by means of the perspective projection of the 3D model.

[B-8] Error Correction Strategy

On the basis of the error decision result in each level, the error correction function to be finally employed can be summarized as follows. Each level number indicates an estimated value of the degree of faithfulness to the original picture of the reproduced motion picture. That is, (Level 0): 3D model-based reproduction
(Level 1): picture freeze
(Level 2): model-based estimation
(Level 3): linear estimation and motion compensation in units of GOB which are based on the area information
(Level 4): linear estimation and motion compensation in units of MBK which are based on the area information
(Level 5): correction of code level

[B-9] Decoding Operation According to Flow Chart

Figure 11:
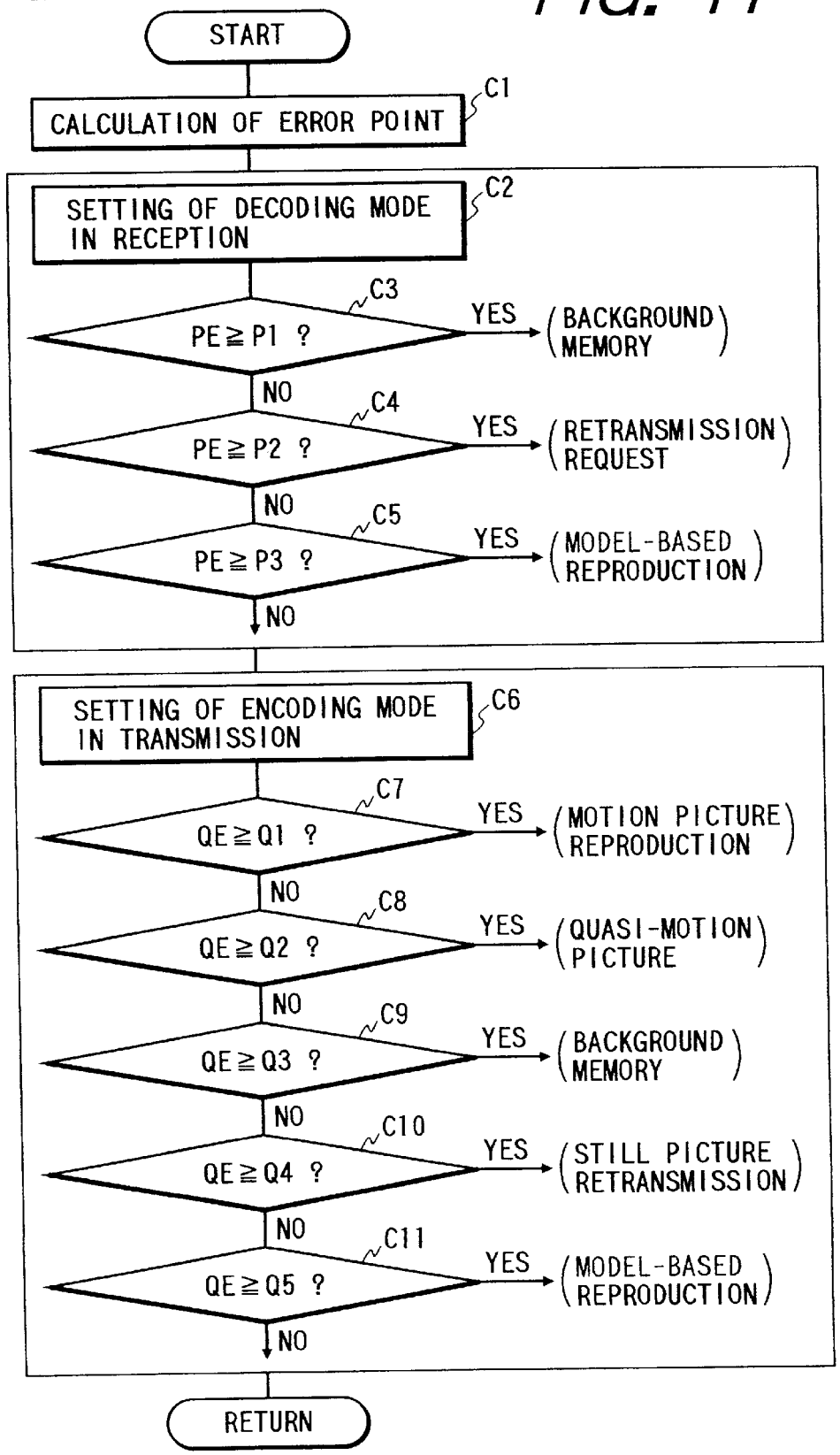
FIG. 11 is a flow chart showing an error integrated decision routine.

The error correction functions in the actual decoding processing are executed in accordance with flow charts of FIGS. 8 to 11. A description will be made hereinbelow of the outline of the whole flow. That is, the bit stream data accumulated in the FIFO buffer 42 undergoes the fuzzy matching processing in the fuzzy matching section 44 of the channel decoding section 35 to retrieve PSC (step B1) so that the decoding processing of the necessary number of bits, the mode information and the area information is carried out on the basis of the retrieved position in the parser 43 (steps B2 to B4). Further, on the basis of these data the global check is again done to carry out the positional search for GBSC in one frame (step B5). Subsequently, the decision operation of the code level is executed in accordance with the error integrated decision routine as shown in FIG. 11 (step B6).

Thereafter, the mode control section 33 sets the use environment, the object (subject) and the decoding mode on the basis of the obtained mode information (steps B7 to B9). If it is the person mode, the selection, correction and deformation of the basic template and the scaling process are executed to reproduce the area pattern (steps B10 to B13), then followed by the error correction function of the pattern level through steps B14 to B17. The attribute estimation section 61 fulfills the error detection and correction of MBA and MTP (steps B18 and B19). If the person mode is set, the error decision and correction section 50 suppresses QSC and then performs the error detection and correction of MVD (steps B20 to B22). Subsequently, the attribute estimation section 61 implements the error detection and correction of CBP (step B23). From these results, the error detection and correction section 50 performs the error integrated decision in accordance with the routine as shown in FIG. 11 (step B24). Then, if the attribute error is detected in the above-mentioned processes, the control again returns to the corresponding step to perform the error detection (steps B25 to B28). After the completion of these steps, the completely decoded attribute array data is stored in the pattern attribute section 39c being an attribute memory.

Furthermore, passing through the steps B30 to B33, the decoding processing section 36 executes the BLK decoding processing according to the H.261 standard base on the basis of the aforesaid attribute array data in the decoding processing section 36 (step B34). Subsequently, if setting the person mode, the pattern and signal level error correction section 37 performs the texture and color estimation on the basis of the portion information and the feature quantity and the linear estimation of the color vector on the basis of the peripheral and past MBKs and the evaluation of the color vector (steps B36 to B38).

In cases where the error occurs and LBLK is 22 or more, the motion compensation estimation is made in terms of the remaining MBKs of GOB, and then the operation for GOB terminates (steps B40 and B41). On the other hand, if the error occurs but the LBLK is below 22 or if there is no occurrence of the error, after the detection and correction of ESC and the detection and correction of EOB, the control proceeds to the error integrated decision routine of FIG. 11 (steps B42 to B44 ). With these steps repeated, the decoding processing continues.

According to this embodiment, the encoder 1 side can realize the extremely low rate picture transmission through the integrated use of the alteration of the syntax, the substitute of the code word, the adaptive control for the attribute decision and the estimation of the encoding attribute of the current frame based on the past encoding attribute, the area-separated quantization control and the object area extraction based on the motion and the model, the control of the significant number of transformation coefficients according to the use mode, the transmission rate and motion occurrence quantity and so on. In addition, according to this embodiment, the encoder 1 can simply be realized only with a slight change being applied to the current image compression standard (H.261), that is, by the addition of the protocol transformer.

Moreover, according to this embodiment, in the case of receiving a motion picture signal through a digital communication path showing a high transmission error rate to perform the decoding processing, the decoder 2 side receives the encoded bit stream processed to apply the extremely low rate to the existing motion picture compression standard H.261, and effectively exerts the error correction functions in the levels of the code, the grammar, the signal and the recognition on the basis of the protocol, and further performs the error detection of the pattern, the signal and the grammar through the global check of the encoded bit stream taking the necessary bit quantity into consideration to accomplish the error correction through the recognition level evaluation on the basis of the area information (person or the like) depending on the mode information and the 2D template.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A picture signal encoding system which compresses a picture signal with a variable-length code to produce and transmit encoded bit stream data, said system comprising:

mode control means retaining a mode condition for setting an incidental situation with a predetermined code, said mode control means performing an encoding processing of said picture signal under said mode condition; and mode setting means for adding a code corresponding to said mode condition to said encoded bit stream data when said mode control means executes said encoding processing under said mode condition.

2. A system as defined in claim 1, further comprising:

person information storage means for storing and reading out data corresponding to a person in a scene; and background information storage means for storing and reading out background information located at a stationary area other than an object area in said scene, wherein said mode control means sets a use environment mode which makes as said incidental situation a limited condition corresponding to a use environment in the form of a code, and performs an encoding processing on the basis of said limited condition in said use environment mode and further on the basis of necessary data of one said person information storage means and said background information storage means.

3. A system as defined in claim 2, wherein said mode control means is constructed to set as said use environment mode a fixed mode and a movable mode for each of an interior of a motor vehicle, an indoor spot and an outdoor spot, said fixed mode for said motor vehicle interior and said indoor place performing said encoding processing by setting a person mode for when a person is in a main area, wherein said movable mode for said motor vehicle interior and said indoor place performs said encoding processing by setting a landscape mode for a landscape in addition to said person mode, said fixed mode for said outdoor place performs said encoding process to enable wire and wireless transmissions, and said movable mode for said outdoor place performs said encoding processing to enable a wireless transmission.

4. A system as defined in claim 1, further comprising:

person information storage means for storing and reading out data corresponding to a person in a scene; and background information storage means for storing and reading out background information located at a stationary area other than an object area in said scene, wherein said mode control means sets a subject mode which makes as said incidental situation a limited condition corresponding to a subject in the form of a code, and performs an encoding processing on the basis of said limited condition in said subject mode and further on the basis of necessary data of one said person information storage means and said background information storage means.

5. A system as defined in claim 4, wherein said mode control means sets as said subject mode a person mode, a landscape mode and a stationary object mode, wherein each of said person mode and said landscape mode makes a limited condition presupposing the existence of a person and a landscape in a main area of a scene in the form of a code to perform said encoding process under said condition, and said stationary object mode sets one of a motion picture mode and a high-resolution still picture mode to perform said encoding processing.

6. A system as defined in claim 5, wherein in said person mode said mode control means performs the switching among a head portion mode, an upper-half portion mode, a full-length mode and a plural-person mode in accordance with a distance up to a person existing in a main area and adds the corresponding mode information for said encoding processing.

7. A system as defined in claim 1, wherein said mode control means sets an encoding control mode in which said encoding processing is executed under a specific condition for limiting information quantity during encoding of said picture signal.

8. A system as defined in claim 7, wherein in said encoding control mode said mode control means sets a motion picture mode, a quasi-motion picture mode, a still picture mode and a background mode, and the mode setting is selectively carried into effect in accordance with a transmission condition and a picture quality condition to perform said encoding processing.

9. A system as defined in claim 7, wherein said mode control means sets as said encoding control mode a scene center preference mode to perform said encoding processing in which a larger quantity of bits are assigned to a center area of a scene.

10. A system as defined in claim 7, wherein said mode control means sets as said encoding control mode an object area preference mode on the basis of area information set in such a way that a specific area of a scene given in a different mode setting is treated as an object area, and said encoding processing is executed in a state that a larger quantity of bits are assigned to said object area.

11. A system as defined in claim 10, wherein said mode control means sets as said encoding control mode a motion preference mode for maintaining a frame rate in such a manner that said scene center preference mode and said object area preference mode are selectively switched to suppress the occurrence of a code quantity in accordance with an occurrence quantity of a motion area in said scene.

12. A system as defined in claim 7, wherein said mode control means sets three-dimensional model data previously indicative of a shape of an object through a three-dimensional rough model, and sets a model-based mode to produce as encoding data positional information and color information relative to said three-dimensional data.

13. A system as defined in claim 12, wherein in said model-based mode said mode control means calculates distance information on the basis of a two-dimensional template corresponding to a scene set in advance in producing a model-based prediction picture of said object.

14. A system as defined in claim 13, wherein in said model-based mode said mode control means previously sets a feature area of said two-dimensional template so that a model-based prediction is made by roughly estimating a positional attitude of said three-dimensional model from moved position data of said feature area on the basis of two-dimensional motion information.

15. A system as defined in claim 12, wherein said mode control means transmits forced INTRA frame data after the start of transmission of a picture signal and before the start of conversation and subsequently obtains necessary data in said model-based mode to make a model-based prediction of an object frame immediately before the start of the conversation.

16. A system as defined in claim 1, wherein said mode control means determines a transition from a set mode state to a different mode state in accordance with a given transition decision condition.

17. A system as defined in any one of claims 1 to 16, wherein said mode control means is made to allow manual and forced setting of a transition from a set mode state to a different mode state.

18. A system as defined in claim 16, wherein said mode control means determines said transition from said set mode state to said different mode state in accordance with a decision made according to an analysis of said picture signal.

19. A system as defined in claim 16, wherein, when information necessary for said decision according to said picture signal analysis lacks, said mode control means determines said transition from said set mode state to said different mode state on the basis of a transition probability value set in advance according to its level.

20. A system as defined in claim 19, wherein, when an evaluation calculation is made of the mode transition decision based on said transition probability value and shows that an error value goes large, said mode control means updates said transition probability value so that said error value becomes smaller.

21. A system as defined in claim 20, wherein said mode control means performs said evaluation calculation to said decision result through the employment of one of a two-dimensional template, a color analysis result and a velocity and acceleration evaluation.

22. A system as defined in claim 16, further comprising a human interface for information exchange with a user, said mode control means gives set information through said human interface to said user so that an incidental situation corresponding to a given mode setting state takes place.

23. A picture signal encoding system which compresses a picture signal with a variable-length code to produce and transmit encoded bit stream data, said system comprising:
object area extraction means for extracting an area of an object existing in a scene; and
encoding means for adding attribute data of the object area extracted by said object area extraction means to said picture signal to reduce information quantity in encoding processing.

24. A system as defined in claim 23, wherein said object area extraction means extracts said object area in accordance with the presence or absence of the occurrence of a motion vector.

25. A system as defined in claim 24, wherein said object area extraction means extracts said object area by detecting an occurrence area of said motion vector over three or more frames.

26. A system as defined in claim 24, wherein, for extracting said object area, said object area extraction means detects a block in which a maximum motion vector occurs and estimates as a main area an area including the maximum motion vector occurrence block.

27. A system as defined in claim 26, wherein said object area extraction means is equipped with panning vector calculation means for calculating a panning vector indicative of a motion quantity of the whole scene on the basis of an average value of motion vectors at a peripheral portion of said scene, and the detection of said maximum motion vector is made by subtracting said panning vector given through said panning vector calculation means.

28. A system as defined in claim 24, wherein for extracting said object area said object area extraction means decides a block pattern comprising motion blocks to calculate its feature quantity and scales a corresponding template when template information is present.

29. A system as defined in claim 28, wherein said object area extraction means performs a model-based transmission of data representative of attribute information in block unit as said template information in correspondence with a model.

30. A system as defined in claim 29, wherein for extracting said object area said object area extraction means analyzes a pattern taken when said object in said scene moves two-dimensionally to simply detect the motion.

31. A system as defined in claim 23, wherein for extracting said object area said object area extraction means produces a two-dimensional template on the basis of a three-dimensional model.

32. A system as defined in claim 23, wherein said object area extraction means decides a category of said object area on the basis of a control state based on mode information.

33. A system as defined in claim 32, wherein said object area extraction means decides said category of said object area on the basis of a state transition condition in mode control.

34. A system as defined in claim 32, wherein said object area extraction means decides said category of said object area on the basis of attribute information set in units of a block.

35. A system as defined in claim 23, wherein said object area extraction means always performs the area extraction processing at the time of transmission of a forced INTRA frame and designates and transmit information on a background area estimated from said object area at that time.

36. A system as defined in claim 35, wherein said object area extraction means designates said background area information to selectively perform transmission of said background area in accordance with an information transmission quantity.

37. A system as defined in claim 36, wherein, when said information transmission quantity undergoes a restriction, said object area extraction means transmits data whereby information designated as said background area information is combined with person information being under transmission.

38. A picture signal encoding system comprising,
picture compression and recognition processing means for compressing an input picture signal and for performing recognition processing;
a variable-length coding means for coding an output picture signal from said picture compression and recognition processing means;
a fixed-length coding means for coding said output picture signal from said picture compression and recognition processing means;
combining means responsive to output signals from said variable-length coding means and said fixed-length coding means for combining said output signals on the basis of syntacs;
a buffer responsive to an output signal from said combining means;
coding control means responsive to the capacity of said buffer and to processing attribute obtained by said picture compression and recognition processing means for controlling the operation of said variable-length coding means, said fixed-length coding means and said combining means.

39. A system as defined in claim 38, wherein said encoding control means encodes said picture signal by reducing the number of codes indicative of a header and a number for a block group comprising one frame to half of the number of block groups.

40. A system as defined in claim 38, wherein said encoding control means sets a length of a variable-length code indicative of an encoding attribute of a macroblock designated in units of a block in the order from a higher occurrence probability in relation to a person picture to control the occurrence code quantity.

41. A system as defined in claim 38, wherein said encoding control means is equipped with adaptive control means for executing adaptive control of a decision characteristic taken for a decision of an attribute set in units of a block.

42. A system as defined in claim 41, wherein said adaptive control means executes said adaptive control on the basis of area information in a frame.

43. A system as defined in claim 41, wherein said adaptive control means executes said adaptive control in accordance with a buffer quantity to make a decision on whether to choose an INTER frame or an INTRA frame in encoding said picture signal.

44. A system as defined in claim 41, wherein said adaptive control means executes said adaptive control in accordance with a buffer quantity to make a decision on whether or not to make a motion compensation in encoding said picture signal.

45. A system as defined in claim 40, wherein said encoding control means predicts an attribute of a frame to be encoded, on the basis of encoding attribute data obtained in terms of the past frame to control the code occurrence quantity.

46. A system as defined in claim 45, wherein said encoding control means performs said attribute prediction in units of a block on the basis of each of the past encoding attribute data in a macroblock layer.

47. A system as defined in claim 45, wherein said encoding control means performs said attribute prediction in units of a block on the basis of area information.

48. A system as defined in claim 40, wherein said encoding control means is provided with quantization control means for controlling a quantization step in encoding said picture signal.

49. A system as defined in claim 48, wherein said quantization control means assigns said quantization step at every area being one of an object area and a scene center.

50. A system as defined in claim 48, wherein said quantization control means assigns said quantization step in accordance with a buffer quantity.

51. A system as defined in claim 48, wherein said quantization control means assigns said quantization step in accordance with an encoding rate of said picture signal.

52. A system as defined in claim 48, wherein said quantization control means assigns said quantization step in accordance with the information occurrence quantity in encoding said picture signal.

53. A system as defined in claim 52, wherein said quantization control means decides said information occurrence quantity on the basis of the result of a calculation of a degree of an intensity of motion of the current frame with respect to that of the past frame.

54. A system as defined in claim 52, wherein said quantization control means decides said information occurrence quantity on the basis of the result of calculation of the degree of intensity of a color variation of the current frame with respect to that of the past frame.

55. A system as defined in claim 51, wherein said quantization control means makes a decision of the information occurrence quantity in accordance with the result of a calculation of an increment of a virtual buffer quantity made on the basis of one of the degree of intensity of motion and the degree of intensity of a color variation which are respectively said information occurrence quantity.

56. A system as defined in claim 40, wherein said encoding control means is provided with limiting means for controlling the number of significant coefficients of transformation coefficients after quantization in units of a block so that it is below an upper limit value determined in accordance with a given condition.

57. A system as defined in claim 40, wherein said encoding control means is provided with switching means for switching a frame rate in accordance with the information occurrence quantity.

58. A system as defined in claim 38, wherein said encoding control means executes said encoding control based on a picture encoding under one of the H.261 standard and the MPEG standard.

59. A system as defined in claim 58, wherein said encoding control means is equipped with data transform means made according to the H.261 standard.

60. A picture signal recognition system comprising, object region extracting means responsive to an input picture signal for generating region information;

region evaluating means responsive to said region information for obtaining an evaluation result;

mode control means for providing mode setting information;

3-dimensional shape database including 3-dimensional models;

first memory means for storing person region picture data;

second memory means for storing scenery region picture data;

model base predicting means responsive to said evaluation result, said person region picture data, said scenery region picture data, said mode setting information, and said 3-dimensional models for generating a predicted picture; and inter-frame coding means responsive to said input picture signal and said predicted picture for effecting inter-frame coding to produce coding data, said inter-frame coding means also generating and sending coded reproduction pictures to said model base prediction means, thereby said model base predicting means outputs recognition results by obtaining a position posture by way of incidental situation which is obtained from said mode control means and said 3dimensional models, on the basis of color information accompanying a model or color information obtained by said coded reproduction picture, and said model base predicting means generates said prediction picture of a succeeding frame, said model base prediction means supplying said object region extraction means with a presumption region so that said object region extracting means outputs said region information on the basis of said presumption region and said input picture signal, said 3-dimensional shape data base supplies said model base prediction means with a suitable 3-dimensional model, person region pictures and scenery region pictures obtained in said model base prediction means during the operation thereof are able to be newly stored in said first and second memories respectively.

61. A system as defined in claim 60, wherein in said model-based mode said mode control means calculates distance information on the basis of a two-dimensional template corresponding to a scene set in advance for producing a model-based prediction picture of an object.

62. A system as defined in claim 61, wherein in said model-based mode said mode control means, for performing a model-based prediction, previously sets a feature area of said two-dimensional template and roughly estimates a positional attitude of said three-dimensional model from position data on motion of said feature area on the basis of two-dimensional motion information.

63. A system as defined in claim 60, wherein, when information necessary for said decision according to said picture signal analysis lacks, said mode control means determines said transition from said set mode state to said different mode state on the basis of a transition probability value set in advance according to its level.

64. A system as defined in claim 63, wherein, when an evaluation calculation is made with respect to the mode transition decision based on said transition probability value and shows that an error value goes large, said mode control means updates said transition probability value so that said error value becomes smaller.

65. A system as defined in claim 64, wherein said mode control means performs said evaluation calculation to said decision result through the employment of one of a two-dimensional template, a color analysis result and a velocity and acceleration evaluation.

66. A system as defined in claim 60, further comprising a human interface for information exchange with a user, said mode control means gives set information through said human interface to said user so that an incidental situation corresponding to a given mode setting state takes place.

67. A picture signal recognition system which analyzes a picture signal in the process of encoding said picture signal to recognize an object existing in an area of a frame, said system comprising:

object area extraction means for extracting an area of an object existing in a scene; and encoding means for setting attribute data of the object area extracted by said object area extraction means to reduce information quantity in encoding processing.

68. A system as defined in claim 67, wherein said object area extraction means extracts said object area in accordance with the presence or absence of the occurrence of a motion vector.

69. A system as defined in claim 68, wherein said object area extraction means extracts said object area by detecting an occurrence area of said motion vector over three or more frames.

70. A system as defined in claim 68, wherein for extracting said object area said object area extraction means detects a block in which a maximum motion vector occurs and estimates as a main area an area including the maximum motion vector occurrence block.

71. A system as defined in claim 70, wherein said object area extraction means is equipped with panning vector calculation means for calculating a panning vector indicative of a motion quantity of the whole scene on the basis of an average value of motion vectors at a peripheral portion of said scene, and the detection of said maximum motion vector is made by subtracting said panning vector given through said panning vector calculation means.

72. A system as defined in claim 67, wherein for extracting said object area said object area extraction means decides a block pattern comprising motion blocks to calculate its feature quantity and scales a corresponding template when template information is present.

73. A system as defined in claim 72, wherein said object area extraction means performs a model-based transmission of data representative of attribute information in block unit as said template information.

74. A system as defined in claim 73, wherein for extracting said object area said object area extraction means analyzes a pattern taken when said object in said scene moves two-dimensionally for simply detecting a motion of the object.

75. A system as defined in claim 74, wherein for extracting said object area said object area extraction means produces a two-dimensional template on the basis of a three-dimensional model.

76. A system as defined in claim 67, wherein said object area extraction means decides a category of said object area on the basis of a control state according to mode information.

77. A system as defined in claim 76, wherein said object area extraction means decides said category of said object area on the basis of a state transition condition in mode control.

78. A system as defined in claim 76, wherein said object area extraction means decides said category of said object area on the basis of attribute information set in units of a block.

79. A system as defined in claim 67, wherein said object area extraction means always performs the area extraction processing at the time of transmission of a forced INTRA frame and designates and transmit information on a background area estimated from said object area at that time.

80. A system as defined in claim 79, wherein said object area extraction means designates said background area information to selectively perform transmission of said background area in accordance with an information transmission quantity.

81. A system as defined in claim 80, wherein, when said information transmission quantity undergoes a restriction, said object area extraction means transmits data whereby information designated as said background area information is combined with person information being under transmission.

82. A picture signal decoding system which receives a picture signal transmitted in the form of an encoded bit stream compressed with a variable-length code to decode it to reproduce said picture signal, said system comprising:

NFX transform means for detecting macroblock address (MBA) data indicative of a position of a block included in said picture signal formed in a state that pixel data corresponding to one frame is divided into a plurality of blocks and for transform between fixed (FXD) data and non-fixed (NFX) data on the basis of the detected MBA data;

prediction means for predicting an NFX pattern of a frame being currently under decoding, on the basis of a transform result of the past frame by said NFX transform means;

calculation means for calculating the degree of similarity between the NFX data pattern predicted by said prediction means and a decoded result and for calculating the degree of reliability of the calculated similarity;

evaluation means for evaluating said decoded result on the basis of the calculation result by said calculation means; and correction means for correcting an error of the decoded result in accordance with the evaluation result by said evaluation means.

83. A picture signal decoding system which receives a picture signal transmitted as an encoded bit stream compressed with a variable-length code to decode it to reproduce said picture signal, said system comprising:

MTP detection means for detecting macroblock type (MTP) data indicative of an attribute of a block, included in said picture signal made in a state that pixel data corresponding to one frame is divided into a plurality of blocks, in the form of a code, and for producing an MTP pattern on the basis of a value of the detected MTP data;

comparative area setting means for setting a comparative area by making a motion compensation of a portion corresponding to said comparative area on the basis of the MTP pattern of the past frame detected by said MTP detection means;

calculation means for calculating the degree of similarity between said MTP data of the past frame in said comparative area set by said comparative area setting means and the MTP data being currently under decoding as a score representative of the degree of coincidence among a plurality of attribute data indicated by code values, and further for calculating the degree of reliability of the calculated similarity;

evaluation means for evaluating a decoded result on the basis of the calculation result by said calculation means; and error correction means for correction an error of said decoded result in accordance with the evaluation result by said evaluation means.

84. A picture signal decoding system which receives a picture signal transmitted as an encoded bit stream compressed with a variable-length code to decode it to reproduce said picture signal, said system comprising:

MV transform means for detecting difference motion vector data (MVD) indicative of a difference motion vector of a block included in said picture signal made in a state that pixel data corresponding to one frame is divided into a plurality of blocks to transform the detected MVD data into motion vector (MV) data representative of a motion vector;

MV data estimation means for obtaining estimated MV data by estimating a motion vector, being currently under decoding, from one of the MV data of a past frame transformed by said MV transform means and MV data of a peripheral block; and error correction means for comparing the estimated MV data obtained by said MV data estimation means with said MV data being currently under decoding to perform an evaluation and error correction of a decoded result on the basis of a difference obtained as the comparison result therebetween.

85. A picture signal decoding system which receives a picture signal transmitted as an encoded bit stream compressed with a variable-length code to decode it to reproduce said picture signal, said system comprising:

YUV vector transform means for detecting an encoded block pattern (CBP) data indicative of color information of a block, included in said picture signal made in a state that pixel data corresponding to one frame is divided into a plurality of blocks, in the form of a code and further for transforming the detected CBP data into a YUV vector in Y, U and V directions which allows a comparison in value;

comparative area setting means for setting a comparative area by making a motion compensation of a portion corresponding to said comparative area on the basis of a motion vector with respect to said YUV vector of the past frame transformed by said YUV vector transform means;

YUV vector estimation means for estimating a YUV vector of a block being under decoding on the basis of one of the YUV vector of a past frame transformed by said YUV vector transform means and a YUV vector value of a peripheral block within the comparative area set by said comparative area setting means; and error correction means for comparing the estimated YUV vector obtained by said YUV vector estimation means with a YUV vector being currently under decoding to calculate an error evaluation value, and further for performing an error correction of CBP data of a block decoded on the basis of the error evaluation value.

86. A picture signal decoding system which receives a picture signal transmitted as an encoded bit stream compressed with a variable-length code to decode it to reproduce said picture signal, said system comprising:

mode control means storing a mode condition setting an incidental situation in the form of a predetermined code, when mode information is not included in the received picture signal, said mode control means selectively setting said mode condition corresponding to said mode information in performing a decoding processing; and correction means for detecting and correcting an error of decoded data obtained through said decoding processing of said picture signal under the mode condition selectively set by said mode control means.

87. A system as defined in claim 86, wherein said mode control means includes person information storage means for storing and reading out data corresponding to a person in a scene and background information storage means for storing and reading out background information being in a fixed area other than an object area in said scene, said mode control means executing mode control corresponding to a use environment mode setting condition through the use of said person information storage means and said background information storage means used according to a use environment.

88. A system as defined in claim 87, wherein said mode control means is constructed to set a fixed mode and a movable mode for each of an interior of a motor vehicle and an outdoor place as said use environment, in said fixed mode for the interior of said motor vehicle said mode control means making said correction means exert the error correction function under the condition using said person information storage means and said background information storage means, in said movable mode for the interior of said motor vehicle said mode control means carrying out an updating process for said background information storage means in addition to said function in the motor vehicle interior fixed mode, in said outdoor place fixed mode said mode control means making said error correction means exert the error correction function under the condition mainly using said background information storage means, and in said outdoor place movable mode said mode control means making said error correction means exert the error correction function under the condition that said person mode is established.

89. A system as defined in claim 86, wherein said mode control means is equipped with person information storage means which stores and reads out data corresponding to a person in a scene and background information storage means which stores and reads out background information being in a stationary area other than an object area in said scene, said mode control means executing mode control corresponding to a subject mode setting condition through the use of said person information storage means and said background information storage means needed according to a subject.

90. A system as defined in claim 89, wherein said mode control means is made to set a person mode and a landscape mode as said subject mode, in said person mode said mode control means executing a decoding processing on the basis of data stored in said person information storage means under a feature condition peculiar to a person set in advance, while in said landscape mode said mode control means executing the decoding processing on the basis of background information stored in said background information storage means.

91. A system as defined in claim 86, wherein said mode control means detects a code of an encoding mode, set in the process of an encoding of said picture signal, in the process of a decoding to carry out the decoding processing under a decoding condition corresponding to said encoding mode and further to make said error correction means implement the error correction.

92. A system as defined in claim 91, wherein said mode control means implements the decoding processing in accordance with one of a motion picture mode, a quasi-motion picture mode and a still picture mode set as said encoding mode, and error correction means exerts said error correction function in said motion picture mode and said quasi-motion picture mode while making a retransmission request of said picture signal when an error occurs in a setting state of said still picture mode.

93. A system as defined in claim 91, wherein, when as said encoding mode is set one of a template use mode in which information equivalent to person area information corresponds a shape prepared in advance and a model-based mode in which motion information is added to a three-dimensional model, said mode control means executes the decoding processing by setting one of said template use mode and said model-based mode in the process of decoding in said person mode.

94. A system as defined in claim 91, wherein said error correction means selectively transmits one of the following request signals (1) to (4) to the bit stream transmission side when an error occurs in the decoding process so that the decoding stops:

(1) a retransmission request signal of a motion picture beginning with a forced INTRA picture;
(2) a newly resuming request signal of a transmission of a motion picture starting with a forced INTRA picture;
(3) a transmission request signal of a quasi-motion picture relying on only a forced INTRA picture; and
(4) a transmission request signal of a motion parameter in a model-based encoding.

95. A system as defined in claim 6, wherein said person information storage means is made such that a person picture of a specific person is registered as individual information when needed and is read out at a proper timing.

96. A system as defined in claim 95, wherein said mode control means uses person picture data being said individual information stored in said person information storage means, in said model-based mode.

97. A picture signal decoding system which receives a picture signal transmitted in the form of an encoded bit stream compressed with a variable-length code to decode it to reproduce said picture signal, said system comprising:

color information estimation means for estimating color information of each of blocks of pixel data decoded in block units on the basis of one of past color information data of an object block and color information of a peripheral block;

error evaluation means for evaluating the color information of said object block on the basis of an error value between the color information data obtained by the decoding process of said object block and the color information data estimated by said color information estimation means; and error correction means for replacing the color information data of said object block with the color information data estimated by said color information estimation means when an evaluation result by said error evaluation means shows that the color information involves an error.

98. A system as defined in claim 97, further comprising:

transformation coefficient decoding means for detecting and decoding orthogonal transformation coefficient data of each of blocks of said encoded bit stream which is described with a fixed-length code using one of a variable-length code and an ESC code of a specific bit pattern;

ESC position storage means for calculating the degree of similarity between said variable-length code and said ESC code in the process of the detection of said orthogonal transformation coefficient data by said transformation coefficient decoding means and for storing a position of said ESC code of said bit stream when a bit coincidence therebetween exceeds a predetermined value; and reevaluation means for, when said error correction means detects the error of the color information, recognizing as fixed-length code data the data described at the position stored by said ESC position storage means to again perform the decoding processing prior to replacing the color information with the color information estimated by said color information estimating means.

99. A system as defined in claim 97, further comprising:

EOB detection means for retrieving an end-of-block (EOB) code described at an end of each of blocks of said encoded bit stream to estimate an error of one bit and again detect said EOB code when not detecting said EOB code within a given condition range in the object block and to specify it as EOB code when detecting it within said given condition range; and returning means for performing the decoding processing for the next block on the basis of a position of the EOB code detected by said EOB detection means when said error correction means detects the error of the color information data so that the decoding processing stops.

100. A picture signal decoding system which receives a picture signal transmitted in the form of an encoded bit stream compressed with a variable-length code to decode it to reproduce said picture signal, said system comprising:

error correction means for, when color information of pixel data obtained in block units through a decoding processing involves an error, estimating color information from one of past color information and color information of a peripheral block for an error correction; and error propagation prevention means for requesting from a transmission side periodical transmission of forced INTRA block data in terms of said picture signal in block units in a portion becoming an important area of a decoded picture in accordance with the frequency of the error correction by said error correction means.

101. A picture signal decoding system which receives a picture signal transmitted in the form of an encoded bit stream compressed with a variable-length code to decode it to reproduce said picture signal, said system comprising:

area specification means for specifying an object area on the basis of area information data described in a user data area of said encoded bit stream data; and error correction means for correcting an error included in said picture signal in the process of a decoding processing of the object area specified by said area specification means, on the basis of said area information data.

102. A system as defined in claim 101, wherein said area specification means is equipped with a plurality of basic templates for specifying a shape of said object area, and selectively sets one of said plurality of basic templates on the basis of information on said basic template designated through said area information described in said encoded bit stream data from the transmission side and specifies a portion of said object area by deforming the set basic template so that it conforms to said object area.

103. A system as defined in claim 102, wherein said plurality of basic templates are hierarchically provided covering a range from a template wholly indicative of an object to a template representative of a detailed portion of said object and express the specified portion in the form of a two-dimensional coordinate in the basic templates.

104. A system as defined in claim 103, further comprising motion compensation means for, when said area specification means specifies an area including a block being currently under decoding, performing a motion compensation for said block on the basis of a motion vector of a block of an area already decoded.

105. A system as defined in claim 103, further comprising color information compensation means for, when said area specification means specifies an area including a block being currently under decoding, correcting color information of said block on the basis of color information including a luminance, a color and a texture in a block of an area already decoded.

106. A system as defined in claim 101, further comprising background information storage means for storing as background information picture information of a background area other than an object area specified by said area specification means, so that said error correction means performs the correction on the basis of said background information of said background information storage means when an error occurs during decoding of picture data in said background area.

107. A picture signal decoding system comprising,
first means responsive to a picture signal transmitted in the form of an encoded bit stream compressed with a variable-length code to decode it to reproduce said picture signal, said system comprising psuedo area specification means for specifying a psuedo object area by performing an evaluation calculation centering on the center of gravity of a picture on the basis of pattern information data of a past frame when an object is not specified from a decoded result of said picture signal;
second means for storing pattern information data;
third means for specifying pseudo area by performing an evaluation calculation with the center of gravity of a picture being used as a center on the basis of pattern information data of past frames read out from said second means when an object is not specified from z decoded result of said picture signal, said third means generating pattern information data to be stored in said second means, said pseudo area being provided to said first means so that said first means is able to efficiently perform decoding operation.

108. A picture signal decoding system comprising,
first means responsive to a picture signal transmitted in the form of an encoded bit stream compressed with a variable-length code to decode it to reproduce said picture signal, said first means having a buffer capable of storing bit stream data of at least one frame; and
second means for retrieving a start code of a specific pattern, which start code is attached to be placed at a head position of said encoded bit stream data of one frame, thereby checking said bit stream data stored in said buffer globally.

109. A system as defined in claim 108, wherein for retrieving a group-of-blocks (GOB) start code of a specific bit pattern positioned at a head portion of a first block group included in said picture signal formed in a state that pixel data corresponding to one frame is divided into a plurality of block groups, said code check means globally checks the bit stream data accumulated in said buffer.

110. A system as defined in claim 108, wherein, when the bit error rate in the specific bit pattern is below a given value, said code check means specifies said bit pattern as said start code in globally checking the bit stream data.

111. A system as defined in claim 108, wherein for performing positional search said code check means detects data indicative of a necessary number of bits which is described at a position subsequent to one of said start code of said bit stream data and said GOB start code, and compares the detected data with the actual number of bits between the specified start code and the next start code to determine the start code.

112. A system as defined in claim 109, wherein said code check obtains 8-bit data representative of a necessary number of bits of a block group described at a position subsequent to said GOB start code as data in which a higher rank side and a lower rank side are interchanged to form an inversion pattern.

* * * * *